United States Patent
Nara et al.

(10) Patent No.: US 10,380,057 B2
(45) Date of Patent: Aug. 13, 2019

(54) DATA STORAGE DEVICE

(71) Applicant: Kabushiki Kaisha Toshiba, Minato-ku (JP)

(72) Inventors: Ryuta Nara, Fuchu (JP); Hiroshi Isozaki, Kawasaki (JP); Kentaro Umesawa, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 7 days.

(21) Appl. No.: 15/685,030

(22) Filed: Aug. 24, 2017

(65) Prior Publication Data

US 2018/0267922 A1    Sep. 20, 2018

(30) Foreign Application Priority Data

Mar. 17, 2017  (JP) ................. 2017-053339

(51) Int. Cl.
| | |
|---|---|
| *G06F 13/42* | (2006.01) |
| *G06F 13/36* | (2006.01) |
| *G06F 3/06* | (2006.01) |
| *H04L 12/40* | (2006.01) |

(52) U.S. Cl.
CPC ............ *G06F 13/42* (2013.01); *G06F 3/0619* (2013.01); *G06F 3/0623* (2013.01); *G06F 3/0655* (2013.01); *G06F 3/0679* (2013.01); *G06F 13/36* (2013.01); *H04L 12/40006* (2013.01); *H04L 2012/40208* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 6,246,688 B1 | 6/2001 | Angwin et al. | |
| 2008/0255721 A1 | 10/2008 | Yamada | |
| 2014/0176403 A1* | 6/2014 | Inoue | G09G 3/3208 345/77 |

(Continued)

FOREIGN PATENT DOCUMENTS

| | | | |
|---|---|---|---|
| JP | H10-123950 A | 5/1998 | |
| JP | 3129102 B2 | 1/2001 | |

(Continued)

*Primary Examiner* — Henry Tsai
*Assistant Examiner* — Aurangzeb Hassan
(74) *Attorney, Agent, or Firm* — Oblon, McClelland, Maier & Neustadt, L.L.P.

(57) ABSTRACT

According to an embodiment, a data storage device includes a data accumulation unit, a bus interface, and a processor. The processor is configured to control operation of the data storage device so as to spontaneously acquire data from an in-vehicle network via the bus interface and store the data in the data accumulation unit. The processor includes a message processing unit and a data access processing unit. The message processing unit is configured to transmit and receive messages, via the bus interface, to and from an electronic control unit or an external device connected to the in-vehicle network. The data access processing unit is configured to command the data accumulation unit to write and read data. Data included in a message received by the message processing unit is written in the data accumulation unit in accordance with a command of the data access processing unit.

14 Claims, 26 Drawing Sheets

(56) References Cited

U.S. PATENT DOCUMENTS

2015/0372975 A1  12/2015  Moriya et al.
2017/0278320 A1  9/2017  Isozaki et al.

FOREIGN PATENT DOCUMENTS

| JP | 3368882 B2 | 1/2003 |
| JP | 2008-033846 A | 2/2008 |
| JP | 2008-261777 A | 10/2008 |
| JP | 2009-286295 A | 12/2009 |
| JP | 2010-027021 | 2/2010 |
| JP | 2011-40912 A | 2/2011 |
| JP | 2013-077048 A | 4/2013 |
| JP | 2014-15142 A | 1/2014 |
| JP | 5728701 B2 | 6/2015 |
| JP | 2017-174111 A | 9/2017 |

* cited by examiner

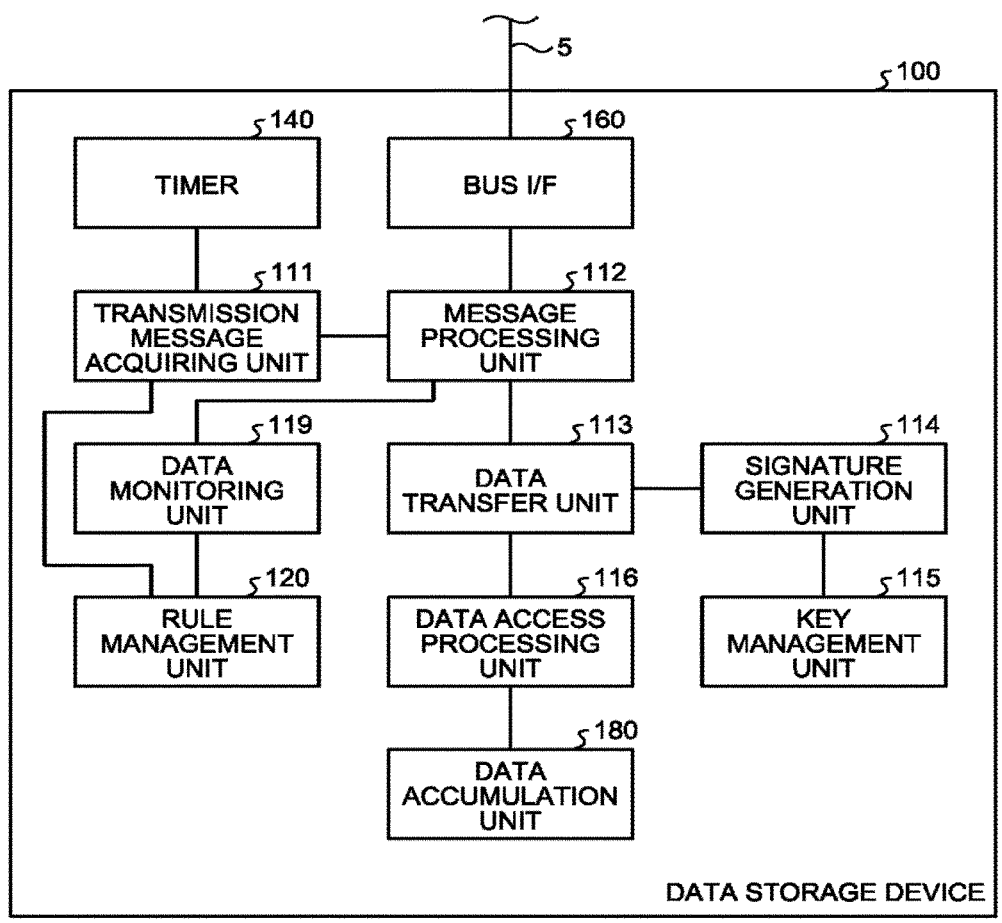

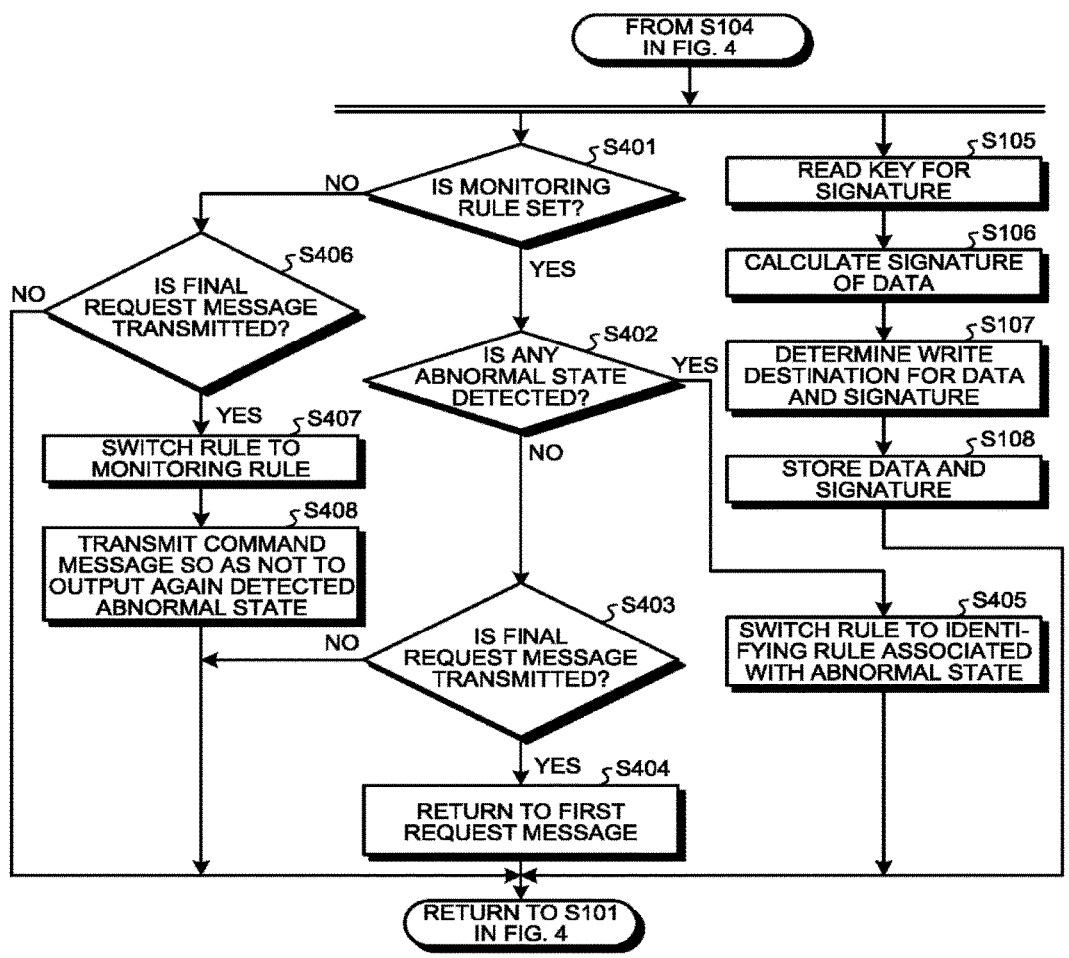

FIG.12A

| RULE SET | RULE |
|---|---|
| RULE SET 1 | MONITORING RULE 1 |
| | IDENTIFYING RULE 10 |
| | IDENTIFYING RULE 11 |
| | ⋮ |
| RULE SET 2 | MONITORING RULE 2 |
| | IDENTIFYING RULE 20 |
| | IDENTIFYING RULE 21 |
| | ⋮ |
| RULE SET 3 | MONITORING RULE 3 |
| | IDENTIFYING RULE 30 |
| | IDENTIFYING RULE 31 |
| | ⋮ |
| ⋮ | ⋮ |

FIG.12B

| VEHICLE TYPE | RULE SET |
|---|---|
| VEHICLE TYPE 1 | RULE SET 1 |
| VEHICLE TYPE 2 | RULE SET 2 |
| VEHICLE TYPE 3 | RULE SET 3 |
| ⋮ | ⋮ |

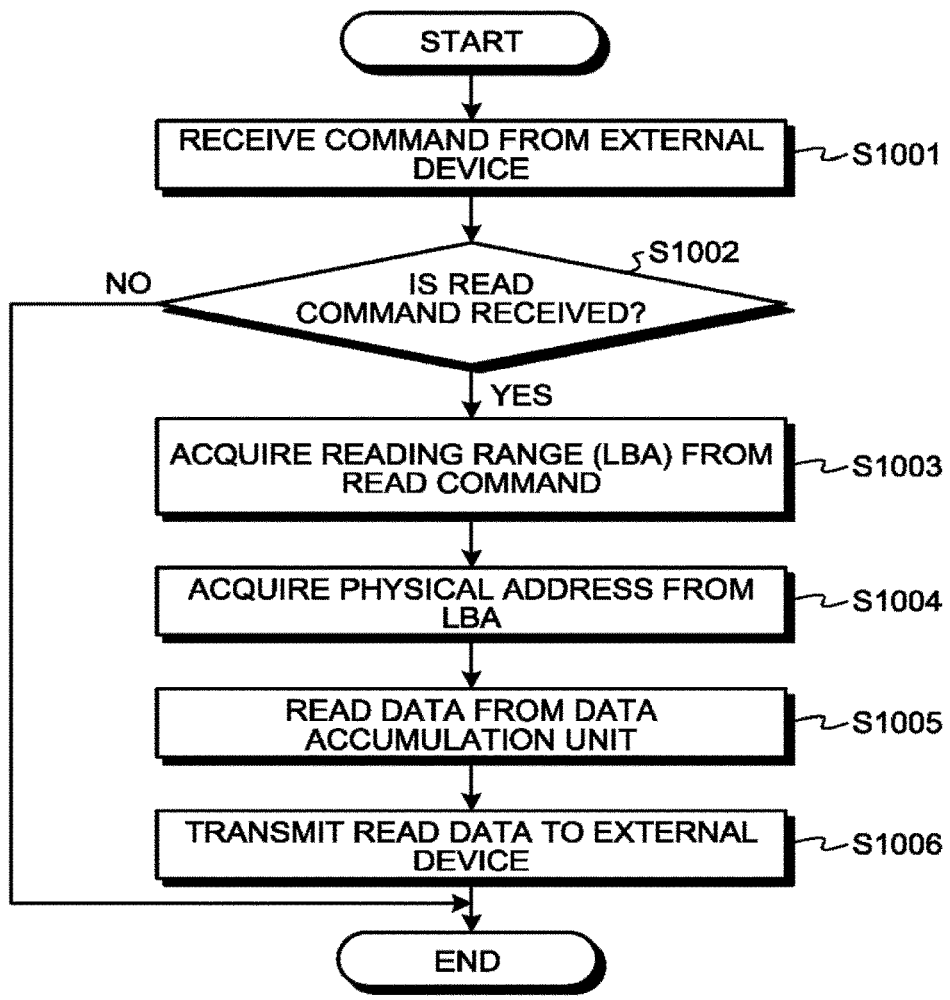

FIG.27

| Key | Value (FILE NAME) |
|---|---|
| 00000001 | FILA A |
| 00000002 | FILE B |
| 00000003 | FILE C |
| 00000004 | FILE D |
| ⋮ | ⋮ |

FIG.28

| Key | | | Value (FILE NAME) |
|---|---|---|---|
| MESSAGE ID | MESSAGE KIND | SERIAL NUMBER | |
| 001 (ECU1) | 01 (Response) | 00000001 | FILA A |
| 004 (ECU4) | 02 (Control) | 00000002 | FILE B |
| 001 (ECU1) | 01 (Response) | 00000003 | FILE C |
| 002 (ECU2) | 02 (Control) | 00000004 | FILE D |
| ⋮ | ⋮ | ⋮ | ⋮ |

DATA STORAGE DEVICE

CROSS-REFERENCE TO RELATED APPLICATIONS

This application is based upon and claims the benefit of priority from Japanese Patent Application No. 2017-053339, filed on Mar. 17, 2017; the entire contents of which are incorporated herein by reference.

FIELD

Embodiments described herein relate generally to a data storage device connected to an in-vehicle network.

BACKGROUND

In related art, operation and communication contents of the electronic control units (ECUs) are recorded and utilized in diagnosing the ECUs, measuring fuel consumption, evaluating operating condition, and the like in an in-vehicle system having a configuration in which various kinds of ECUs mounted on a vehicle are connected via an in-vehicle network. In the case of recording data utilized for such uses, generally used is a data storage device such as a data logger or a diagnostic device in which data is passively stored.

In the case of utilizing the data storage device in the related art in a state connected to the in-vehicle network, it is necessary to have a host (external device) including a general-purpose processor such as a central processing unit (CPU) to control the data storage device separately from the data storage device and has a function to provide connection to the in-vehicle network. When the data storage device is separated from the host, it may be difficult to identify whether a cause of abnormality exists in the data storage device or the host in the case where sudden power interruption occurs in either the host or the data storage device and data being written is lost or in the case where data is garbled due to noise on a communication path connecting the data storage device to the host.

BRIEF DESCRIPTION OF THE DRAWINGS

FIG. 8 is a block diagram illustrating an exemplary functional configuration of a data storage device according to a second embodiment;

FIG. 9 is a diagram illustrating an exemplary association relationship between an abnormal state and an identifying rule;

FIG. 10 is a flowchart illustrating an exemplary processing procedure by the data storage device according to the second embodiment;

FIGS. 12A and 12B are diagrams illustrating an exemplary association relationship between a rule set and a rule and an exemplary association relationship between a vehicle type and a rule set;

FIG. 24 is a diagram illustrating an exemplary conversion table between an LBA and a physical address;

FIG. 25 is a flowchart illustrating an exemplary processing procedure by the data storage device according to the sixth embodiment;

FIG. 27 is a diagram illustrating an exemplary association table between a Key and a Value;

FIG. 28 is a diagram illustrating another exemplary association table between a Key and a Value.

DETAILED DESCRIPTION

Figure 1:
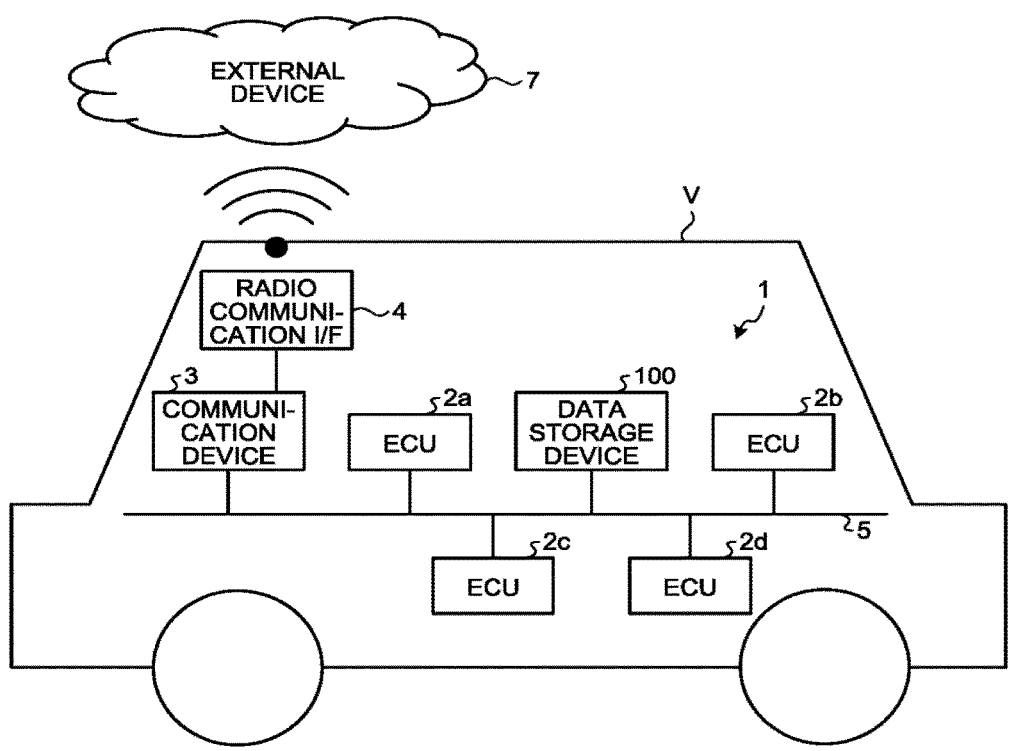
FIG. 1 is a diagram schematically illustrating an entire configuration of an in-vehicle network.

According an embodiment, a data storage device is connected to an in-vehicle network, and includes a data accumulation unit, a bus interface, and a processor. The data accumulation unit includes a NAND interface. The bus interface is mounted on the same substrate as the data accumulation unit and connected to a bus of the in-vehicle network. The processor is mounted on the same substrate as the data accumulation unit and the bus interface, and configured to control operation of the data storage device so as to spontaneously acquire data from the in-vehicle network via the bus interface and store the data in the data accumulation unit. The processor includes a message processing unit and a data access processing unit. The message processing unit is configured to transmit and receive messages, via the bus interface, to and from an electronic control unit or an external device connected to the in-vehicle network. The data access processing unit is configured to command the data accumulation unit to write and read data. Data included in a message received by the message processing unit is written in the data accumulation unit in accordance with a command of the data access processing unit.

A data storage device according to an embodiment is connected to an in-vehicle network, spontaneously acquires data from an electronic control unit (hereinafter referred to as ECU) or the like on the in-vehicle network, and accumulates the data. Since a data storage device connected to an in-vehicle network in the related art has a configuration to passively store data in accordance with a command of a host, the host is needed to be used in a state connected to the in-vehicle network in order to accumulate data output from the ECU or the like. In contrast, the data storage device according to the embodiment incorporates a function equivalent to the host in the related art, and has a novel configuration to spontaneously acquire and accumulate data from the in-vehicle network when connected to the in-vehicle network.

Here, spontaneously acquiring and accumulating data means acquiring and accumulating data without depending on a write command or the like from an external device. As an example of spontaneous data acquisition and accumulation, there is an exemplary case in which a request message requesting data is transmitted to an ECU or the like on the in-vehicle network, a response message to this request message is received, and data included in the response message is acquired and accumulated. Additionally, spontaneous data acquisition and accumulation also includes receiving all of messages flowing in a network bus of the in-vehicle network or a message preliminarily determined to be received, and acquiring and accumulating data included in the message(s).

In the following, the data storage device according to the embodiment will be described in detail with reference to the drawings. Note that a constituent element having a similar function is denoted by the same reference sign and repetition of the same description will be suitably omitted in the following description.

First Embodiment

FIG. 1 is a diagram schematically illustrating an entire configuration of an in-vehicle network 1. The in-vehicle network 1 is used to implement, for example, vehicle control in which a plurality of ECUs (four ECUs 2a to 2d are exemplified in FIG. 1) mounted on a vehicle V such as an automobile is made to cooperatively work. In other words, vehicle control to make the plurality of ECUs cooperatively work is implemented by performing communication of data necessary for the vehicle control between the plurality of ECUs connected to the in-vehicle network 1. For easy understanding for the configuration of the in-vehicle network 1, note that only four ECUs 2a to 2d are illustrated in FIG. 1 as the plurality of ECUs connected to the in-vehicle network 1, but the number of the ECUs to be connected to the in-vehicle network 1 is optional. In the following, in the case of generically naming the ECUs without specially distinguishing one from the other, an ECU connected to the in-vehicle network 1 will be referred to as an ECU 2.

The in-vehicle network 1 illustrated in FIG. 1 includes not only a plurality of ECUs 2 (2a to 2d) but also a communication device 3, a radio communication interface (I/F) 4, and a data storage device 100 according to the embodiment. The ECU 2, communication device 3, and data storage device 100 are connected by a network bus 5 and capable of communicating with each other by transmitting and receiving a message via the network bus 5. For the network bus 5, a component corresponding to a general communication protocol applicable to a vehicle can be used. For example, a component compatible with a CAN, a CAN-FD, an Ethernet (registered trademark), a FlexRay (registered trademark), a MOST, a LIN, a CXPI, and the like can be used.

The radio communication I/F 4 is connected to the communication device 3. The radio communication I/F 4 is a physical interface to connect an external device (external server or the like) 7 to the communication device 3. For a communication method utilized by the radio communication I/F 4, a cellular phone system such as a 3GPP (registered trademark), an LTE (registered trademark), or a Wi-Fi (registered trademark) can be used.

The communication device 3 can communicate with the external device 7 via the radio communication I/F 4. Also, the communication device 3 can communicate with the data storage device 100 and an ECU 2 via the network bus 5. Therefore, the communication device 3 can transmit data received from the external device 7 to the data storage device 100 and an ECU 2, and can transmit data received from the data storage device 100 and an ECU 2 to the external device 7.

The ECU 2 is an electronic control unit to control the in-vehicle device. The in-vehicle device represents a mechanical/electronic device mounted on the vehicle V, and includes not only a device categorized in a drive system such as an engine but also devices categorized in a vehicle body system such as an interior light and a window, devices categorized in an information system such as a navigation and a front panel, and devices categorized in a travel system such as an anti-lock braking system (ABS) and a brake. For example, the ECU 2a controls the engine in the drive system, the ECU 2b controls the interior light in the vehicle body system, the ECU 2c controls the navigation in the information system, and the ECU 2d controls the ABS in the travel system. Additionally, the in-vehicle device controlled by the ECU 2a is not limited to the drive system, and the ECU 2a may also control an in-vehicle device categorized in the vehicle body system, information system, or travel system. The similar is also applied to the ECUs 2b to 2d. Also, one ECU 2 may control a plurality of in-vehicle devices.

Since the in-vehicle device performs control in accordance with a state of the vehicle V, an ECU 2 communicates with another ECU 2 via the network bus 5. For example, an ECU 2 transmits, to another ECU 2, control data to operate the in-vehicle device controlled by the ECU 2 and an operation state of the in-vehicle device to be controlled, and also receives equivalent information from another ECU 2. Meanwhile, data communicated between an ECU 2 and another ECU 2 via the network bus 5 is not limited to the control data and the operation state, but may also be an operation state of an ECU 2 itself, an abnormal state of a function held by an ECU 2, and the like described later.

An ECU 2 communicates with another ECU 2 by transmitting and receiving a message. Referring to an example of using the CAN as a communication protocol, a message has at least two areas including an ID area and a data area to be passed to a transmission destination. The ID area may include: information indicating a transmission source and a transmission destination of a message; and an ID to distinguish a message. The data area may also include: data to be passed to another ECU 2; and a result of diagnosis processing executed by an ECU 2 based on a diagnostic protocol described later. The CAN is a broadcast-based communication protocol in which all of devices (ECUs 2a to 2d, communication device 3, and data storage device 100) connected to the network bus 5 receive a message when an ECU 2 sends out a message to the network bus 5. A device having received the message refers to an ID of the message and determines what kind of data it is and whether it is the data to be processed by the own device.

An ECU 2 has a function to diagnose an in-vehicle device to be controlled and the ECU 2 itself to be prepared for occurrence of failure in the in-vehicle device to be controlled and the ECU 2 itself. The diagnostic function is roughly classified into two kinds, and one kind thereof is a function to output data recorded inside the ECU 2 onto the network bus 5, and output as a message, setting information and an operation state of the ECU 2 itself or an operation state of an in-vehicle device to be controlled. Exemplary setting information of the ECU 2a itself includes engine ignition timing, speed setting for a speed limiter, a firmware version, and the like, and an exemplary operation state of the ECU 2a itself includes a battery voltage value supplied to the ECU 2a, and the like. The operation state of the in-vehicle device to be controlled includes an engine speed, a speed, a temperature of cooling water in a radiator, and the like. Note that setting information and an operation state of an ECU 2 are varied by design and functions held by the ECU 2 and a category of an in-vehicle device controlled by the ECU 2.

Another diagnostic function is that an ECU 2 itself checks a function held by the ECU 2 or a function held by an in-vehicle device to be controlled, and when abnormality is detected, a function having the abnormal state and contents of the abnormal state are output onto the network bus 5 as a message. For example, an exemplary abnormal state that may occur in a function held by an ECU 2a includes voltage abnormality, wiring short-circuiting/opening, and the like, and an exemplary abnormal state that may occur in a function held by an in-vehicle device includes input voltage abnormality at an intake air temperature sensor, GND short-circuit failure at an input of an exhaust gas recirculation sensor, and the like.

Here, a description will be provided for a message (request message) by which the data storage device 100 commands an ECU 2 to execute diagnosis and a message of a diagnosis result (response message) output from an ECU 2 onto the network bus 5. The request message is a message by which the data storage device 100 commands an ECU 2 to execute diagnosis. The ECU 2 may have a plurality of functions to be diagnosed and the number of times of diagnosis that can be executed at a time may be limited, and therefore, the data storage device 100 provides a command, by a request message, to execute which one of diagnostic functions is to be executed out of the diagnostic functions held by the ECU 2. For example, in the case where the ECU 2a has a plurality of pieces of setting information, the request message has a role to have the data storage device 100 command the ECU 2a which one of the setting information out of those setting information is to be output. Note that contents commanded by a request message are not limited to execution of diagnosis, but may be used for various kinds of commands to an ECU 2. For example, a command to suppress output of a response message may be contained in a request message so as not to output again a diagnosis result of abnormality.

The response message is a message indicating a diagnosis result of the ECU 2. In the case where the ECU 2 normally executes diagnosis, one of following information (1) to (3) is described in a response message output from the ECU 2. (1) is setting information and an operation state of the ECU 2 itself, (2) is an operation state of an in-vehicle device to be controlled, (3) occurrence of abnormality in a function held by the ECU 2 or a function held by an in-vehicle device to be controlled. On the other hand, in the case where the ECU 2 does not have any diagnostic function commanded by the request message, or in the case where the ECU 2 fails to execute a requested diagnostic function due to condition of the vehicle V, information indicating that diagnosis cannot be executed is described in the response message output from the ECU 2. Note that a trigger that makes an ECU 2 execute diagnosis and output a result thereof is not only when a request message is received but also when the ECU 2 itself determines so. For example, the ECU 2 may periodically execute diagnosis and output a result.

A request message and a response message handled by the ECU 2 are assumed to use diagnostic protocol standards for a standardized ECU. As the protocol standards, not only UDS (ISO 14229) but also KWP (ISO 14320), OBD (ISO 15021, SAE J 1979), WWH-OBD (ISO 27145), 1939 (SAE J 1939) may be utilized.

When an ECU 2 communicates with another ECU 2 by using a request message and a response message, communication is performed by using a communication protocol compatible with the network bus 5. Specifically, information of a request message and a response message is set in a message data area. A receiving side refers to contents of the message data area and determines diagnostic contents. As the standards combining a communication protocol with a diagnostic protocol for an ECU, for example, there are UDS on CAN, UDS on LIN, and these standards may be used.

Figure 2:
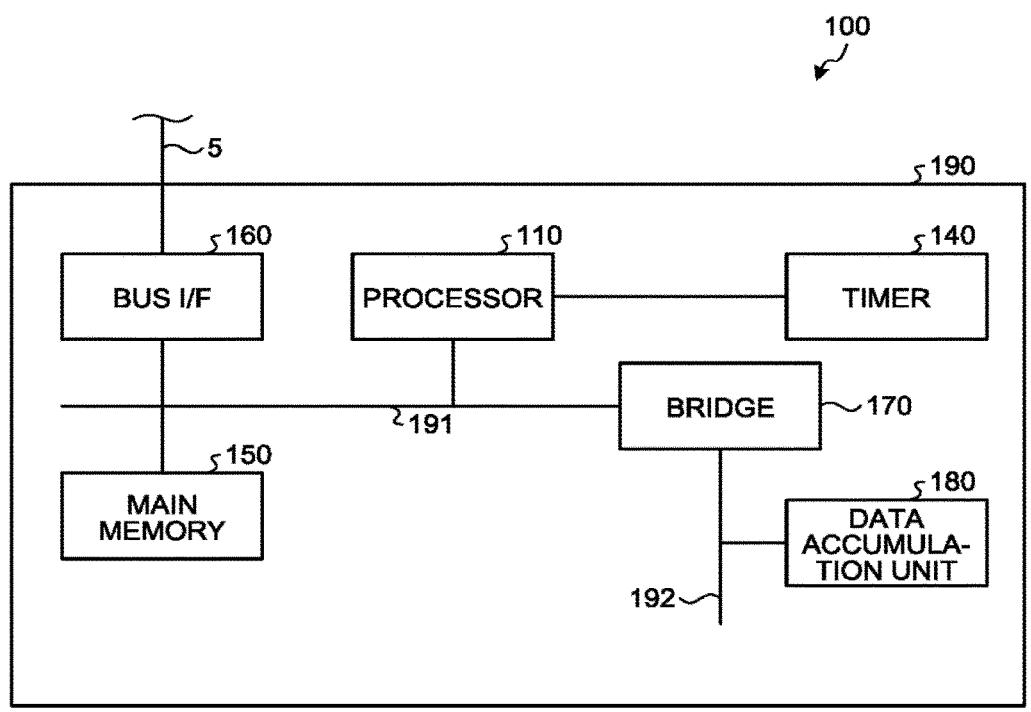
FIG. 2 is a block diagram schematically illustrating an exemplary hardware configuration of a data storage device.

Next, the above-described data storage device 100 according to the embodiment to be used in a state connected to the in-vehicle network 1 will be described in detail. FIG. 2 is a block diagram schematically illustrating an exemplary hardware configuration of the data storage device 100 according to the embodiment. As the data storage device 100, a device mounted with, for example, a NAND flash memory is assumed.

As illustrated in FIG. 2, the data storage device 100 includes a processor 110, a timer 140, a main memory 150, a bus I/F 160, a bridge 170, and a data accumulation unit 180. These components are mounted on the same substrate 190 and connected via internal buses 191, 192 using wiring and the like on the substrate 190 as illustrated in FIG. 2.

The bus I/F 160 is connected to the in-vehicle network 1 by the network bus 5. The processor 110, main memory 150, bus I/F 160, and bridge 170 are connected by the internal bus 191. The data accumulation unit 180 is connected to the bridge 170 by the internal bus 192. The timer 140 is connected to the processor 110.

The processor 110 sequentially processes a command and data loaded from the main memory 150, and causes the main memory 150 to store processed results. For example, the processor 110 executes a predetermined control program (software program) by using the main memory 150, thereby implementing functional constituent elements described later. This processor 110 is, for example, a general-purpose processor like an ARM (registered trademark) Cortex-M series.

The timer 140 has a function to generate an interruption at a constant frequency in accordance with setting. The software working on the processor 110 can be made to periodically execute specific processing by handling this interruption.

The main memory 150 is a general-purpose main memory. For example, a dynamic random access memory (DRAM), a static random access memory (SRAM), a magnetic RAM (MRAM), or the like can be used as the main memory 150.

The bridge 170 is a bridge controller to connect the internal bus 191 to the internal bus 192. Respective bus access is converted between the internal bus 191 and the internal bus 192 having different communication protocols, thereby enabling exchange of a command and data between the respective components (processor 110, main memory 150, and bus I/F 160) connected to the internal bus 191 and the data accumulation unit 180 connected to the internal bus 192.

The data accumulation unit 180 has a memory, and stores a message received from the network bus 5 and data flowing in the internal bus 191 based on a command from the processor 110 in the memory and also outputs, to the processor 110, data read from the memory. As the memory held by the data accumulation unit 180, a NAND flash memory not including a controller or a NAND flash memory including a controller is assumed. In other words, the data accumulation unit 180 includes a NAND interface adapted to input/output data to/from the NAND flash memory based on a command from the processor 110. The NAND flash memory not including a controller does not have a wear leveling function to smooth the number of times of writing, a management function for a defective block, an error correcting function, and a function to access based on a logical address. Therefore, in the case of using the NAND flash memory not including a controller as the memory of the data accumulation unit 180, the processor 110 designates a physical address and accesses the data accumulation unit 180 at the time of writing and reading data. In the case of using the NAND flash memory including a controller, a logical block address (LBA) is used instead of a physical address to designate a storage area to be accessed. A solid state drive (SSD), a memory card like an SD card or a USB memory may be used as the NAND flash memory including a controller.

The bus I/F 160 is an interface to connect the data storage device 100 to the network bus 5 of the in-vehicle network 1. The bus I/F 160 acquires a message flowing in the network bus 5, confirms an ID of the message, and in the case where the ID is an ID of a message to be processed by the data storage device 100, the bus I/F 160 notifies the processor 110 of reception of the message and writes the acquired message in the main memory 150 connected to the internal bus 191. On the other hand, in the case where the ID is not an ID of a message to be processed by the data storage device 100, the message is discarded without notifying the processor 110. In contrast, when a message is transmitted from the processor 110 or the main memory 150 to the network bus 5, a message read from the main memory 150 by the bus I/F 160 is transmitted to the network bus 5. Meanwhile, the bus I/F 160 may have a function to detect collision of transmission messages caused in the case where a message is transmitted from another device at the same time when a message is transmitted to the network bus 5, and also the bus I/F 160 may have an additional function to transmit again the message having collided.

In the case of a general data storage device, it is necessary to have a host including: a processor to control the data storage device; and a program for control. The host and the data storage device are connected by a general-purpose IF, and the host commands the data storage device to read or write data. The data storage device passively reads or writes data through the general-purpose IF in accordance with a command from the host. On the other hand, the data storage device 100 of the embodiment has the processor 110 that implements functions equivalent to the host in the related art, and does not passively read or write data from/in the data accumulation unit 180 but spontaneously transmits and receives a message via the bus I/F 160, accumulates data acquired from the in-vehicle network 1 in the data accumulation unit 180, and outputs data read from the data accumulation unit 180 to the in-vehicle network 1.

Figure 3:
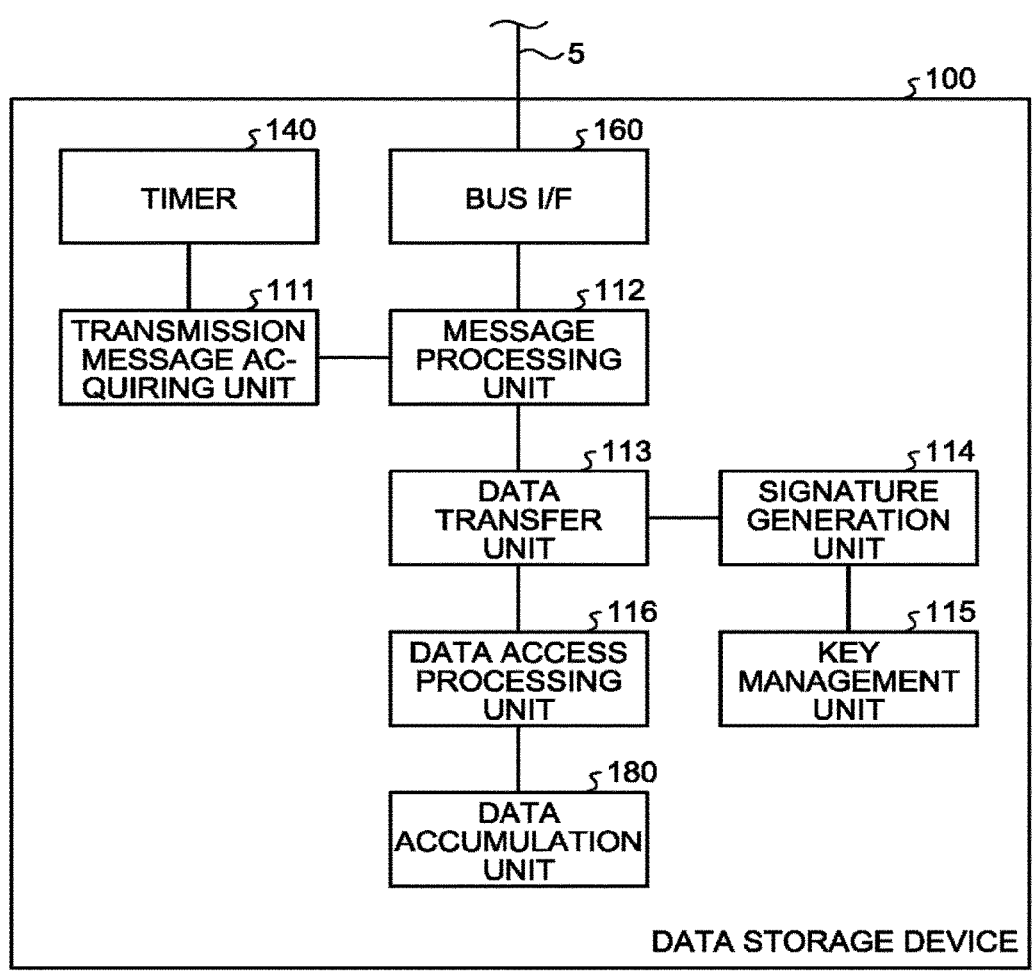
FIG. 3 is a block diagram illustrating an exemplary functional configuration of a data storage device according to a first embodiment.

FIG. 3 is a block diagram illustrating an exemplary functional configuration of the data storage device 100 according to the first embodiment. As illustrated in FIG. 3, the data storage device 100 includes a transmission message acquiring unit 111, a message processing unit 112, a data transfer unit 113, a signature generation unit 114, a key management unit 115, and a data access processing unit 116. As described above, the respective processing units are implemented by the processor 110 executing the predetermined control program. In other words, the processor 110 includes the respective processing units described above. Note that the bus I/F 160, timer 140, and data accumulation unit 180 provided as the hardware are also illustrated together with the above respective processing units in FIG. 3 in order to simplify the description.

The transmission message acquiring unit 111, message processing unit 112, data transfer unit 113, signature generation unit 114, key management unit 115, and data access processing unit 116 are implemented by, for example, the processor 110 executing the predetermined program. The program is stored in, for example, the data accumulation unit 180, and when the data storage device 100 is started, the program is read from the data accumulation unit 180 to the main memory 150 and executed by the processor 110.

Upon receipt of a notification of interruption from the timer 140, the transmission message acquiring unit 111 selects a message to be transmitted next from among transmission messages held by itself and passes the same to the message processing unit 112. For example, the transmission message acquiring unit 111 has: a message queue accumulating messages each described with an address; and a list on which transmission destination IDs of messages are preliminarily described. The transmission message acquiring unit 111 compares a message accumulated in the message queue with the list, and embeds a transmission destination ID in the message, and then selects the same as a message to be transmitted next. In the present embodiment, it is assumed that all of the ECUs 2 having the above-described diagnostic functions are registered in the list as message transmission destinations.

The message processing unit 112 sends out the message received from the transmission message acquiring unit 111 to the network bus 5 via the bus I/F 160. An exemplary message held by the transmission message acquiring unit 111 is a request message to request an ECU 2 (2a to 2d) for diagnosis. The data storage device 100 can transmit a request message to command the ECU 2 to execute diagnosis, collect a response message transmitted from the ECU 2, and spontaneously accumulate setting and an abnormal state of the ECU 2 or an in-vehicle device controlled by the ECU 2 in the data accumulation unit 180.

The message processing unit 112 transmits and receives a message to/from an ECU 2 and the communication device 3 connected to the network bus 5 via the bus I/F 160. Upon receipt of a request message from the transmission message acquiring unit 111, the message processing unit 112 sends out the message to the network bus 5 via the bus I/F 160. Also, the message processing unit 112 becomes a waiting state for a message in order to receive a response message from the ECU 2 that has received the request message. After that, when the response message is received from the ECU 2 via the bus I/F 160, the message processing unit 112 acquires contents of a data area from the response message and passes the contents to the data transfer unit 113. At this point, contents of an ID area may also be passed together to the data transfer unit 113. Other messages received by the message processing unit 112 may include a control message transmitted and received between the ECUs 2 (2a to 2d) and the like in addition to a response message transmitted from an ECU 2. Any data included in these messages is data to be accumulated in the data accumulation unit 180. Besides that, there is a message to provide a command to read data (recorded data) stored in the data accumulation unit 180. In the case where such a message is received, the message processing unit 112 also acquires a read command as data from the received message, and passes the same to the data transfer unit 113 in a manner similar to the case of the response message.

The data transfer unit 113 transfers data received from another processing unit to the signature generation unit 114 or the data access processing unit 116. The data transfer unit 113 has a condition to determine a transfer destination in accordance with received data, and determines a transfer destination of the data in accordance with the condition. For example, in the case of receiving, from the message processing unit 112, diagnostic data indicating a result of diagnosis processing of an ECU 2, the data transfer unit 113 transfers the diagnostic data to the signature generation unit 114 in order to attach a signature to the diagnosis data of the ECU 2. At this point, contents of an ID area may also be transferred to the signature generation unit 114 together with the diagnosis data in order to attach a signature not only to the diagnostic data but also to the contents of an ID area. Additionally, in the case of receiving the diagnosis data attached with the signature is received from the signature generation unit 114, the data transfer unit 113 transfers the diagnosis data attached with the signature to the data access processing unit 116 in order to write the diagnostic data attached with the signature in the data accumulation unit 180. At this point, the data access processing unit 116 passes, to the data accumulation unit 180, write destination information together with the diagnostic data attached with the signature and provides a command regarding a place in which the diagnostic data attached with the signature is to be written. Furthermore, in the case of receiving, from the message processing unit 112, a read command for recorded data stored in the data accumulation unit 180, the data transfer unit 113 transfers the read command to the data access processing unit 116.

The data transfer unit 113 may attach metadata to data to be transferred in order to notify a transfer destination of an attribute of the data to be transferred. Exemplary metadata includes metadata indicating whether data is received from outside or internally generated, metadata indicating presence of a signature, and metadata indicating confidentiality or disclosure. Exemplary data internally generated includes a signature and data indicating a property of received data (importance level, relevancy between pieces of data, and the like). When the metadata indicating that the data is internally generated is attached to the above-described data and transferred to the data access processing unit 116, the data access processing unit 116 that receives the data can grasp an attribute of the data by referring to the metadata. The metadata attached to data to be accumulated is stored in the data accumulation unit 180 together with the data. Furthermore, a read command to read the recorded data from the data accumulation unit 180 has two types: one is a case originated outside the data storage device 100; and the other is originated inside the data storage device 100. Therefore, metadata to distinguish a transmission source of a read command is attached. Note that a processing unit to attach metadata to data is not limited to the data transfer unit 113, and metadata may be attached at another processing unit.

The data access processing unit 116 can grasp an attribute of data and can perform processing suitable for the attribute by referring to metadata attached to data received. For example, the data access processing unit 116 executes following restrictions: as for a read command having metadata indicating that data is internally generated, permitted is reading recorded data having no signature and attached with metadata; and as for a read command attached with metadata indicating that data is received from the outside, restricted is reading, to the outside, recorded data attached with the metadata indicating absence of a signature or metadata indicating confidentiality, otherwise, only an authenticated person can read recorded data attached with the metadata indicating confidentiality while any person can read recorded data attached with the metadata indicating disclosure. Also, the data transfer unit 113 may determine whether data has a signature by using metadata attached to the data, and change a transfer destination. Note that a processing unit that changes processing by referring to metadata is not limited to the data access processing unit 116 and the data transfer unit 113, and any processing unit may become such a processing unit.

The signature generation unit 114 generates/attaches a signature of the data received from the data transfer unit 113 in accordance with a signature algorithm including a one-way hash function and a public key encryption algorithm using a key held by the key management unit 115 described later. The signature generation unit 114 calculates a hash of input data by using the one-way hash function, and calculates a signature by encrypting the obtained hash by using the public key encryption algorithm and a secret key. For the one-way hash function, a well-known algorithm such as an MD5, a SHA-256, or a SHA-3 may be used. For the public key encryption algorithm, a well-known algorithm such as RSA or an elliptic curve cryptosystem may be used.

Meanwhile, the signature generation unit 114 may include a message authentication code (MAC) algorithm utilizing a common key encryption and an HMAC utilizing a hash function besides the signature algorithm utilizing the public key cryptosystem. Since a signature and a MAC are attached to data to be stored in the data accumulation unit 180, it is possible to detect whether data read from the data accumulation unit 180 is falsified.

The key management unit 115 holds a key to generate a signature in the signature generation unit 114. Among a pair of a public key and a secret key calculated from the public key encryption algorithm, the key management unit 115 has at least the secret key necessary to generate a signature. Meanwhile, the public key needed to verify a signature may be held by the key management unit 115 or may also be stored in an external device that manages the public key. The key management unit 115 may internally generate an own pair of a public key and a secret key on based on the public key encryption algorithm or may receive a secret key generated outside. In the case of internally generating the own pair of a public key and a secret key, the key management unit 115 has a function to transmit the public key to the outside of the data storage device 100. Note that the key management unit 115 may store the key in the data accumulation unit 180 or may store the key in another storage area connected to the internal bus 191. Additionally, a key may be generated and retained by utilizing dedicated hardware adapted to safely handle a key, such as a trusted platform module (TPM), in order to safely manage the key.

The data access processing unit 116 is a processing unit to manage access to the data accumulation unit 180, and also issues a command to write data in the data accumulation unit 180 or issues a command to read data from the data accumulation unit 180. In the case of writing data in the data accumulation unit 180, the data access processing unit 116 receives, from the data transfer unit 113, data to be written, and transmits the data together with write destination information (e.g., physical address and data size) internally generated by itself to the data accumulation unit 180. At the same time, the data access processing unit 116 manages the write destination information, manages a free area, and checks readability. Meanwhile, it is assumed that a method by which the data access processing unit 116 generates the write destination information can be freely set. For example, a method of sequential writing in the order of addresses or a method of random selection from free areas may be adopted. Besides that, the data access processing unit 116 may increase the number of writing places from one to a plurality of places or may attach an error correction code in order to improve data reliability.

In the case of reading data from the data accumulation unit 180, the data access processing unit 116 receives, from the data transfer unit 113, a read command including information designating a read destination, converts the read command to a command to read data from the data accumulation unit 180, and transmits the same to the data accumulation unit 180. The data accumulation unit 180 reads data based on the received read command and passes the same to the data access processing unit 116. The data access processing unit 116 passes the received data to the message processing unit 112 via the data transfer unit 113. Consequently, the data read from the data accumulation unit 180 is sent out to the network bus 5 via the bus I/F 160.

Meanwhile, as a method of designating a reading destination of the data accumulation unit 180, a reading method may be preliminarily set in the data access processing unit 116 and the set reading method may be designated. For example, in the case of designating "output of all of recorded data" as the reading method, the data storage device 100 outputs all of the recorded data stored in an area excluding an external reading inhibition area described later from among the data accumulated in the data accumulation unit 180.

The data access processing unit 116 has a function to perform access restriction to the data accumulation unit 180, and may restrict writing and reading. Specifically, the data access processing unit 116 may execute following restrictions: inhibiting data writing in a specific area indicated by a physical address, or permitting data reading in the case of a read command internally generated while rejecting a read command received from the outside. As a method of distinguishing a read command received from the outside from a read command internally generated, there is a method of, for example, referring to metadata attached by the data transfer unit 113. The data transfer unit 113 can attach metadata indicating the outside to data received from the message processing unit 112, and can attach metadata indicating the inside to data received from a processing unit such as the signature generation unit 114 other than the message processing unit 112. The data access processing unit 116 can distinguish whether received data has come from the outside or the inside by referring to metadata.

In the case where the data access processing unit 116 has a function to perform access restriction, it is possible to prevent a key from carelessly being output to the outside of the data storage device 100 by, for example, storing the key in an area (external reading inhibition area) where a read command received from the outside is rejected. Also, as described later, by storing data written without being signed in the data accumulation unit 180 is stored in an external reading inhibition area, the data can be prevented from being output to the outside without being signed.

Figure 4:
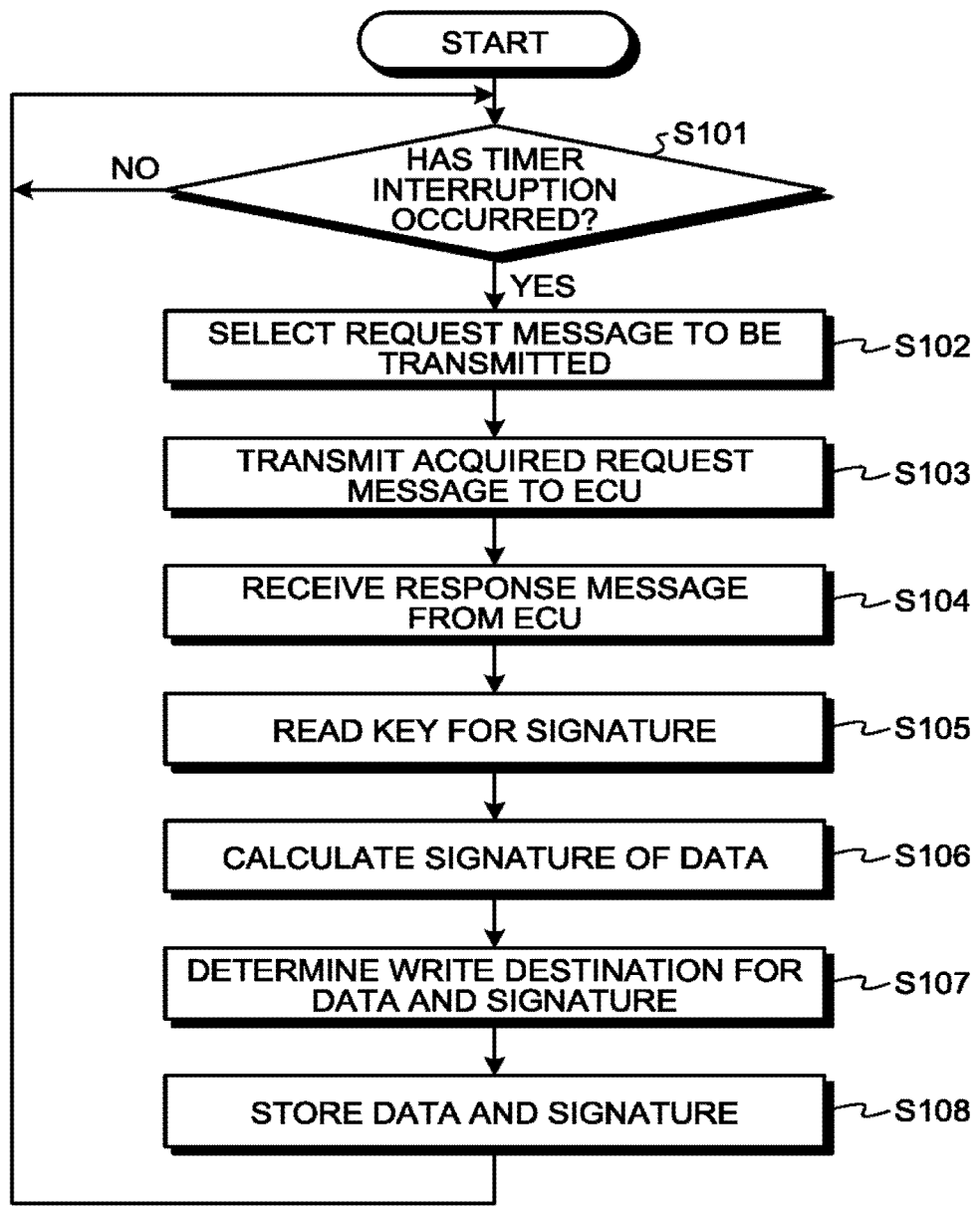
FIG. 4 is a flowchart illustrating an exemplary processing procedure by the data storage device according to the first embodiment.

FIG. 4 is a flowchart illustrating an exemplary processing procedure by the data storage device 100 according to the present embodiment and is a summarized example of basic processing operation in which the data storage device 100 spontaneously acquires data from the in-vehicle network 1 and accumulates the same in the data accumulation unit 180. A series of the processing illustrated in the flowchart of FIG. 4 is repeatedly executed every time the processor 110 receives an interruption notification from the timer 140.

The processor 110 notifies the transmission message acquiring unit 111 of timer interruption upon receipt of an interruption notification from the timer 140 (step S101: Yes).

Having received the timer interruption notification, the transmission message acquiring unit 111 selects a request message embedded with an ID of a transmission destination based on, for example, the above-described message queue and transmission destination list, and passes the request message to the message processing unit 112 (step S102). Then, the message processing unit 112 transmits the request message to an ECU 2 by sending out a request message addressed to the ECU 2 to the network bus 5 via the bus I/F 160 (step S103).

After that, when a response message is transmitted from an ECU 2, the message processing unit 112 receives the response message via the bus I/F 160 and extracts data from the received response message (step S104). The data extracted from the response message by the message processing unit 112 is passed to the signature generation unit 114 via the data transfer unit 113.

Next, the signature generation unit 114 reads a key for a signature from the key management unit 115 (step S105), calculates the signature of the data received from the data transfer unit 113 by using the key (step S106), and passes the data and signature to the data transfer unit 113. The data transfer unit 113 passes, to the data access processing unit 116, the data and signature received from the signature generation unit 114 together with a write command. The data access processing unit 116 determines a physical address of a write destination for the data and signature in accordance with the write command (step S107), and passes the physical address of the write destination for the data and signature to the data accumulation unit 180. The data accumulation unit 180 stores the data and signature received from the data access processing unit 116 in an area indicated by the physical address of the write destination (step S108).

Figure 5:
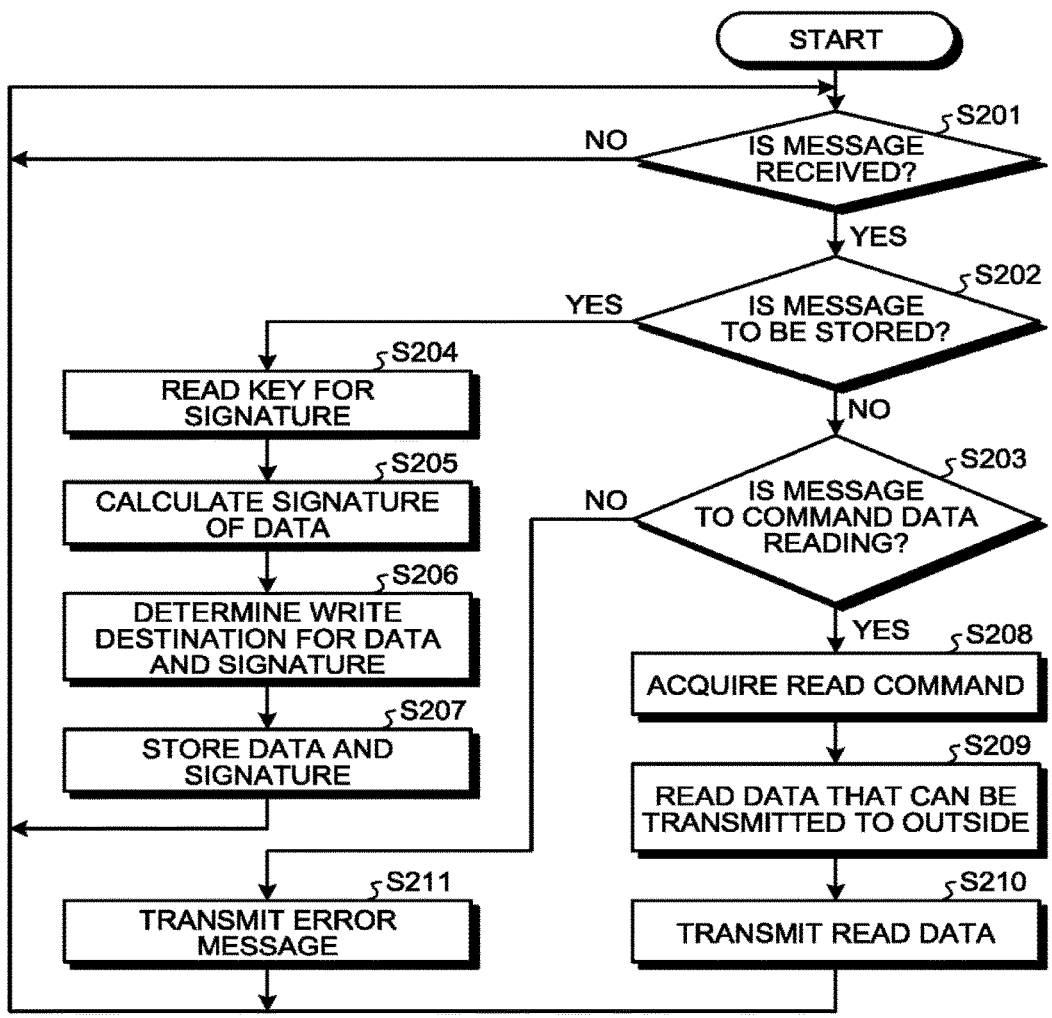
FIG. 5 is a flowchart illustrating an exemplary processing procedure by the data storage device according to the first embodiment.

FIG. 5 is a flowchart illustrating an exemplary processing procedure by the data storage device 100 according to the present embodiment and is a summarized example of processing operation of the data storage device 100 at the time of receiving a message. A series of the processing illustrated in the flowchart of FIG. 5 is repeatedly executed every time the bus I/F 160 receives a message flowing in the network bus 5.

The bus I/F 160 passes a received message to the message processing unit 112 upon receipt of the message flowing in the network bus 5 (step S201: Yes). The message processing unit 112 checks whether the received message is a message to be stored or a message to command data reading (steps S202, S203). In the case of receiving a message to be stored (step S202: Yes), the message processing unit 112 passes data included in the message to the data transfer unit 113, and the data transfer unit 113 passes the received data to the signature generation unit 114.

Upon receipt of the data from the data transfer unit 113, the signature generation unit 114 reads a key for a signature from the key management unit 115 (step S204), calculates the signature of the received data (step S205), and passes the data and signature to the data transfer unit 113. The data transfer unit 113 transmits the data, the signature, and a write command to the data access processing unit 116. Upon receipt of the data, signature, and write command from the data transfer unit 113, the data access processing unit 116 determines a physical address to be a write destination for the data and signature in accordance with the write command (step S206), and passes the physical address of the write destination for the data and signature to the data accumulation unit 180. At this point, the data access processing unit 116 records a fact that the data is already written in the area indicated by the physical address designated as the write destination, and the physical address is prevented from being designated as a write destination again for subsequent data so as to prevent the data from being overwritten. The data accumulation unit 180 stores the data and signature received from the data access processing unit 116 in the area indicated by the physical address of the write destination (step S207).

On the other hand, in the case of receiving a message to command data reading (step S203: Yes), performed is processing to read data from the data accumulation unit 180 in accordance with the read command and output the data to the network bus 5 from the data storage device 100. Specifically, the message processing unit 112 acquires a read command from the message to command data reading, and passes the same to the data transfer unit 113 (step S208). The data transfer unit 113 attaches metadata indicating the outside to the read command received from the outside, and passes the same to the data access processing unit 116. Considering from the metadata that the read command is received from the outside, the data access processing unit 116 creates, from this read command, a read command avoiding recorded data that cannot be transmitted to the outside, and passes the read command to the data accumulation unit 180. The data accumulation unit 180 reads data in accordance with the read command and passes the same to the data access processing unit 116 (step S209). The data access processing unit 116 passes the read data to the data transfer unit 113. The data transfer unit 113 passes the data received from the data access processing unit 116 to the message processing unit 112. The message processing unit 112 converts the data received from the data transfer unit 113 to a message format and transmits the same to the network bus 5 via the bus I/F 160 (step S210).

Additionally, in the case where the received message is neither a message to be stored nor a message to command data reading (step S202; No and step S203: No), the message processing unit 112 generates an error message addressed to a transmission source of the message, and transmits the error message to the network bus 5 via the bus I/F 160 (step S211).

The above-described configuration of the present embodiment described is particularly effective in reducing a cost at the time of mounting the data storage device 100 on the in-vehicle network 1. It is assumed that a communication protocol used in the in-vehicle network 1 has a low-speed and low-cost design and communication can be stably and surely performed with a plurality of communication partners. On the other hand, an interface used in a general data storage device in the related art, such as an SSD or a memory card, is directed to high-speed communication on a one-to-one basis. Since a design concept is different between the in-vehicle network 1 and the interface of the general data storage device, in the case of connecting a general data storage device to the in-vehicle network 1, it is necessary to have a host that includes a CPU to control the data storage device and has a function to provide connection to the in-vehicle network 1.

In contrast, the data storage device 100 according to the present embodiment is compatible with the interface for the in-vehicle network 1, the communication protocol, and the standardized ECU diagnostic standards respectively, and can spontaneously acquire data from an ECU 2 and the like on the in-vehicle network 1 and accumulate the data without having a host CPU. Additionally, since the processor 110 used in the data storage device 100 according to the present embodiment is specialized in specific processing and reduces the number of functions to be provided for general purposes, a cost can be effectively reduced.

Furthermore, the data storage device 100 according to the present embodiment includes a host program to transmit and receive a message to/from the bus I/F 160 connected to the network bus 5. Additionally, the host program is a small-sized program dedicated to data collection. Therefore, vulnerability is hardly included, and it is effective in reducing a risk to alter data stored in the data accumulation unit 180. In the case where there is an external host having a plurality of functions, there may be a risk that the size of the host program of the external host is increased and vulnerability tends to be included.

Furthermore, the configuration of the data storage device 100 according to the present embodiment is also effective in reducing a management cost for a key used for a signature. In the case where the host (ECU) to collect data is separated from the data storage device and the host and the data storage device are connected by a general-purpose interface like the configuration in the related art, there may be a risk that when a key is stored in the data storage device, the data storage device is removed and data including a secret key is taken out via the general-purpose interface having no access restricting function. Therefore, normally, a key is not stored in the data storage device that can be easily separated, and a key is safely stored by using dedicated hardware such as a TPM.

However, in the configuration where the data storage device 100 includes the key management unit 115 like the present embodiment, a key is stored in an area of the data accumulation unit 180 subjected to access restriction. Therefore, the data storage device 100 is prevented from being removed and a key can be prevented from being extracted.

Therefore, a key can be safely stored without using any dedicated hardware, the cost is effectively reduced. Such an effect is effective not only in safely storing a key but also in preventing the data stored without being signed from being unintentionally read as described later. Furthermore, when verification of the data stored in the data storage device 100 is needed, a public key for signature verification can be immediately obtained because the public key for signature verification is also held in the data storage device 100. Therefore, a management cost for the key used for signature verification is effectively reduced.

Additionally, in the present embodiment, there is also an advantage that the data storage device 100 can be easily connected to an in-vehicle network of a different vehicle by having the signature function including a key in the data storage device 100. Since the data storage device 100 can independently generate a signature, a signature can be attached to data by constantly using the same signature method regardless of an environment of a connection destination. Therefore, since data can be verified by constantly using the same public key even when a connection destination is changed, the data can be easily verified. In the case where the host (ECU) is separated from the data storage device and the host has a signature function like the related art, the host may have a different signature method or may not have a signature function depending on a connected vehicle. When only the data storage device is moved to another vehicle, in the case where the vehicle is in an offline state, a public key held by a host previously connected may be hardly found and condition of signature may be varied by data. As a result, data verification becomes difficult.

Additionally, in the event of abnormality at the time of storing data, there is also an effect that a place having a problem can be easily divided. In the case of having the configuration in which transmission and receipt of a message is performed by the host (ECU) and data included in the message is stored in a data storage device different from the host, in the event of abnormality at the time of storing the data, it is necessary to identify whether a cause of the abnormality exists on the host side or the data storage device side. Specifically, abnormality may occur in following cases such as a case where sudden power interruption occurs in either the host or the data storage device and data being written is lost, and a case where data is garbled due to noise on a communication path connecting the data storage device to the host and abnormal data is written. In both of the cases, it is necessary to investigate both the host and the data storage device in order to identify a cause of losing the writing data or having the abnormal data written. However, in the case where a manufacturer of the host differs from that of the data storage device, the cause can be hardly traced without cooperation of both of the manufacturers. Similarly, in the case where abnormality occurs at a place located in neither the host nor the data storage device like noise on a communication path, a cause may be more hardly traced. Additionally, even when an interface of the host is designed based on interface standards of the data storage device, abnormality may be caused due to a detailed implementation difference (compatibility) which is not clarified in the standards.

In contrast, in the data storage device 100 according to the present embodiment, a function to perform transmission and receipt of a message and the data accumulation unit 180 to store data are integrated, and have a common manufacturer. Therefore, even in the event of abnormality at the time of storing data, a cause is easily traced because the cause exists in the data storage device 100 and the cause can be identified by the same manufacturer. In a use required to have high reliability like the in-vehicle network 1, it is particularly important that a cause can be easily identified.

Meanwhile, in the present embodiment, provided is an example in which the data storage device 100 transmits a request message to an ECU 2 in order to acquire diagnostic information from the ECU 2 and accumulate the same. However, a point of the present embodiment is to enable the data storage device 100 to spontaneously collect data from the in-vehicle network 1 and accumulate that same, and not limited to the example of transmitting a request message to an ECU 2 in order to request diagnostic information. For example, even when a message that is not an ID to be processed by the data storage device 100 is acquired, the bus I/F 160 does not discard the message and notifies the processor 110 of reception of the message, thereby achieving setting in which a message other than a response message addressed to the data storage device 100 is received. Spontaneous processing performed by the data storage device 100 also includes: receiving all of the messages flowing in the network bus 5 regardless of an ID of a message by utilizing such a function; and acquiring a control message to be transmitted and received between ECUs 2 to accumulate the same in the data accumulation unit 180.

Modified Example

In the above-described first embodiment, a signature is attached to data included in a message received from an ECU 2 and stored in the data accumulation unit 180. However, another possible configuration is that data included in the message and received from the ECU 2 is stored without being signed in the data accumulation unit 180, and the unsigned data may be read from the data accumulation unit 180 and attached with a signature when a usage rate of the processor 110 is low.

Figure 6:
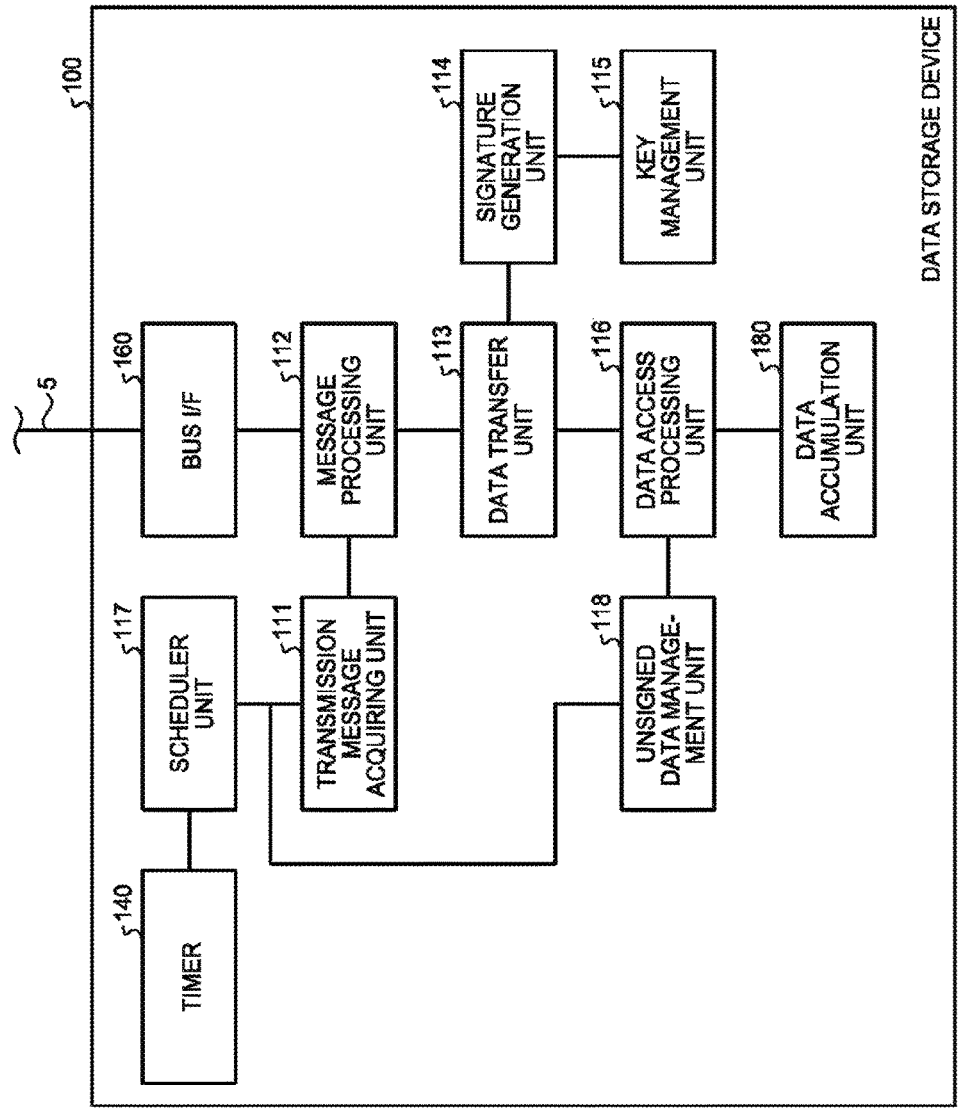
FIG. 6 is a block diagram illustrating an exemplary functional configuration of a data storage device according to a modified example of the first embodiment.

FIG. 6 is a block diagram illustrating an exemplary functional configuration of the data storage device 100 according to the present modified example. A difference from the configuration of the first embodiment illustrated in FIG. 3 is that a scheduler unit 117 and an unsigned data management unit 118 are added.

The scheduler unit 117 is a processing unit to determine processing to be performed next at the time of receiving a timer interruption. Specifically, a command is provided on whether to transmit a request message or calculate a signature in accordance with the usage rate of the processor 110. Note that a criterion to determine the processing to be performed next is not limited to the usage rate of the processor 110, but determination may be made based on a predetermined schedule. Furthermore, the processing to be performed next is not limited to two processing including transmission of a request message and calculation of a signature, and other processing may also be included.

The unsigned data management unit 118 is a processing unit to manage unsigned data stored in the data accumulation unit 180. The unsigned data management unit 118 receives write destination information of the data to be stored without attachment of a signature in the data accumulation unit 180 from the data access processing unit 116, and records the same. Upon receipt of a command to calculate a signature from the scheduler unit 117, the unsigned data management unit 118 passes, to the data access processing unit 116, the write destination information of the unsigned data to be managed. At the same time, the unsigned data management unit determines that a signature is attached to the unsigned data, and deletes the write destination information of the unsigned data. Note that the unsigned data management unit 118 may pass the write destination information of the unsigned data to be managed in response to a request from the data access processing unit 116. Additionally, the number of pieces of the write destination information of the unsigned data is not limited to one, and a plurality of pieces thereof may be recorded.

Figure 7:
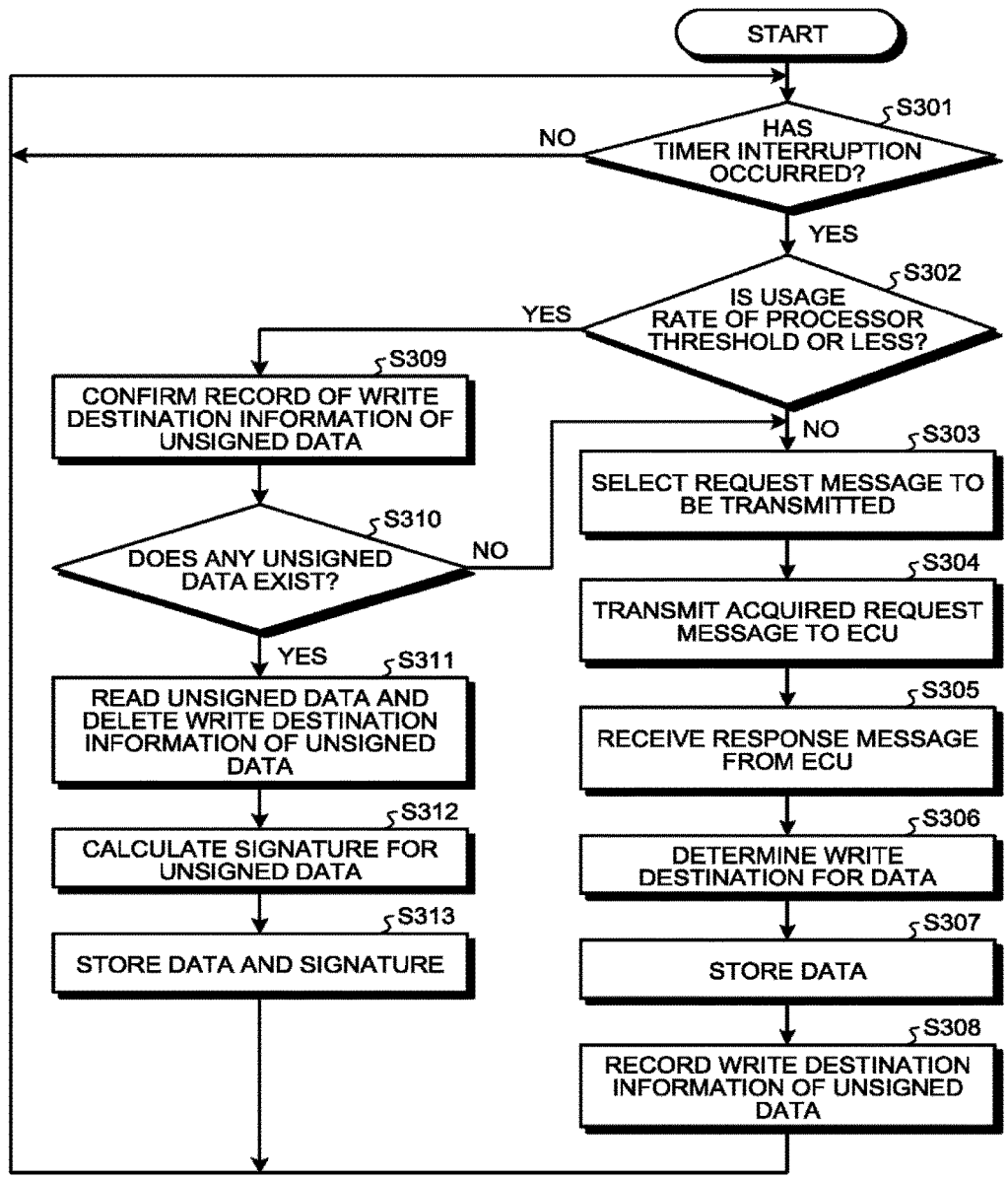
FIG. 7 is a flowchart illustrating an exemplary processing procedure by the data storage device according to the modified example of the first embodiment.

FIG. 7 is a flowchart illustrating an exemplary processing procedure by the data storage device 100 according to the present modified example. A series of the processing illustrated in the flowchart of FIG. 7 is repeatedly executed every time the processor 110 receives an interruption notification from the timer 140.

The processor 110 notifies the scheduler unit 117 of a timer interruption notification upon receipt of the interruption notification from the timer 140 (step S301: Yes). Upon receipt of the timer interruption notification, the scheduler unit 117 confirms the usage rate of the processor 110 and determines whether the usage rate of the processor 110 is a predetermined threshold or less (step S302). Then, in the case where the usage rate of the processor 110 exceeds the threshold (step S302: No), a command is provided to the transmission message acquiring unit 111 to select a request message.

The transmission message acquiring unit 111 selects a request message to be transmitted based on, for example, the above-mentioned transmission destination list in accordance with the command from the scheduler unit 117, and passes the request message to the message processing unit 112 (step S303). Then, the message processing unit 112 transmits, to an ECU 2, the request message addressed to the ECU 2 by sending out the request message to the network bus 5 via the bus I/F 160 (step S304).

After that, when a response message is transmitted from the ECU 2, the message processing unit 112 receives the response message via the bus I/F 160 and extracts data from the received response message (step S305). The data extracted from the response message by the message processing unit 112 is passed to the data access processing unit 116 via the data transfer unit 113. At this point, the data transfer unit 113 attaches, to the data extracted from the response message, metadata indicating an unsigned state and, passes the data to the data access processing unit 116.

Upon receipt of the unsigned data from the data transfer unit 113, the data access processing unit 116 determines a physical address of a write destination for this unsigned data (step S306), and passes the unsigned data and the physical address of the write destination to the data accumulation unit 180, and further transmits write destination information indicating the physical address of the write destination for the unsigned data to the unsigned data management unit 118. The data accumulation unit 180 stores the unsigned data received from the data access processing unit 116 in an area indicated by the physical address of the write destination (step S307). Additionally, the unsigned data management unit 118 records the write destination information of the unsigned data received from the data access processing unit 116 (step S308).

On the other hand, in the case of determining that the usage rate of the processor 110 is the threshold or less in step S302 that (step S302: Yes), the scheduler unit 117 commands the unsigned data management unit 118 to attach a signature to the unsigned data.

The unsigned data management unit 118 first confirms record of the write destination information of the unsigned data held by itself in accordance with the command of the scheduler unit 117 (step S309), and determines whether any unsigned data exists (step S310). Then, in the case where unsigned data exists (step S310: Yes), the unsigned data management unit 118 converts the write destination information of the unsigned data to a read command, and attaches metadata indicating that the read command is internally generated, and passes the read command to the data access processing unit 116.

The data access processing unit 116 discerns, from the metadata, a fact that the read command received from the unsigned data management unit 118 is internally generated, determines that the unsigned data can be read, and read the unsigned data from the data accumulation unit 180 based on this read command, and then passes the same to the data transfer unit 113. Additionally, the unsigned data management unit 118 deletes the write destination information of the unsigned data read from the data accumulation unit 180 (step S311).

The data transfer unit 113 refers to the metadata of the data received from the data access processing unit 116, recognizes the fact that the data is the unsigned data, and passes the data to the signature generation unit 114. The signature generation unit 114 calculates a signature of the data received from the data transfer unit 113, and passes the data and signature to the data transfer unit 113 (step S312). The data transfer unit 113 passes, to the data access processing unit 116, the data and signature received from the signature generation unit 114 together with a write command. The data access processing unit 116 determines a physical address of a write destination for the data and signature in accordance with the write command, and passes the physical address of the write destination for the data ad signature to the data accumulation unit 180. The data accumulation unit 180 stores the data and signature received from the data access processing unit 116 in an area indicated by the physical address of the write destination (step S313).

Meanwhile, in the case of determining that the unsigned data does not exist in step S310 (step S310: No), the unsigned data management unit 118 notifies the scheduler unit 117 of absence of the unsigned data. In this case, the scheduler unit 117 commands the transmission message acquiring unit 111 to select a request message, thereby performing the processing in step S303 and subsequent thereto.

The above-described configuration of the present modified example is effective in the case where processing performance of the processor 110 is low and a signature cannot be constantly calculated every time the message processing unit 112 passes data included in a received message to the data access processing unit 116. In the case of having a configuration in which a signature is calculated every time a message is received, the processor 110 is required to have performance high enough to calculate a signature according to a maximum value of the number of times of message transmission and reception per unit time, and a manufacturing cost for the data storage device 100 is increased. Alternatively, when performance of the processor 110 is low, there may be a risk that time is taken to calculate a signature and omission of message reception is caused. In contrast, since data included in a received message is stored without being signed in the data accumulation unit 180 and timing to calculate a signature is shifted as described in the present modified example, the processor 110 is only needed to have performance which may not cause omission of message reception. As a result, the processor 110 is not required to have high performance so as to constantly calculate a signature of data included in a received message, and the manufacturing cost for the data storage device 100 can be reduced.

In the above-described modified example, it is assumed that data included in a received message is stored without being signed in the data accumulation unit 180, however; the processing may be switched, in accordance with the usage rate of the processor 110, between a case of storing data included in a received message in the data accumulation unit 180 after attaching a signature and a case of attaching a signature after storing data without being signed in the data accumulation unit 180. In other words, the usage rate of the processor 110 is confirmed at the time of receiving a message, and when there is room, processing to store data in the data accumulation unit 180 may be performed after attaching a signature to data included in the message as illustrated in FIG. 4, and when there is no room to calculate a signature, the data included in the message may be stored without being signed in the data accumulation unit 180 and then the processing to attach a signature may be performed later as illustrated in FIG. 7.

The configuration to thus switch timing to attach a signature in accordance with the usage rate of the processor 110 is effective in reducing a processing time required to attach a signature to data while processing performance required for the data storage device 100 is kept low. In other words, in the case of having the configuration in which data included in a received message is stored without being signed in the data accumulation unit 180, a processing time is elongated because reading the unsigned data and writing a signature are constantly required. On the other hand, in the case of having the configuration in which timing to attach a signature is switched in accordance with the usage rate of the processor 110, when there is room in the processor 110 at the time of receiving a message, a signature is attached before writing. Therefore, reading unsigned data and signature writing can be omitted. In other words, switching the processing in accordance with the usage rate of the processor 110 brings advantages in which the processing performance required for the processor 110 can be more lowered than in the case of performing the processing illustrated in FIG. 4, and the time required for the processing to attach a signature to data can be more shortened than in the case of constantly performing the processing illustrated in FIG. 7.

Second Embodiment

Next, a second embodiment will be described. In a first embodiment described above, described is a configuration in which a data storage device 100 spontaneously transmits a request message to an ECU 2, acquires and accumulates setting information and an operation state, a diagnosis result, and the like of the ECU 2. Here, in the first embodiment described above, the request message transmitted by the data storage device 100 is sequentially selected from among a fixed set regardless of a state of a vehicle V. The technique is assumed for a use of periodically collecting predetermined data (such as in monitoring a state of an ECU 2).

In contrast, in the second embodiment, described is a configuration having a function to switch a request message transmitted by the data storage device 100 in accordance with condition. For example, a request message suitable for a vehicle V mounted with the data storage device 100 is selected, or data necessary to identify a cause of an abnormal state is selected and collected in accordance with the abnormal state of an ECU 2. Specifically, an occurrence place of abnormality and condition of the abnormality can be grasped from a response message including a diagnosis result, but a cause of the abnormality cannot be grasped. Therefore, when not only data indicating occurrence of abnormality can be acquired and accumulated but also information to investigate a cause of the abnormality can be acquired and accumulated in the event of abnormality, it would be useful to early detect a cause of failure and repair the vehicle V.

To identify a cause of an abnormal state, it is necessary to collect, for comprehensive determination, not only a function and an ECU 2 where abnormality has occurred but also states of other functions and states of peripheral ECUs 2. For example, in the case where there is no ECU 2 to control a generator (alternator) mounted on the vehicle V, there is no way to directly detect failure of the generator. However, battery voltage drop at an ECU 2 occurs as an abnormal state by not charging a battery. In this case, when battery voltage drop of an ECU 2 occurs not only in one ECU 2 but also in other ECUs 2 connected to a common battery, it is possible to grasp that the abnormality is not caused by failure of the ECU 2 but by abnormality in the battery or the generator with a high possibility. Therefore, in the event of abnormality such as battery voltage drop in an ECU 2, accuracy to identify a cause of the abnormal state can be improved by collecting and recording battery voltage of other ECUs 2. This is a technique applicable not only to identify a cause of battery voltage abnormality in an ECU 2 but also identify a cause of abnormal state that can be acquired by a diagnostic function of the ECU 2.

One method of achieving the above-described technique is to collect diagnosis results of all functions from all of the ECUs 2. However, a cost is increased because not only a large number of request messages and response messages flow in an in-vehicle network 1 but also storage capacity becomes enormous and a processing amount required for data accumulation becomes large. Considering the above, in the second embodiment, a function to reduce data to be collected is added by changing a request message to be transmitted in accordance with the condition in order to collect only diagnostic information that identifies a cause of failure in an abnormal state having occurred. When a set of request messages transmitted is fixed, every data is needed to be acquired, but in contrast, when the set can be dynamically changed to a set that identifies a cause of an abnormal state in accordance with the abnormal state having occurred, only required data can be collected. Therefore, transmission and receipt of unnecessary a request message and a response message can be reduced.

Now, formats of a request message and a response message will be described. In the case of exemplifying a UDS as a diagnostic protocol, a request message and a response message each have at least two areas including a service ID area and a service data area. In the service ID area, a value indicating which one of diagnostic functions is to be executed is set. In the service data area, information to distinguish a request message from a response message is recorded, and in the case of the response message, a diagnosis result is also recorded. As described above, in the case of transmitting and receiving a request message and a response message by utilizing a communication protocol between ECUs 2, transmission destinations of the request message and response message are set in ID areas in the respective messages, and the service ID area and the service data area are set in a data area in each of the messages.

Meanwhile, in the case of utilizing standards combining the communication protocol with a diagnostic protocol for an ECU, the diagnostic protocol for an ECU can include information other than a transmission destination of a message in an ID area of a message. Specifically, the ID area of a message may be divided, each of transmission destinations of a request message and a response message may be set in one of the divided ID areas, and each of transmission sources thereof may be set in the other one of the divided ID areas. In this case, the communication protocol distinguishes a transmission destination of the message by referring only to the portion of the ID area of the message where the transmission destination is set.

In the following, a set of request messages transmitted by the data storage device 100 will be referred to as a rule. The rule is formed of one or more request messages. A request message constituting the rule requests an ECU 2 for information to achieve a purpose set in the rule. For example, a rule to collect battery voltage of ECUs 2 is formed of request messages to request the ECUs 2a to 2d for battery voltage. Additionally, since a function of an ECU 2 and a configuration of an in-vehicle device are varied by a vehicle type of the vehicle V, constituents of the rule and contents of a request message constituting a rule are varied by a vehicle type.

In the second embodiment, the transmission message acquiring unit 111 has a rule (monitoring rule) in which a request message to be transmitted to an ECU 2 is described in order to confirm occurrence of abnormality in the ECU 2. The data storage device 100 transmits a request message to an ECU 2 in order to confirm occurrence of abnormality in the ECU 2 based on the monitoring rule. The data storage device 100 analyzes a response message received from the ECU 2, and in the case of detecting an abnormal state, the data storage device 100 switches the rule to a rule (identifying rule) to collect information that identifies a cause of the abnormal state. After that, the data storage device 100 selects a request message to be transmitted based on the rule after the switch. In the following, an implementation method will be described in detail.

FIG. 8 is a block diagram illustrating an exemplary functional configuration of the data storage device 100 according to the second embodiment. A difference from the configuration of the first embodiment illustrated in FIG. 3 is that a data monitoring unit 119 and a rule management unit 120 are added.

The data monitoring unit 119 receives a response message transmitted by an ECU 2 from the message processing unit 112 and checks occurrence of abnormality in the ECU 2 and an in-vehicle device. Specifically, a service ID and data in the response message are analyzed. In the case where abnormality has occurred, content of the abnormality having occurred is passed to the rule management unit 120. In the case where no abnormality has occurred, the data monitoring unit 119 does not pass anything to the rule management unit 120 and analyzes a next response message.

Here, during analysis of abnormality, the data monitoring unit 119 may analyze a plurality of messages received from a certain ECU 2 or may analyze a message received from each of a plurality of ECUs 2 in addition to analysis on only one message. Further, the data monitoring unit 119 may detect not only occurrence of an abnormal state but also a state of the vehicle V by analyzing a response message. For example, a state that an ECU 2 cannot process a request message may be detected from a response message indicating that diagnosis cannot be executed, or a state that an ECU 2 cannot receive a request message may be detected from a fact that it takes too long time to receive a response message or a timer has timed out. In this case, such information is notified to the rule management unit 120, and the rule management unit 120 may be triggered to switch a rule in the transmission message acquiring unit 111 as described later.

When the data monitoring unit 119 detects an abnormal state, the rule management unit 120 switches a rule currently set in the transmission message acquiring unit 111 to a rule (identifying rule) to collect information necessary to identify a cause of the abnormal state. The rule management unit 120 stores an association relationship between an abnormal state having occurred and an identifying rule. FIG. 9 illustrates an exemplary association relationship between an abnormal state and an identifying rule held by the rule management unit 120. Upon receipt of contents of an abnormal state notified from the data monitoring unit 119, the rule management unit 120 refers to, for example, the association relationship illustrated in FIG. 9, selects an identifying rule to collect information necessary to identify a cause of the abnormal state, and passes the same to the transmission message acquiring unit 111. Upon receipt of the identifying rule from the rule management unit 120, the transmission message acquiring unit 111 switches a rule currently set to the identifying rule received from the rule management unit 120.

Meanwhile, timing when the rule management unit 120 switches a rule may be not be limited to only occurrence of abnormality but also after all of request messages held by the identifying rule are transmitted. For example, when all of the request messages held by the identifying rule currently set are transmitted, the transmission message acquiring unit 111 switches the rule to a monitoring rule to check whether any abnormal state is occurring, or switches the rule to a monitoring rule in accordance with the condition of the vehicle V. Additionally, it can be considered that a request message that can be received by an ECU 2 is changed immediately after an engine has started, during engine stop, during low-speed traveling, during high-speed traveling, or the like of the vehicle V, and also an ECU 2 to be monitored, a function held by an ECU 2, and an in-vehicle device are different. In such cases, the data storage device 100 may have a plurality of monitoring rules matching states of the vehicle V, and acquire a state of the vehicle V from a control message or a response message, and switch a rule to a monitoring rule matching it. Consequently, transmission of a request message which an ECU 2 cannot receive can be reduced in advance.

The rules managed by the rule management unit 120 may be held by the rule management unit 120 itself or may be stored in the data accumulation unit 180. In the case where the rules are stored in the data accumulation unit 180, it is necessary to read the rules from the data accumulation unit 180 via the data access processing unit 116.

FIG. 10 is a flowchart illustrating an exemplary processing procedure by the data storage device 100 according to the present embodiment and is a summarized example of processing operation to switch a rule to a rule to collect data necessary to identify a cause of an abnormal state when occurrence of the abnormal state is detected. In the processing illustrated in the flowchart of FIG. 10, processing to check occurrence of abnormality from a response message received by the message processing unit 112 and switch the rule is added to processing illustrated in a flowchart of FIG. 4. This added processing is performed in parallel to processing from step S105 to step S108 in FIG. 4 (processing after data of a response message is passed to the data transfer unit 113) after step S104 in FIG. 4, and there is no temporal context between both of the processing. In the following, only added processing will be described.

The message processing unit 112 of the present embodiment passes a response message to the data monitoring unit 119 in addition to passing data of the response message to the data transfer unit 113. Upon receipt of the response message from the message processing unit 112, the data monitoring unit 119 confirms whether a rule currently set is a monitoring rule (step S401), and in the case of the monitoring rule (step S401: Yes), the data monitoring unit 119 analyzes the response message received from the message processing unit 112 and checks occurrence of an abnormal state (step S402). Here, in the case where no abnormal state has occurred (step S402: No), whether a transmitted request message is a final request message is confirmed (step S403), and in the case of being the final request message (step S403: Yes), a request message to be transmitted next is returned to a first message of the monitoring rule (step S404), and the processing returns to step S101 of FIG. 4. On the other hand, in the case where the transmitted request message is not the final request message (step S403: No), the processing returns to step S101 of FIG. 4 without any action.

Additionally, in the case of determining that an abnormal state has occurred in step S402 (step S402: Yes), the data monitoring unit 119 analyzes contents of the abnormal state from the response message, and passes the same to the rule management unit 120. The rule management unit 120 selects an identifying rule associated with the contents of the received abnormal state, namely, a rule necessary to identify a cause of the abnormal state having occurred, and passes the identifying rule to the transmission message acquiring unit 111. The transmission message acquiring unit 111 switches the monitoring rule currently set to the identifying rule received from the rule management unit 120 (step S405), and the processing returns to step S101 of FIG. 4.

Furthermore, in the case where the rule currently set is not the monitoring rule, in other words, in the case where the identifying rule is set (step S401: No), the data monitoring unit 119 confirms whether the transmitted request message is the final request message of the identifying rule (step S406). In the case of the last request message (step S406: Yes), the identifying rule currently set in the transmission message acquiring unit 111 is switched to the monitoring rule (step S407). Then, the message processing unit 112 transmits a command message to an ECU 2 having output an abnormal state via the bus I/F 160 so as not to output the detected abnormal state again (step S408), and the processing returns to step S101 in FIG. 4. On the other hand, in the case where the transmitted request message is not the final request message of the identifying rule (step S406: No), the processing directly returns to step S101 in FIG. 4. Meanwhile, as a method not to detect again an abnormal state for which a cause has been identified, a request message to check the concerned abnormal state may be deleted from the monitoring rules so as not to be transmitted again.

Additionally, in the case where the rules managed by the rule management unit 120 are kept in the data accumulation unit 180, a procedure to switch a rule will be as follows. The rule management unit 120 passes a command to read a rule from the data accumulation unit 180 to the data access processing unit 116 via the data transfer unit 113. The data access processing unit 116 passes a read command to the data accumulation unit 180. The data accumulation unit 180 reads a rule in accordance with the read command and passes the same to the data access processing unit 116. The data access processing unit 116 passes the rule read from the data accumulation unit 180 to the rule management unit 120 via the data transfer unit 113. The rule management unit 120 passes the rule to the transmission message acquiring unit 111, and the transmission message acquiring unit 111 switches the rule currently set to the rule received from the rule management unit 120.

The configuration like the present embodiment in which a state of an ECU 2 is grasped by the data monitoring unit 119 and a rule associated with an abnormal state of an ECU 2 is set by the rule management unit 120 is particularly useful in reducing storage capacity required in the data storage device 100, reducing unnecessary request message/response message transmitted and received by an ECU 2, and reducing a load by reducing unnecessary messages flowing in the in-vehicle network 1. In other words, data necessary to identify a cause of an abnormal state can be collected by transmitting every request message and receiving every response message in order to constantly acquire data related to an abnormal state in preparation for abnormality occurrence. However, in this case, a large amount of data not related to identification of a cause of abnormality having occurred is included. Therefore, an extra load is imposed on the data storage device 100, an ECU 2, and the in-vehicle network 1 to transmit an unnecessary request message and receive an unnecessary response message. Furthermore, unnecessary data to record an unnecessary response message is recorded in the data storage device 100. In contrast, like the present embodiment, in the case of having the configuration in which only data according to a state of an ECU 2 is collected, an unnecessary request message and an unnecessary response message transmitted and received to/from the data storage device 100, ECU 2, and in-vehicle network 1 can be reduced and the storage capacity of the data storage device 100 can be reduced.

Modified Example

In the above-described second embodiment, a rule is switched at the time of detecting occurrence of an abnormal state. However, a rule may be switched also at the time of changing a connection destination of the data storage device 100. In other words, in the present modified example, the rule is automatically switched such that a request message is transmitted in accordance with a connection destination vehicle type at the time of changing a connection destination of the data storage device 100.

Figure 11:
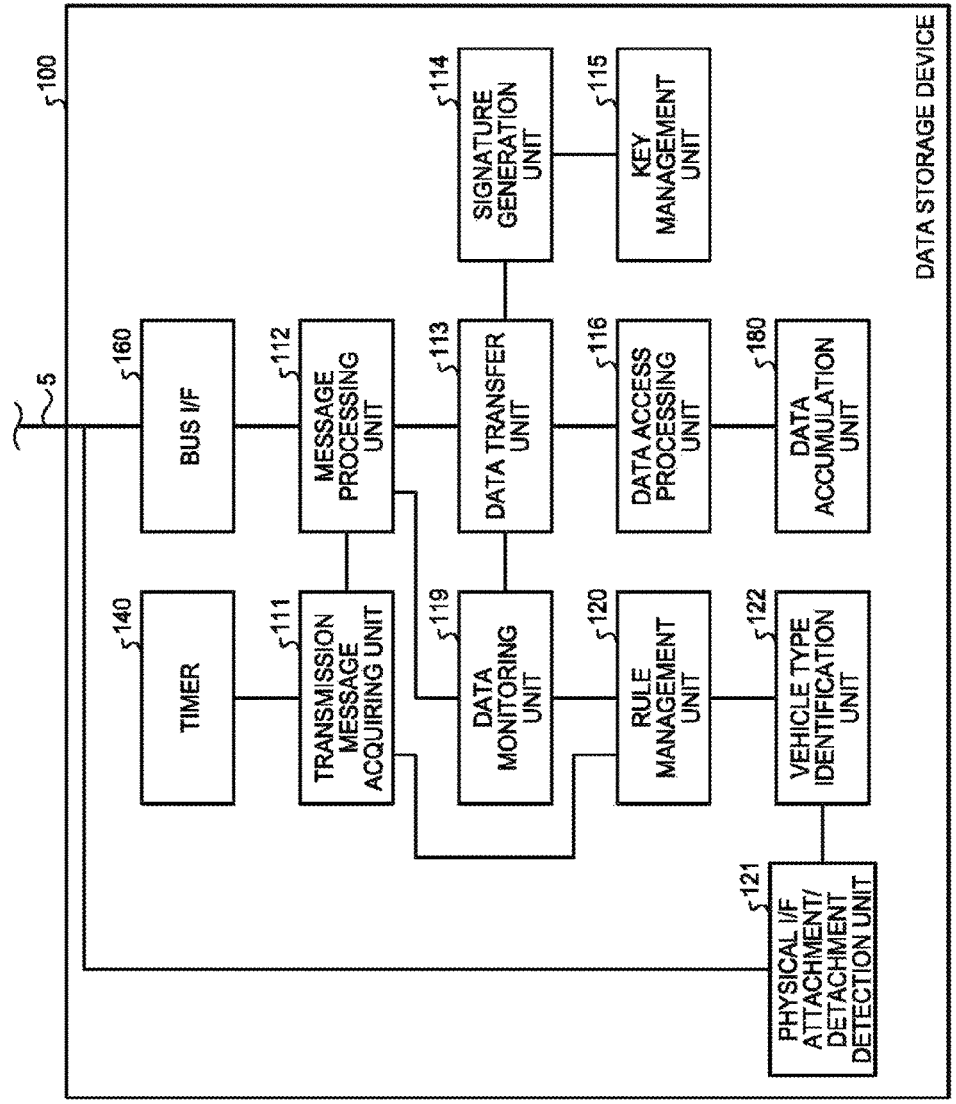
FIG. 11 is a block diagram illustrating an exemplary functional configuration of a data storage device according to a modified example of the second embodiment.

FIG. 11 is a block diagram illustrating an exemplary functional configuration of the data storage device 100 according to the present modified example. A difference from the configuration of the second embodiment illustrated in FIG. 8 is that a physical I/F attachment/detachment detection unit 121 and a vehicle type identification unit 122 are added.

The data storage device 100 according to the present modified example changes a rule set managed by the rule management unit 120 to a rule set associated with a connection destination vehicle type at the time of changing a connection destination of the data storage device 100. Here, the rule set indicates a set including a monitoring rule and identifying rules, and a different rule set is set for each vehicle type. FIGS. 12A and 12B illustrate an exemplary association relationship between a rule set and a rule and an exemplary association relationship between a vehicle type and a rule set. FIG. 12A illustrates the association relationship between a rule set and a rule, and FIG. 12B illustrates the association relationship between a vehicle type and a rule set.

The physical I/F attachment/detachment detection unit 121 is a processing unit to detect attachment/detachment of a physical interface. Upon detection of attachment/detachment of the physical interface, the physical I/F attachment/detachment detection unit 121 notifies the vehicle type identification unit 122 of a signal indicating that the physical interface is attached/detached. As an exemplary method of detecting attachment/detachment of the physical interface, the physical I/F attachment/detachment detection unit 121 may constantly monitor power supply voltage supplied from the physical interface connected to the data storage device 100 and detect attachment/detachment of the physical interface in accordance with change in the power supply voltage. Additionally, an attachment/detachment detecting method other than the above may also be used.

The vehicle type identification unit 122 is a processing unit to acquire information to identify a vehicle type connected to the data storage device 100. When the vehicle type identification unit 122 receives a signal indicating that the physical interface is attached/detached from the physical I/F attachment/detachment detection unit 121, a message to request vehicle type information to be a connection destination of the data storage device 100 is sent out from the bus I/F 160 to the network bus 5 via the message processing unit 112 in order to acquire information to identify a vehicle type. Upon acquisition of the information related to the connection destination vehicle type, the vehicle type identification unit 122 passes the information to the rule management unit 120. Meanwhile, an exemplary method of acquiring the vehicle type information may be a method of acquiring vehicle type information held by an external memory capable of communicating with an ECU 2 or the data storage device 100 via a bus, a method of determining a vehicle type by receiving a response message from each of an ECU 2 unique to a vehicle type and a device constituting a vehicle controlled by the ECU 2, or a method of transmitting vehicle type information from an external device to the data storage device 100. Additionally, a connection destination vehicle type may be identified by utilizing a fact that a configuration of an ECU 2 and a configuration of a bus are varied by a vehicle type.

Figure 13:
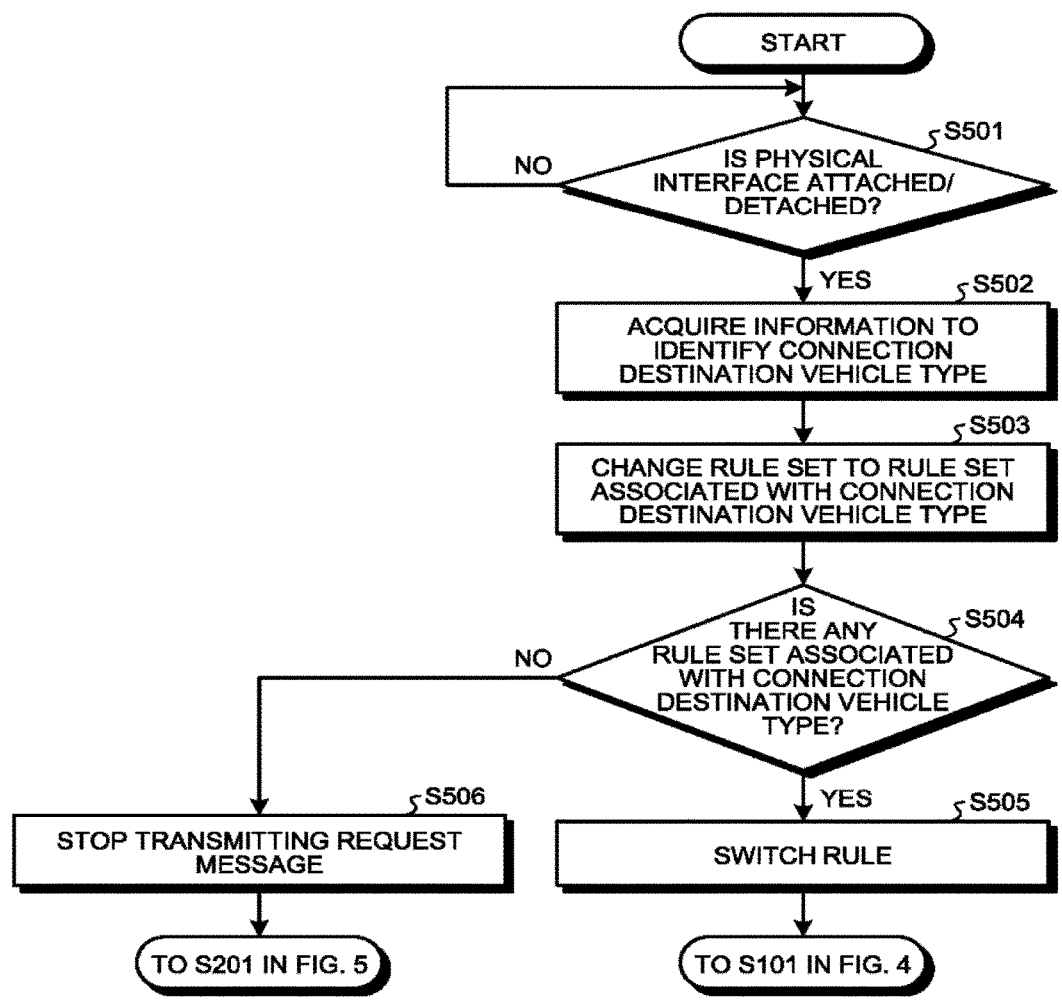
FIG. 13 is a flowchart illustrating an exemplary processing procedure by the data storage device according to the modified example of the second embodiment.

FIG. 13 is a flowchart illustrating an exemplary processing procedure by the data storage device 100 according to the present modified example and is a summarized example of processing operation to identify a connection destination vehicle type and switch a rule to a rule associated with a vehicle type at the time of detecting attachment/detachment of the physical interface.

First, when the physical I/F attachment/detachment detection unit 121 detects attachment/detachment of the physical interface (step S501: Yes), the physical I/F attachment/detachment detection unit 121 notifies the vehicle type identification unit 122 of attachment/detachment of the physical interface. In response to this notification, the vehicle type identification unit 122 acquires information to identify a vehicle type connected to the data storage device 100 by the above-described method, and passes the information to the rule management unit 120 (step S502).

When the information to identify the connection destination vehicle type of the data storage device 100 is acquired from the vehicle type identification unit 122, the rule management unit 120 changes a rule set managed by itself to a rule set associated with the connection destination vehicle type (step S503). Then, the rule management unit 120 performs processing to acquire a rule included in the rule set. For example, when a rule is stored in the data accumulation unit 180, the rule management unit 120 provides a command to read the rule from the data accumulation unit 180 via the data access processing unit 116. As a method of reading a rule included in a rule set associated with a connection destination vehicle type, there is a method of preliminarily storing, in the data accumulation unit 180, a rule set attached with metadata of vehicle type information, and reading the rule by designating a vehicle type. Note that there may be a case where there is no rule set associated with a connection destination vehicle type.

When there is a rule set associated with a vehicle type (step S504: Yes), a rule included in the rule set is read from the data accumulation unit 180 and transmitted from the data access processing unit 116 to the rule management unit 120 via the data transfer unit 113. Upon receipt of the rule associated with the vehicle type, the rule management unit 120 passes the rule to the transmission message acquiring unit 111. Upon receipt of the rule from the rule management unit 120, the transmission message acquiring unit 111 switches a rule currently set to the rule received from the rule management unit 120 (step S505). After that, the processing illustrated in the flowcharts of FIGS. 4 and 10 is performed.

On the other hand, in the case where there is no rule set associated with the vehicle type (step S504: No), the rule management unit 120 empties a rule in the transmission message acquiring unit 111 and stops transmitting a request message so as not to transmit a request message not associated with the connection destination vehicle type (step S506). After that, only data reading and message receiving are performed in accordance with the flowchart in FIG. 5. At this point, the data storage device 100 may notify another device of a fact of not having any rule associated with the vehicle type by sending out a message indicating the fact to the network bus 5.

The configuration of the present modified example described above is particularly useful in that a vehicle type mounted with the data storage device 100 can be easily changed without adding any revise on the data storage device 100. In other words, in the case where a configuration of an ECU 2 is varied by each vehicle type, contents of a request message to be transmitted and contents of a response message to be received are also varied, however; the data storage device 100 is easily connected to an in-vehicle network 1 mounted on a vehicle V of an arbitrary vehicle type by automatically changing a rule to a rule associated with the vehicle type mounted with the data storage device 100 in accordance with attachment/detachment of the physical interface. Furthermore, since it is possible to prevent erroneous transmission of a request message not associated with a connection destination vehicle type of the data storage device 100, transmission of an unnecessary message to the in-vehicle network 1 of the connection destination can be prevented and false operation of an ECU 2 can be prevented.

Third Embodiment

Next, a third embodiment will be described. In an above-described second embodiment, described is a configuration in which a data storage device 100 checks occurrence of abnormality in an ECU 2, and in the case of detecting an abnormal state, only data necessary to identify a cause of the abnormal state is selected and collected. In this configuration, a request message to request the ECU 2 for data indicating a current state or occurrence of abnormality is stored inside the data storage device 100 in a form of a rule. Additionally, it is assumed that a rule is preliminarily stored in a data accumulation unit 180 in a manufacturing stage before mounting the data storage device 100 on a vehicle V.

In contrast, in the third embodiment, described is a configuration in which the data storage device 100 includes a function to receive a message to update a rule from outside and update the rule stored in the data accumulation unit 180.

Figure 14:
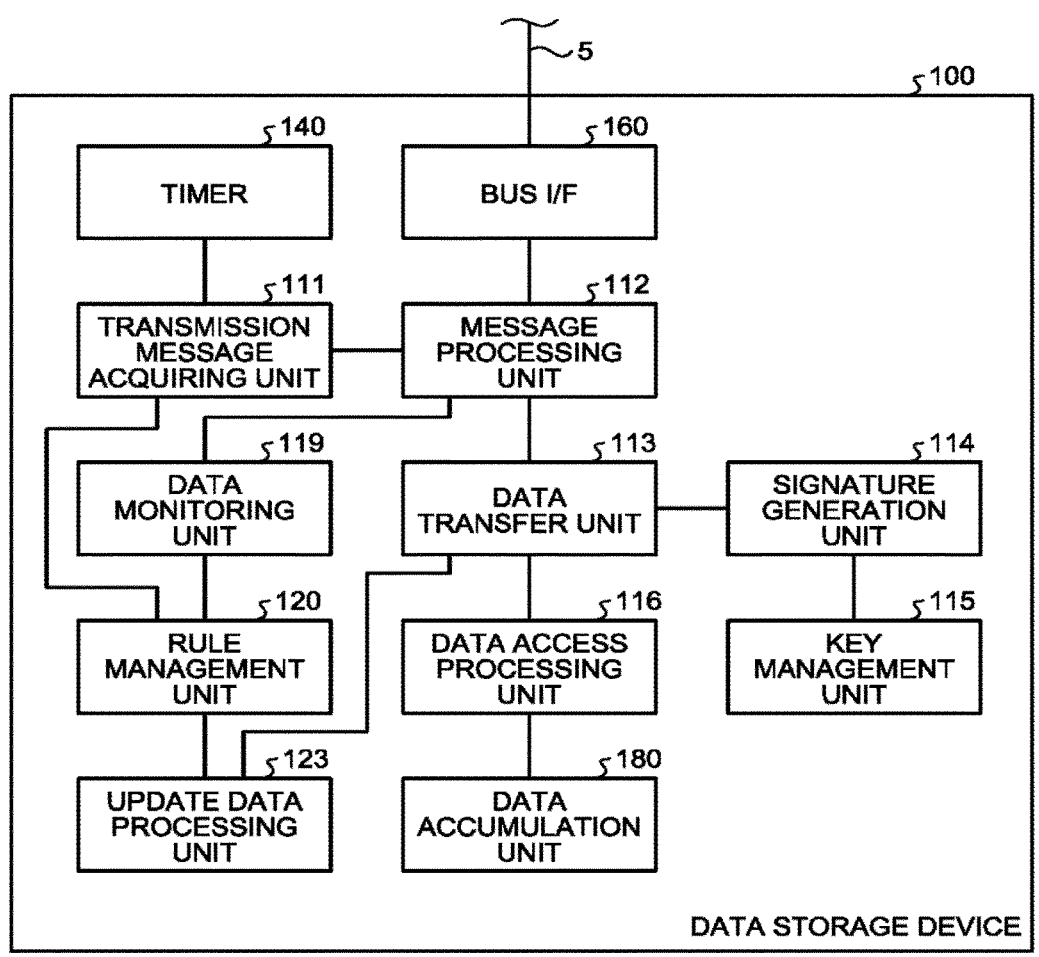
FIG. 14 is a block diagram illustrating an exemplary functional configuration of a data storage device according to a third embodiment.

FIG. 14 is a block diagram illustrating an exemplary functional configuration of the data storage device 100 according to the third embodiment. A difference from the configuration of the second embodiment illustrated in FIG. 8 is that an update data processing unit 123 is added.

The update data processing unit 123 acquires update data of a rule received via a network bus 5, checks contents of the update data, determines whether to update the rule, and updates the rule stored in the data accumulation unit 180 if there is no problem.

The update data is sent to the data storage device 100 in a format of, for example, a diagnostic protocol. In the update data, an ID indicating update data is set in a service ID area, and update target information and an update data body are set in a data area respectively. An ID indicating update data notifies the data storage device 100 of a fact that a message is not a request message requesting diagnosis but a message including data to update a rule. In the update target information, a version of a rule and a rule to be updated are described. For example, regarding a rule to be updated, contents such as whether an identifying rule held by the data storage device 100 is to be updated, entire rules are to be updated, or a new rule set is to be added is described. The data storage device 100 recognizes a rule to be updated based on the update target information and identifies a place where the rule to be updated is stored. Note that a configuration of the update data is not limited to the format according to the diagnostic protocol. For example, an own original format may also be adopted.

The update data processing unit 123 checks contents of received update data and determines whether to update an update target rule. For example, the update data processing unit 123 checks whether there is any version of update data or any update target rule, or whether a version of update data is newer than that of an update target rule. First, the update data processing unit 123 identifies an update target rule from update data. In the case where there is an update target rule, the update data processing unit 123 acquires information of the update target rule from the rule management unit 120, and compares a version of an update rule with that of the update target rule. In the case where the version of the update rule is newer, the update data processing unit 123 updates the rule stored in the data accumulation unit 180.

Specifically, the update data processing unit 123 passes, to the data access processing unit 116, a command to update the rule stored in the data accumulation unit 180 in accordance with the contents of the update data. The command (update command) to update a rule includes: a physical address indicating a place where an update target rule is stored; and contents commanding the data access processing unit 116 to overwrite the update target rule with update data in the storage place thereof. In the case of updating a rule held by the rule management unit 120, the update data may be passed to the rule management unit 120, and the rule management unit 120 may update the rule or the rule management unit 120 may be made to read the update data from the data accumulation unit 180.

Updating a rule by the update data processing unit 123 may be also performed by adding a new rule in addition to a method of replacing a current rule stored in the data accumulation unit 180. In the case of adding a new rule, the update data processing unit 123 notifies the rule management unit 120 of the added rule, and updates rule management information. After that, the rule management unit 120 refers to the newly added rule.

Figure 15:
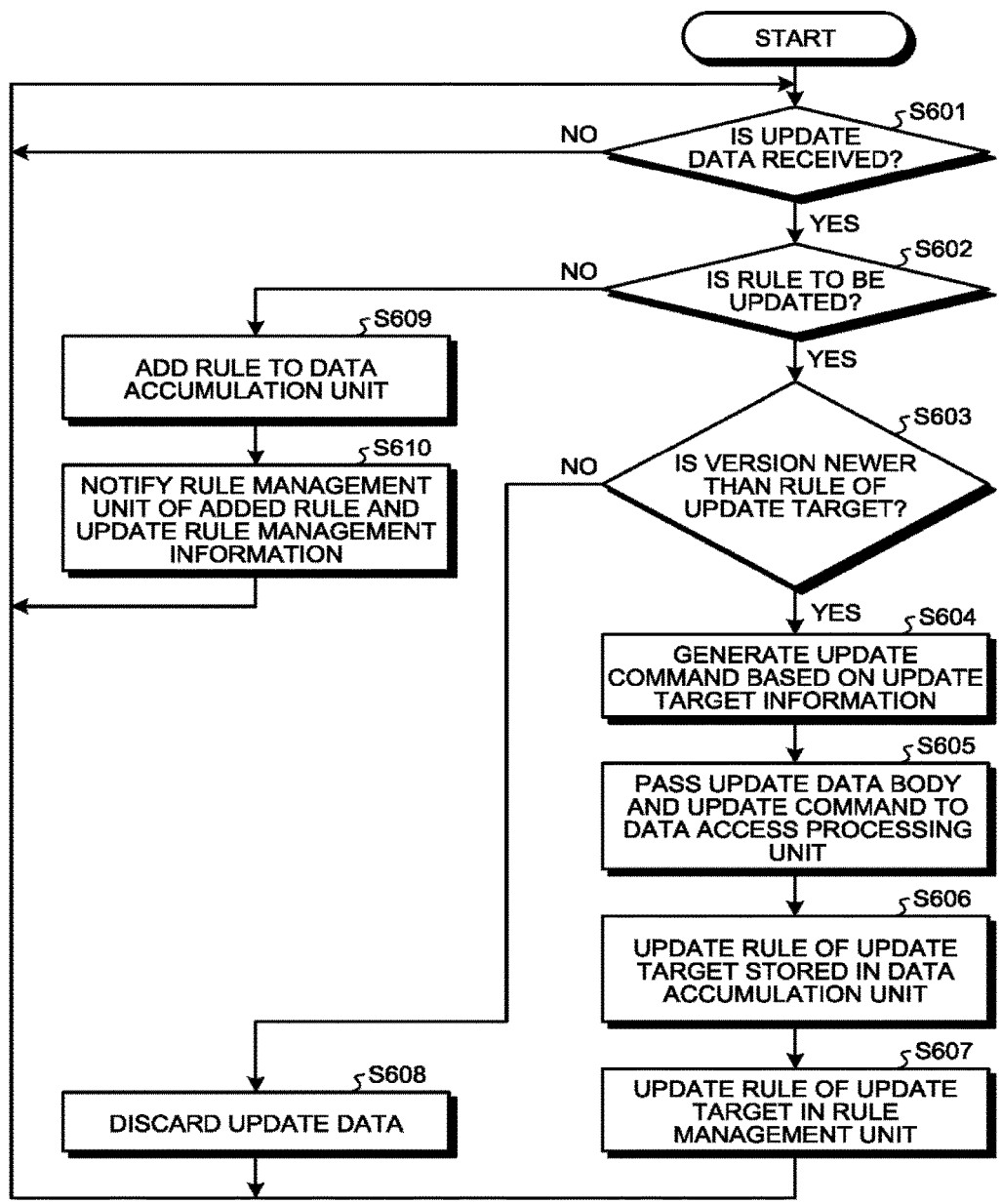
FIG. 15 is a flowchart illustrating an exemplary processing procedure by the data storage device according to the third embodiment.

FIG. 15 is a flowchart illustrating an exemplary processing procedure by the data storage device 100 according to the present embodiment and is a summarized example of processing operation to receive an update message and update a rule stored in the data accumulation unit 180. A series of the processing illustrated in the flowchart of FIG. 15 is repeatedly executed every time a bus I/F 160 receives a message including update data via the network bus 5.

A message processing unit 112 having received an incoming message from the bus I/F 160 extracts a data portion included in the message and passes the same to a data transfer unit 113. The data transfer unit 113 refers to a service ID of the received data, recognizes that the data portion is update data (step S601: Yes), and passes the update data to the update data processing unit 123.

The update data processing unit 123 determines whether a rule is to be updated by referring to update target information set in a data area of the update data received from the data transfer unit 113 and checking a version of the update data and whether there is any update target rule (step S602). Here, in the case where there is an update target rule, in other words, in the case of determining that a rule is to be updated (step S602: Yes), the update data processing unit 123 subsequently determines whether the version of the update data is newer than that of the update target rule (step S603).

Here, in the case where the update data is newer (step S603: Yes), the update data processing unit 123 generates an update command based on the update target information (step S604), and passes an update data body and the update command to the data access processing unit 116 (step S605). Then, the data access processing unit 116 generates write destination information (physical address, size, and the like) from the update command and the update data body, and passes the same to the data accumulation unit 180 together with the update data body. The data accumulation unit 180 updates the update target rule by overwriting the same with the update data body in the storage place of update target data based on the write destination information received from the data access processing unit 116 (step S606). After that, the update data processing unit 123 updates the update target rule held by the rule management unit 120 (step S607).

On the other hand, in the case where the version of the update data is older than the version of the update target rule (step S603: No), the update data processing unit 123 discards the update data (step S608) and does not update the rule. Additionally, in the case where there is no update target rule in the update target information set in the data area of the update data, in other words, in the case of not updating a rule but newly adding a rule (step S602: No), the update data processing unit 123 passes the update data body and a write command to the data access processing unit 116, and a rule is added by newly storing the update data in the data accumulation unit 180 (step S609). Then, the update data processing unit 123 notifies the rule management unit 120 of the added rule and updates the rule management information (step S610).

Meanwhile, the description has been provided for the example where updating is performed on a per-rule basis, but update of a rule may not be limited to be performed on per-rule basis but may be performed on a per-rule-set basis, and may also be performed on a per-certain-entire-rule-set basis. Alternatively, a rule and a rule set associated with a new vehicle type may also be added.

Furthermore, an update target may not be only a rule but also a software program to control the data storage device 100. Exemplary purposes to update a software program may include: updating message transmission timing at a scheduler unit 117 described in a modified example of a first embodiment; updating an algorithm adapted to determine whether an ECU 2 is in an abnormal state based on an operation state message of a data monitoring unit 119; correcting vulnerability found in a software program; adding a function to the data storage device 100; and the like.

The case of updating a software program is different from that of updating a rule in following points. First, it is assumed that the update data processing unit 123 holds information that can identify a storage place of a software program stored in the data accumulation unit 180. A structure of update data of the software program is the same as a structure of update data of a rule. An ID indicating the update data is set in the service ID area, and a version of the update data of the software program and a fact that the software program is an update target are described in update target information.

The data storage device 100 acquires update data of the software program in a procedure similar to the rule update processing in FIG. 15, and overwrites, with the update data, a current software program stored in the data accumulation unit 180. Consequently, the updated software program is started at the timing when the data storage device 100 is restarted. Specifically, when the data storage device 100 is powered ON/OFF and the data storage device 100 is restarted, the data storage device 100 reads and executes the updated software program. Additionally, not limited to when the data storage device 100 is powered ON/OFF, a software program may also be updated by restarting the data storage device 100 at the timing such as during stop of the vehicle V or the like when there is little influence even when the data storage device 100 temporarily interrupts data acquisition or accumulation. Furthermore, a software program may also be updated by directly rewriting data on a main memory 150 on the fly for the software program being executed on the data storage device 100 without restarting the data storage device 100.

A device to be a transmission source of an update message may be any device that can transmit a message to the data storage device 100, and may be an external device 7 such as an external server or an external memory. In this case, the communication device 3 receives the update message transmitted from the external device 7 via a radio communication I/F 4, and transmits the update message to the data storage device 100 via the network bus 5.

Updating a rule or updating a software program to control the data storage device 100 may be automatically executed by the data storage device 100 when a message including update data is received, or the data storage device 100 may be provided with a function to permit execution of update processing, and the update processing may be executed when the data storage device 100 receives permission to execute the update processing in accordance with operation of a user such as a driver of the vehicle V or a mechanic.

According to the above-described configuration of the present embodiment, the function of the data storage device 100 can be improved, a new function can be added, a bug in software can be corrected, and a life cycle of the data storage device 100 can be extended. The vehicles V such as an automobile or the like on which the data storage device 100 is mounted may be used for 10 years or more, and a product life of the data storage device 100 is needed to be designed to meet such a long-time use. In that case, it is important that the functions of the data storage device 100 can be continuously used by the software update function without becoming unsafe/obsolete.

Furthermore, this configuration effectively reduces a cost for updating a rule and a software program of the data storage device 100 mounted on the vehicle V after market shipment. The reason is that: since an update message can be received from the external device 7 by utilizing the radio communication I/F 4 mounted on the vehicle V, there is no need for an owner of the vehicle V to go to a dealer to perform updating work with assistance of a maintenance staff, and also there is no need to send a maintenance staff to the owner of the vehicle V to perform updating work. The more increased unit sales of the vehicle V mounted with the data storage device 100 is, the larger cost reduction effect is.

Modified Example

In the above-described third embodiment described, it is a premise that update data included in a message to update a rule or software of the data storage device 100 is an authorized rule or software program. However, when the above-described update function is exploited and the update data is falsified, there may be a concern that an unauthorized rule or software program is set in the data storage device 100. Therefore, the data storage device 100 may further include a function to detect falsification of update data.

Figure 16:
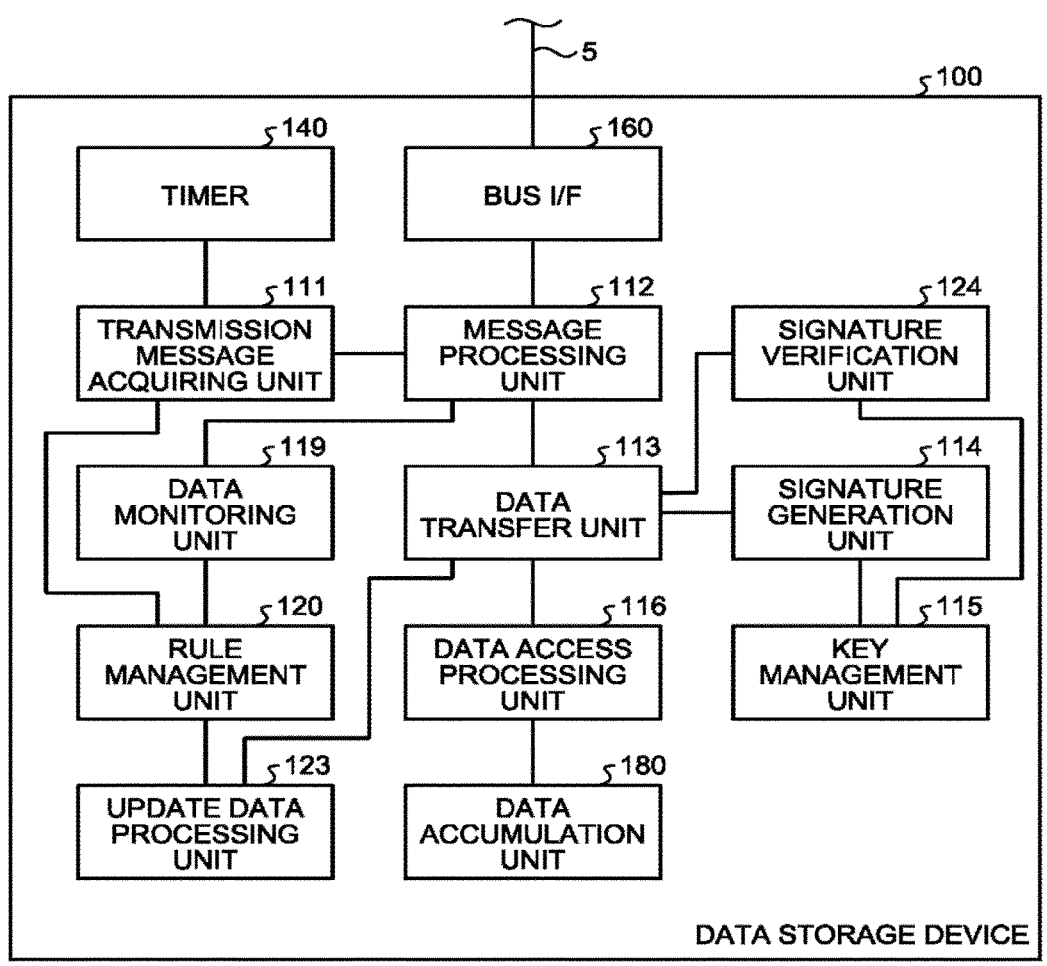
FIG. 16 is a block diagram illustrating an exemplary functional configuration of a data storage device according to a modified example of the third embodiment.

FIG. 16 is a block diagram illustrating an exemplary functional configuration of the data storage device 100 according to the present modified example. A difference from the configuration of the third embodiment illustrated in FIG. 14 is that a signature verification unit 124 is added.

The signature verification unit 124 is a processing unit to verify a signature in order to detect falsification of data in the case where a signature is attached to data received by the data storage device 100. A signature algorithm by which the signature verification unit 124 can perform verification is a signature algorithm including a one-way hash function and a public key encryption algorithm using a key held by a key management unit 115. It is a premise that the data storage device 100 holds a public key for signature verification or a common key for MAC verification in the key management unit 115. The key for verification may be written in the key management unit 115 at the time of manufacturing the data storage device 100 or may be acquired via a device connected to the network bus 5 by a human operation such as a driver or a mechanic of the vehicle V.

A signature verification method is as follows. The signature verification unit 124 calculates a hash of received data by using the one-way hash function. Next, a signature attached to the received data is decrypted by utilizing the public key of a signature source held by the key management unit 115, and a hash is acquired. Comparing the calculated hash with the decrypted hash, when the hashes are the same, verification is deemed successful.

For the one-way hash function, well-known algorithms such as an MD5, a SHA-256, or a SHA-3 can be used. For the public key encryption algorithm, well-known algorithms such as RSA and an elliptic curve encryption can be utilized. Meanwhile, the signature verification unit 124 may have a configuration capable of verifying a MAC algorithm utilizing a common key encryption or a HMAC utilizing a hash function besides the signature algorithm utilizing the public key encryption.

Figure 17:
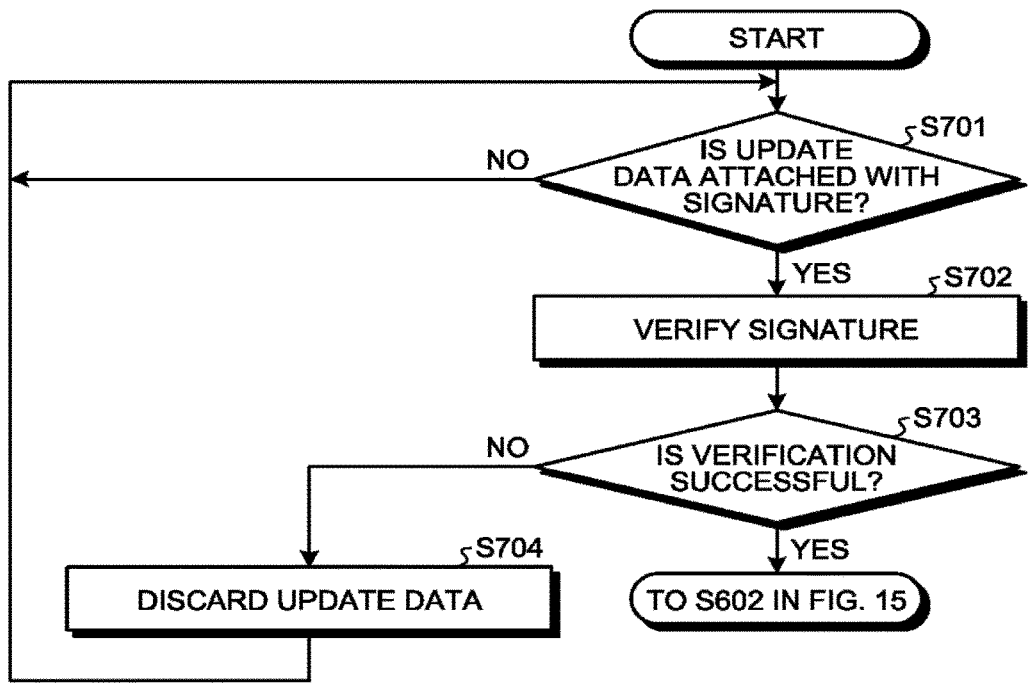
FIG. 17 is a flowchart illustrating an exemplary processing procedure by the data storage device according to the modified example of the third embodiment.

FIG. 17 is a flowchart illustrating an exemplary processing procedure by the data storage device 100 according to the present modified example and is a summarized example of processing operation to verify a signature attached to update data in order to confirm whether the update data is falsified. The processing illustrated in the flowchart of FIG. 17 is executed by being added before step S602 of FIG. 15.

When data included in an incoming message from the message processing unit 112 is received, the data transfer unit 113 recognizes that the data is update data attached with a signature by referring to a service ID of the received data (step S701: Yes) and passes the update data attached with the signature to the signature verification unit 124. Upon receipt of the update data attached with the signature from the data transfer unit 113, the signature verification unit 124 acquires a public key corresponding to the signature from the key management unit 115 and verifies the signature with this public key (step S702).

Here, in the case where verification of the signature is successful (step S703: Yes), the signature verification unit 124 notifies the data transfer unit 113 of verification success. Upon receipt of the notification of verification success, the data transfer unit 113 passes the update data to the update data processing unit 123, and the processing in step S602 and subsequent thereto in FIG. 15 is performed. On the other hand, in the case where signature verification is not successful (step S703: No), there is a possibility that the update data has been falsified, and therefore, the signature verification unit 124 notifies the data transfer unit 113 of verification failure and discards the update data (step S704). Meanwhile, a MAC may be attached to the update data instead of a signature, and the presence of falsification may be checked by utilizing message authentication instead of signature.

The configuration of the present modified example described above is particularly effective in preventing an unauthorized rule or software program from being set in the data storage device 100 when the rule update function is abused. In the case where the external device 7 transmits an update message via the radio communication I/F 4, whereas high convenience is provided, there may be a risk that an unauthorized rule or a software program is set in the data storage device 100 by a malicious update message. In the present modified example, falsification of an update message can be detected by verifying a signature of the update message. Consequently, it is possible to guarantee that the update data is not falsified, and probability in which the data storage device 100 is subject to attack and made to perform unintended operation can be reduced. Furthermore, when a signature is used, a creator of an update message can be confirmed, and therefore, reliability of the update data can be more improved.

Fourth Embodiment

Next, a fourth embodiment will be described. In a first embodiment described above, when a request message and control data received from an ECU 2 are stored in a data accumulation unit 180, a data access processing unit 116 controls writing in the data accumulation unit 180 by designating write destination information (e.g., physical address and data size). In the first embodiment, provided is a method in which the data access processing unit 116 writes the received data as it is. In this technique, it is assumed that a NAND flash memory used in the data accumulation unit 180 has high quality and an error rate generated at the time of reading is low.

In contrast, in the fourth embodiment, a data monitoring unit described later determines an importance level of data before passing the data received from a data transfer unit 113 to the data access processing unit 116. When received data is important data, a data storage device 100 attaches information to improve reliability so as to make the received data more robust, and stores the same in the data accumulation unit 180, and when the received data is other data, minimum information suitable for a use of the data storage device 100 is attached and stored in the data accumulation unit 180 while prioritizing suppressing increase of an area required for data storage. This method reduces a processing load to calculate the information to improve reliability while storing data in a robust manner by changing the information to improve reliability in accordance with an importance level of data, and also can minimize increase of an information amount caused by attaching the information to improve reliability.

Generally, an SSD and an SD card each including a NAND flash memory as a memory have a mechanism to maintain quality of the NAND flash memory for a long time and extend the life. For example, included are: a wear leveling function to smooth the number of times of writing in order to prevent local deterioration of the NAND flash memory; a defective block management function to manage the number of times of rewriting in a block and prevent writing in a deteriorated block; a function to attach an error correction signal to writing data in preparation for occurrence of reading error; a multiple writing function to write the same data in a plurality of blocks and read the data from other blocks even when one block becomes an unreadable state; and the like. In the following, these are collectively referred to as reliability guarantee processing. The reliability guarantee processing is processed by an internal controller of an SSD or an SD card. Additionally, information such as an error correction signal attached to writing data and data multiply written consumes capacity of the NAND flash memory. Furthermore, there may be a case where the SSD or the SD card normally has an extra NAND flash memory larger than nominal storage capacity for substitution of a block that has reached the end of a writing life.

A general-purpose use is assumed for the SSD and SD card, and the reliability guarantee processing is executed regardless of contents and a property of data to be written. Therefore, the processing may become an inefficient method depending on the use. For example, in the case of acquiring a message flowing in a network bus 5 and storing data included in the message like the data storage device 100, data to be written in the data accumulation unit 180 mainly includes a message periodically received and data included in a response message to identify a cause of an abnormal state. At this point, when the storage capacity is sufficient, data is not frequently erased or rewritten, and data is stored in time series. Also, main operation is to accumulate data, and the number of times of reading data is relatively fewer than the number of times of writing. In the case of the above-described use, quality deterioration caused by the number of times of writing in the NAND flash memory hardly occurs. Therefore, in the case where the wear leveling function, the function to attach an error correction signal, and the like are applied to the data storage device 100 assumed for the general-purpose use, quality guarantee may be excessive. Excessive quality guarantee may cause a cost to calculate unnecessary reliability guarantee processing, and a storage area is consumed by unnecessary information to improve reliability.

Characteristics at the time of acquiring a message flowing in the network bus 5 and storing the same are: rewriting is not frequently performed; and block deterioration in the NAND flash memory after long-term operation is less than in the case of the general-purpose use. Utilizing such characteristics, a processing amount of the reliability guarantee processing can be reduced. Reducing the processing amount of the reliability guarantee processing is to reduce the processing by more reducing execution frequency of the wear leveling function than that in the case of assuming the general-purpose use, downsizing an error correction signal to be attached to writing data, reducing the number of multiplication in multiple writing, or stopping multiple writing. A processing load of the processor 110 can be suppressed and an area required to store the information to improve reliability can be reduced by reducing the processing amount of the reliability guarantee processing. However, when the processing amount of the reliability guarantee processing is uniformly reduced for all of writing data, there is a possibility that the life cannot be guaranteed depending on the use.

Therefore, in the fourth embodiment, provided is a configuration in which an importance level corresponding to contents is attached to data included in a received message, and contents of the reliability guarantee processing is changed in accordance with the importance level. Specifically, two kinds of the reliability guarantee processing are defined. One is the reliability guarantee processing assumed for the general-purpose use, and the other is the reliability guarantee processing in which a processing amount is reduced. The reliability guarantee processing assumed for the general-purpose use is applied to important data, and the reliability guarantee processing in which the processing amount is reduced is applied to other data. The data having a high importance level is guaranteed to be surely read even when data is frequently erased or rewritten in the data storage device 100. For other data, reading is guaranteed only for a use to accumulate data that is not frequently rewritten, and processing capacity of the processor 110 necessary for the reliability guarantee processing and the storage area of the data accumulation unit 180 are suppressed small.

Figure 18:
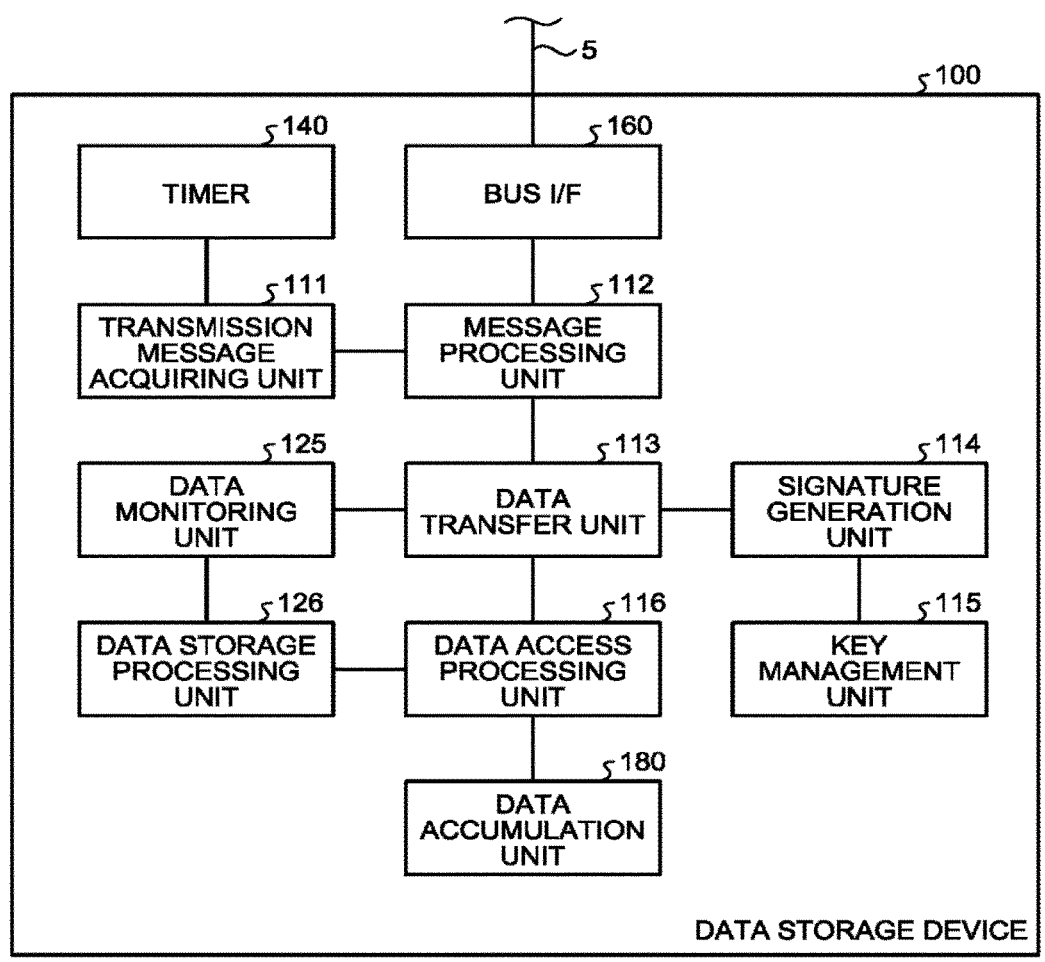
FIG. 18 is a block diagram illustrating an exemplary functional configuration of a data storage device according to a fourth embodiment.

FIG. 18 is a block diagram illustrating an exemplary functional configuration of the data storage device 100 according to the fourth embodiment. A difference from a configuration of the first embodiment illustrated in FIG. 3 is that a data monitoring unit 125 and a data storage processing unit 126 are added.

The data monitoring unit 125 receives data to be written in the data accumulation unit 180 from the data transfer unit 113, determines an importance level of the data based on contents of the data, and passes, to the data storage processing unit 126, the data to be written in the data accumulation unit 180 and the importance level thereof. An importance level to be attached to data is metadata indicating importance. Note that there are two kinds of importance levels, one is important and the other is unimportant, and important data is defined as important data and other data is defined as unimportant data. Meanwhile, three or more levels may be set for the importance levels to be attached to data, and the reliability guarantee processing may be switched based on the more detailed importance levels.

Exemplary data received from the data transfer unit 113 by the data monitoring unit 125 includes: diagnostic information transmitted as a response message from an ECU 2; control data exchanged between ECUs 2; data indicating an operation state of a system to be controlled (such as engine, transmission, and airbag); and the like. Exemplary important data may include diagnostic information indicating an abnormal state, data indicating an operation state of an engine or an airbag which may influence safety, and the like. Exemplary unimportant data may include data on operation of an air conditioner that does not influence safety, a command to open and close a window, and the like. Meanwhile, kinds of data for which importance levels are set by the data monitoring unit 125 may be determined at shipment of the data storage device 100 or may be set after shipment of the product.

The data storage processing unit 126 receives data and an importance level thereof from the data monitoring unit 125, and performs the reliability guarantee processing for the data in accordance with the importance level. Here, the reliability guarantee processing is assumed to be switched between three kinds of operation as follows in accordance with an importance level: (a) attaching an error correction code; (b) performing writing in a block, a number of times writing in the block is performed being small; and (c) writing the same data in a plurality of blocks. The data storage processing unit 126 executes the reliability guarantee processing in accordance with the importance level, and attaches a result thereof to data, and then passes the data to the data access processing unit 116 that actually performs processing to write the data in the data accumulation unit 180. The data to be attached includes information to improve reliability and a command for the data access processing unit 116. Specific examples thereof are not only an error correction code but also a command to write data in a block, a number of times writing in the block is performed being small, and a command to write the same data in a plurality of blocks for the data access processing unit 116.

Here, the above (a) attaching an error correction code will be described. When data is written in the data accumulation unit 180 after attaching an error correction code to the data, an error can be detected and corrected in the case where the error occurs at the time of reading the data from a block where the data is temporarily written. A size of an error that can be detected and corrected is determined by a code length of an attached error correction code, and the longer the code length is, the larger the size of an error that can be detected and corrected is. Therefore, the data storage processing unit 126 attaches a long error correction code to important data and attaches a short error correction code to unimportant data. At this point, as an error correction code method, a Hamming code, a cyclic Hamming code, a Golay code, a BCH code, a difference set cyclic code, a fire code, a turbo code, an LDPC, a convolutional code, or the like may be used.

Next, the above (b) performing writing in a block, a number of times writing in the block is performed being small, will be described. A block in a NAND flash memory is gradually deteriorated by repeatedly writing data, and finally writing and reading cannot be performed. Therefore, data written in a block, a number of times writing in the block is performed being small, is more reliable than data written in a block having the large number of times of writing. Accordingly, as for important data, the data storage processing unit 126 provides a command to preferentially perform writing in a block, a number of times writing in the block is performed being small, and as for unimportant data, the data storage processing unit provides a command to perform writing in blocks excluding a block, a number of times writing in the block is performed being small.

Next, the above (c) writing the same data in a plurality of blocks) will be described. This is a method to improve reliability of data by writing the same data in a plurality of blocks and reading the data from another block where the same data is written even when the data cannot be read from one certain block. The data storage processing unit 126 attaches a command to write the same data in a plurality of blocks as for important data, and attaches a command to reduce the number of blocks to be written with the same data or does not attach this command not to perform multiple writing as for unimportant data.

The data storage processing unit 126 switches operation between the reliability guarantee processing for important data and reliability guarantee processing for unimportant data in accordance with following criteria (1) to (3) relative to the reliability guarantee processing of the above-described (a) to (c). (1) An error correction code attached to important data is longer than an error correction code attached to unimportant data. (2) The number of times of writing in a write destination block for important data is smaller than the number of times of writing in a write destination block for unimportant data. (3) The number of multiplication of multiple writing for important data is larger than the number of multiplication of multiple writing for unimportant data.

Note that the data storage processing unit 126 may apply one of the above (a) to (c) as the reliability guarantee processing, or may apply a combination of the above (a) to (c). Additionally, the reliability guarantee processing is not limited to the above three (a) to (c), and other processing may also be used.

Figure 19:
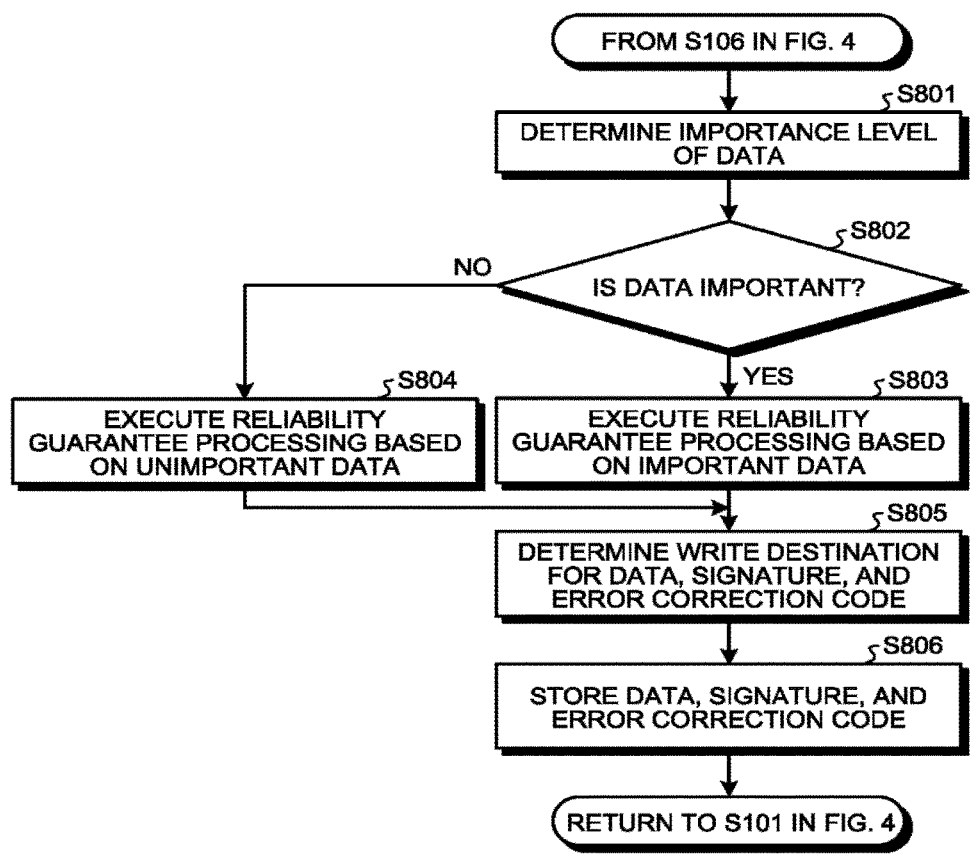
FIG. 19 is a flowchart illustrating an exemplary processing procedure by the data storage device according to the fourth embodiment.

FIG. 19 is a flowchart illustrating an exemplary processing procedure by the data storage device 100 according to the present embodiment and is a summarized example of processing operation to attach, to data included in a response message, an importance level in accordance with contents of the data and performing the reliability guarantee processing in accordance with the importance level. The processing illustrated in the flowchart of FIG. 19 is executed instead of processing in step S107 and step S108 of FIG. 4.

When a signature and data calculated in step S106 of FIG. 4 are passed from a signature generation unit 114, the data transfer unit 113 passes the data and signature received from the signature generation unit 114 to the data monitoring unit 125. The data monitoring unit 125 determines an importance level of the data based on contents of the data received from the data transfer unit 113 (step S801), and passes the data, signature, and importance level of the data to the data storage processing unit 126. The data storage processing unit 126 performs reliability guarantee processing in accordance with the importance level of the data for the data and signature received from the data monitoring unit 125. In other words, in the case where data received from the data monitoring unit 125 is important data (step S802: Yes), the data storage processing unit 126 executes the reliability guarantee processing based on the important data (step S803). On the other hand, in the case where data received from the data monitoring unit 125 is unimportant data (step S802: No), the data storage processing unit 126 executes the reliability guarantee processing based on the unimportant data (step S804). Then, the data storage processing unit 126 passes, to the data access processing unit 116, not only the data and signature but also an error correction code obtained as a result of the reliability guarantee processing and a command for the data access processing unit 116.

In accordance with the command from the data storage processing unit 126, the data access processing unit 116 determines a write destination for the data, signature, error correction code (step S805), and passes a physical address of the write destination for the data, signature, and error correction code to the data accumulation unit 180. The data accumulation unit 180 stores the data, signature, and error correction code received from the data access processing unit 116 in an area indicated by the physical address of the write destination (step S806).

The above-described configuration of the present embodiment is particularly useful in that reliability of the data stored in the data accumulation unit 180 can be achieved and capacity in a storage area of the data accumulation unit 180 can be saved. Some messages flowing in an in-vehicle network 1 are important data and some are not important data. For the important data, high reliability is secured and reading can be ensured even when the data storage device 100 is used for a long period. On the other hand, for the data having the low importance level, a cost for the data storage device 100 can be reduced by prioritizing capacity more than reliability.

In an SSD or an SD card having a NAND flash memory as a memory, since an internal controller performs writing based on a physical address and attaches reliability information, and a method unique to the SSD or SD card is used as a method of managing the reliability information and improving reliability, the reliability information cannot be attached to data written from the outside via a general-purpose I/F. In the present embodiment, the NAND flash memory not including a controller is used for the data storage device 100 and writing is performed based on a physical address, and therefore, it is possible to control in detail whether to prioritize reliability or prioritize capacity based on an importance level of data. This function can extend the life of the data storage device 100 while reducing the cost.

Meanwhile, in the present embodiment, the reliability guarantee processing is performed in accordance with an importance level of data, but the reliability guarantee processing may also be performed in accordance with a data storage period. As for data required to be stored for a long period, high reliability is ensured and robustness is achieved, and as for data that becomes unnecessary in a short time, capacity may be more prioritized than reliability.

Modified Example

In the above-described fourth embodiment, signature generation, reliability guarantee processing, writing processing, and the like for data are independently performed per piece of data. However, it may be also possible to provide a configuration in which a plurality of pieces of received data is analyzed, data having a common property is collectively handled as one piece of data, and the signature generation, reliability guarantee processing, and writing processing are collectively performed.

Figure 20:
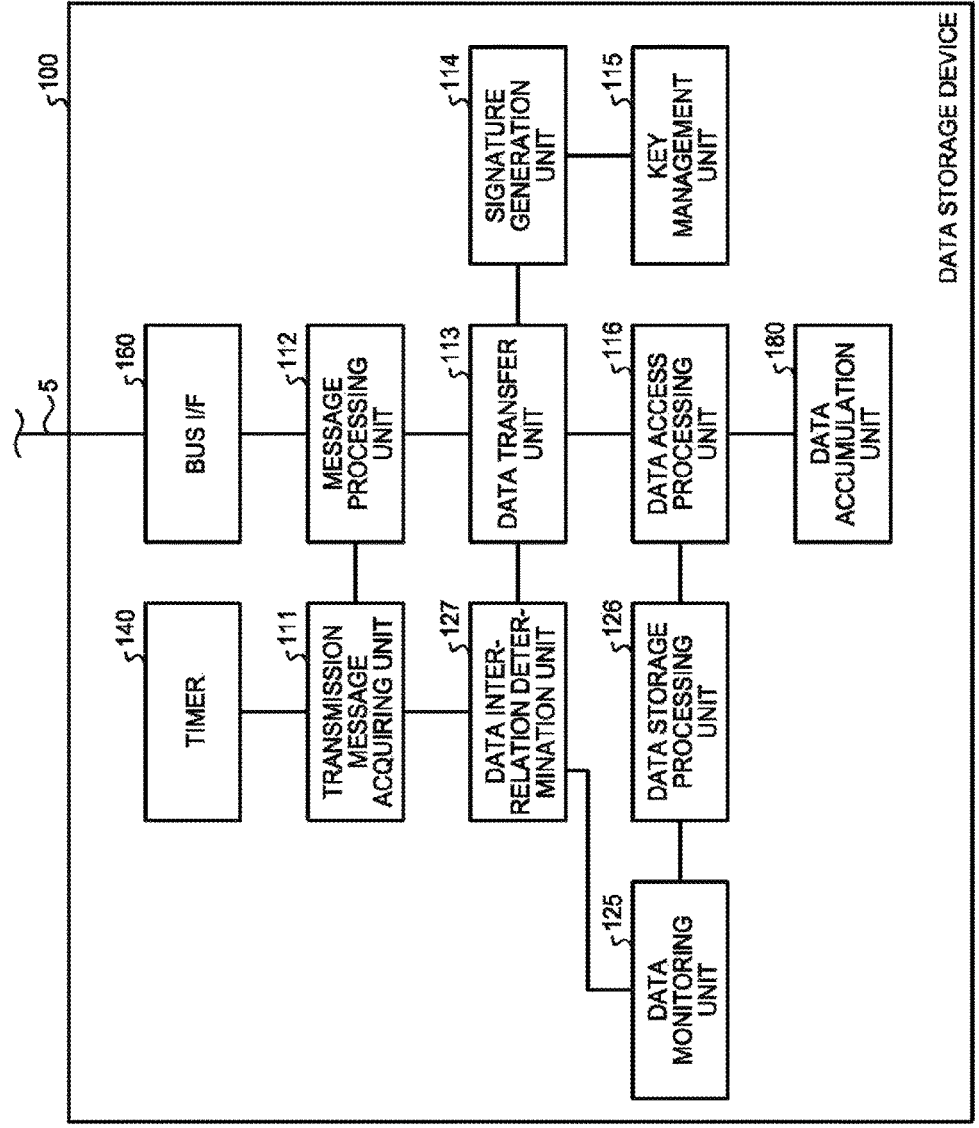
FIG. 20 is a block diagram illustrating an exemplary functional configuration of a data storage device according to a modified example of the fourth embodiment.

FIG. 20 is a block diagram illustrating an exemplary functional configuration of the data storage device 100 according to the present modified example. A difference from the configuration of the fourth embodiment illustrated in FIG. 18 is that a data interrelation determination unit 127 is added. In the present embodiment, it is assumed that a plurality of pieces of data is grouped as one piece of data by utilizing the data interrelation determination unit 127, an importance level of the grouped data is determined, and the reliability guarantee processing is performed in accordance with the importance level. Consequently, the entire grouped data can have the unified same reliability. Furthermore, processing efficiency is more improved and a storage area can be more saved than in the case of performing the reliability guarantee processing per piece of data.

The data interrelation determination unit 127 is a processing unit to analyze contents of a plurality of pieces of data received from the data transfer unit 113, obtain a common property of the plurality of pieces of data (interrelation), and group a plurality of pieces of data having the interrelation as one.

Here, a specific example in which the data interrelation determination unit 127 determines presence of an interrelation between a plurality of pieces of data will be described. For example, response messages acquired from an ECU 2 based on request messages belonging to the same identifying rule is determined to have an interrelation. The reason is that all of response messages belonging to the same identifying rule are needed to be analyzed in order to identify a cause of abnormality, and in the case of missing one thereof, analysis cannot be correctly performed and the cause of abnormality may not be identified. In the case of handling a plurality of response messages belonging to the same identifying rule, when there is a difference in reliability between pieces of data to be stored in the data accumulation unit 180, reliability of all of the pieces of data is determined by a piece of data having the lowest reliability among all thereof. In other words, even when there is a message that improves reliability higher than the piece of data having the lowest reliability among the pieces of data to be stored in the data accumulation unit 180, there is no effect. To eliminate such a discrepancy, the data interrelation determination unit 127 determines presence of an interrelation between pieces of data obtained from a plurality of response messages belonging to the same identifying rule.

Meanwhile, whether an interrelation is present between a plurality of pieces of received data may be determined not only based on whether the plurality of response messages belongs to the same identifying rule but also whether the response messages belong to the same diagnosis rule, or based on other factors.

An exemplary processing in which the data interrelation determination unit 127 determines presence of an interrelation between response messages belonging to the same rule will be described. First, the data interrelation determination unit 127 discerns a rule which data received from the data transfer unit 113 belongs to. Specifically, the data interrelation determination unit 127 acquires a service ID indicating diagnostic contents of the received data, and confirms whether the service ID is included in a rule currently set in the transmission message acquiring unit 111. In the case where the service ID of the received data is included in the rule currently set, the data interrelation determination unit 127 determines presence of an interrelation and accumulates the data in an own storage area. In the case of not being included in the rule, the data interrelation determination unit 127 determines absence of an interrelation and transmits the received data to the data monitoring unit 125. When certain number of pieces of data having an interrelation is accumulated, the data interrelation determination unit 127 groups the pieces of accumulated data as one piece of data, and transmits the same to the data monitoring unit 125.

At this point, the data interrelation determination unit 127 may group, as one, the pieces of data determined to have the interrelation after accumulating the certain number of pieces of data, or may group, as one, the pieces of data when a rule currently set in the transmission message acquiring unit 111 is switched. The reason for grouping the pieces of data as one when the rule currently set is switched is that: when the rule is switched, a response message belonging to the rule before the switch is not received any more, and therefore, there is a possibility that the certain number of data having the interrelation before the switch cannot be accumulated. In this case, there is no opportunity to perform data grouping only by the method in which pieces of data is grouped after accumulating the certain number of pieces of data determined to have the interrelation.

Figure 21:
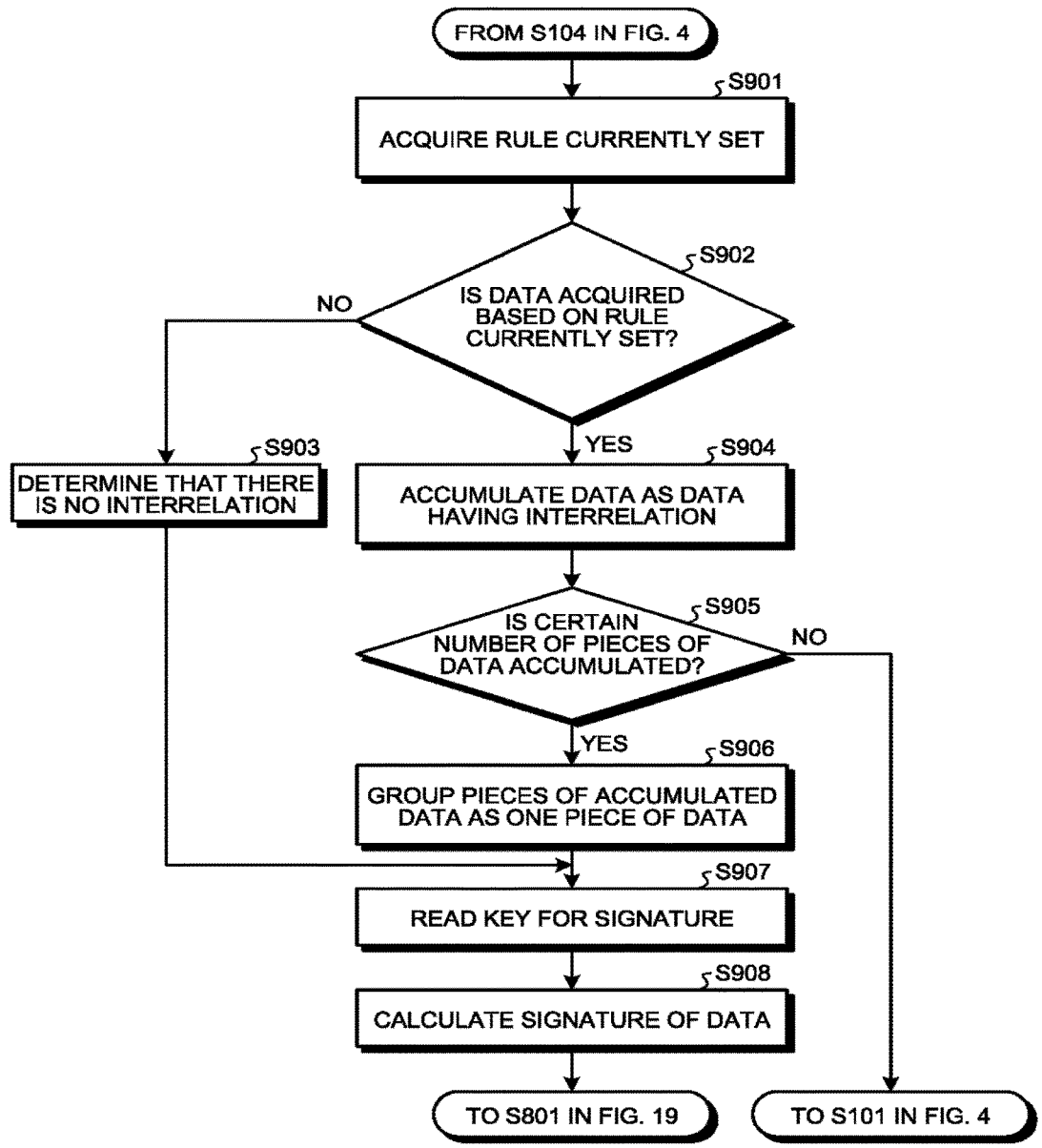
FIG. 21 is a flowchart illustrating an exemplary processing procedure by the data storage device according to the modified example of the fourth embodiment.

FIG. 21 is a flowchart illustrating an exemplary processing procedure by the data storage device 100 according to the present modified example and is a summarized example of processing operation in which the data storage device 100 analyzes received request messages, collectively handles a plurality of pieces of data having an interrelation as one, and collectively performs signature attachment, determination of an importance level, reliability guarantee processing, and writing processing. The processing illustrated in the flowchart of FIG. 21 is executed instead of processing from step S105 to step S108 in FIG. 4.

In the present embodiment, data extracted from a response message by the message processing unit 112 in step S104 of FIG. 4 is passed from the data transfer unit 113 to the data interrelation determination unit 127. The data interrelation determination unit 127 acquires a rule currently set in the transmission message acquiring unit 111 (step S901), and checks whether data received from the data transfer unit 113 is data acquired based on the rule currently set by checking, for example, whether a service ID indicating diagnostic contents of the data received from the data transfer unit 113 is included in the rule currently set (step S902).

Here, in the case where the data received from the data transfer unit 113 is not data acquired based on the rule currently set (step S902: No), the data interrelation determination unit 127 determines that there is no interrelation in the data received from the data transfer unit 113 (step S903), and passes the data to the data transfer unit 113 without accumulating the data in the own storage area.

On the other hand, in the case where the data received from the data transfer unit 113 is data acquired based on the rule currently set (step S902: Yes), the data interrelation determination unit 127 determines that the data received from the data transfer unit 113 is the data having an interrelation, and accumulates the data in the own storage area (step S904). Then, the data interrelation determination unit 127 confirms whether the certain number of pieces of data is accumulated in the own storage area (step S905), and when the certain number of pieces of data is not accumulated (step S905: No), the processing returns to step S101 in FIG. 4 and repeats the processing from this step. On the other hand, when the certain number of pieces of data are accumulated (step S905: Yes), the data interrelation determination unit 127 groups, as one piece of data, the pieces of data accumulated in the own storage area (step S906) and passes the data grouped as one to the data transfer unit 113.

The data transfer unit 113 passes the data received from the data interrelation determination unit 127 to the signature generation unit 114. The signature generation unit 114 reads a key for a signature from the key management unit 115 (step S907), calculates the signature of the data received from the data transfer unit 113 by using the key (step S908), and passes the data and signature to the data transfer unit 113. The data transfer unit 113 passes the data and signature received from the signature generation unit 114 to the data monitoring unit 125. After that, the processing proceeds to step S801 in FIG. 19, and the series of processing illustrated in the flowchart of FIG. 19 is performed. The processing in which the data interrelation determination unit 127 groups the pieces of accumulated data as one piece of data may be performed when a rule currently set in the transmission message acquiring unit 111 is switched.

The configuration of the present modified example described above is useful particularly in reducing a calculation load in the signature generation and reliability guarantee processing. Since the signature generation and reliability guarantee processing are not performed per piece of data of a received response message, a plurality of pieces of data having an interrelation is grouped as one and the signature generation and reliability guarantee processing are collectively performed for the grouped data, a calculation load required for the signature generation and reliability guarantee processing can be reduced and a storage area can be saved while data to be stored in the data accumulation unit 180 is made robust.

Fifth Embodiment

Next, a fifth embodiment will be described. In each of embodiments described above, described is a configuration in which a data storage device 100 spontaneously transmits a request message to an ECU 2, acquires setting information, an operation state, a diagnosis result, and the like of the ECU 2, and accumulates the same in a data accumulation unit 180. A software program working on the data storage device 100 implements operation to transmit the request message and acquire the information from the ECU 2. On the premise that there is neither a bug nor vulnerability in the software program, there is no risk that data acquired by the software program is falsified inside the data storage device 100.

In each of the embodiments described above, since it is a premise that there is no problem with the software program working on the data storage device 100, operation of the software program working on the data storage device 100 is not recorded. In contrast, in the fifth embodiment, it is assumed that there may be a case where a bug and vulnerability exist in the software program, and the data storage device 100 acquires information of an ECU 2 and accumulates the same in the data accumulation unit 180 and additionally records a state of the data storage device 100 itself. Specifically, the data storage device 100 dumps contents of a main memory 150 and records operation of the software program working on the data storage device 100 while acquiring the information of the ECU 2 and accumulating the same in the data accumulation unit 180.

In the case of assuming that setting information, an operation state, a diagnosis result, and the like of an ECU 2 acquired by the data storage device 100 and accumulated in the data accumulation unit 180 are utilized for analysis by a third party to identify a cause of an accident or the like, it is necessary to confirm whether data is falsified and also whether a device from which the data is collected has been normally operated. Whether the data read from the data storage device 100 is not falsified is confirmed by verifying a signature attached to the data as described in a first embodiment. Whether the data storage device 100 is normally operated is confirmed by analyzing a memory dump in which operation of the software program working on the data storage device 100 is recorded as described in the present embodiment. Since falsification of the data accumulated in the data storage device 100 is checked and it is further confirmed that the data storage device 100 itself has been operated without any problem, reliability can be improved for not only the data to be utilized for analysis but also the data storage device 100 itself that has collected the data.

Figure 22:
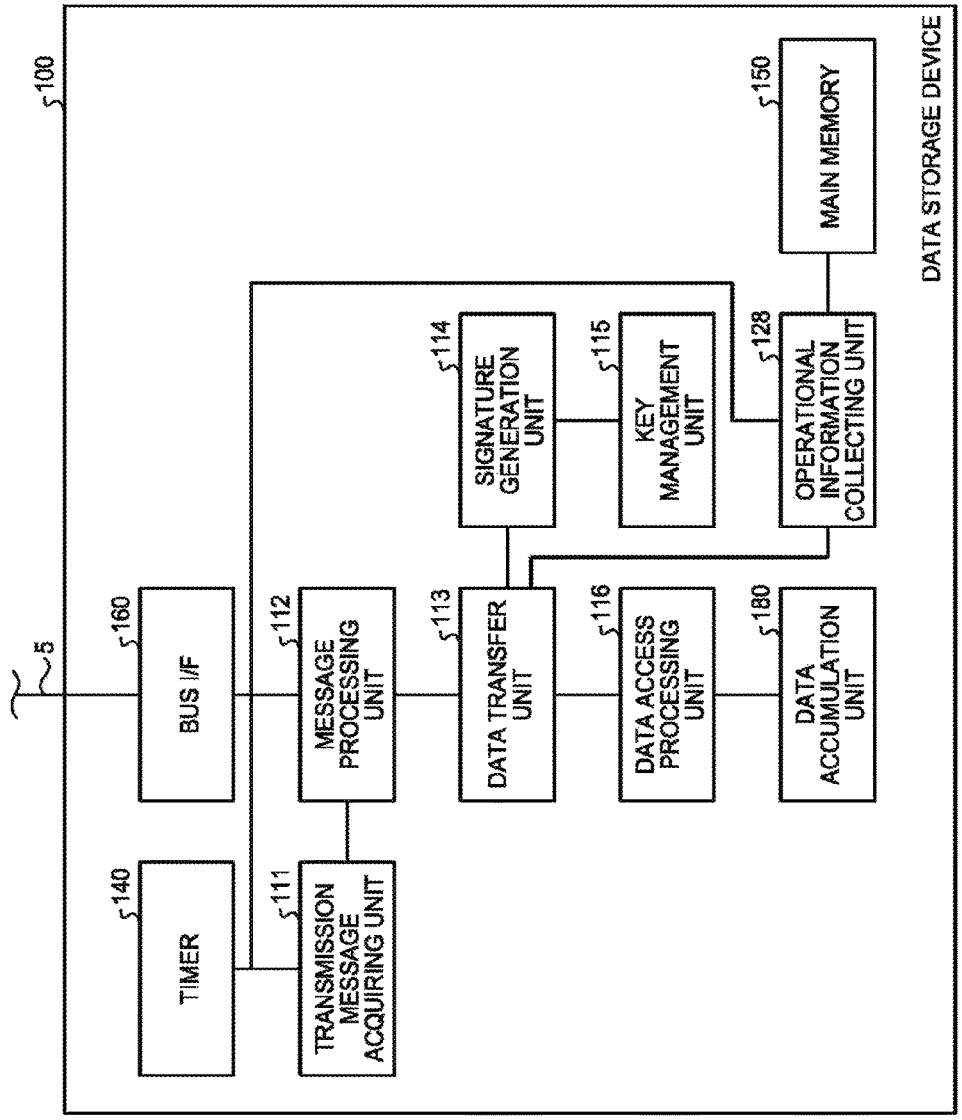
FIG. 22 is a block diagram illustrating an exemplary functional configuration of a data storage device according to a fifth embodiment.

FIG. 22 is a block diagram illustrating an exemplary functional configuration of the data storage device 100 according to the fifth embodiment. A difference from a configuration of the first embodiment illustrated in FIG. 3 is that an operational information collecting unit 128 is added. Note that a main memory 150 provided as hardware is also illustrated to simplify the description.

The operational information collecting unit 128 dumps contents of the main memory 150 and passes the same to a data transfer unit 113. The contents of the main memory 150 dumped by the operational information collecting unit 128 are referred to a memory dump. The memory dump is passed to a data access processing unit 116 via the data transfer unit 113 and stored in the data accumulation unit 180.

The operational information collecting unit 128 acquires a memory dump when an interruption notification of a timer 140 is received or when the operational information collecting unit 128 is executed. Here, operation of the operational information collecting unit 128 will be described assuming that timing to acquire the memory dump is when the interruption notification of the timer 140 is received. The interruption notification of the timer 140 may be generated periodically by setting a generation interval as a fixed period, or may be generated irregularly. Since the interruption notification of the timer 140 is generated at irregular time intervals, the timing when the operational information collecting unit 128 acquires the memory dump does not become before and after identifying processing but becomes uncertain. As a result thereof, operation at various points can be confirmed and operation of entire processing can be confirmed instead of confirming operation at a fixed point of the processing executed by the data storage device 100.

Here, an exemplary processing operation in which the operational information collecting unit 128 acquires a memory dump will be described. Upon receipt of an interruption notification from the timer 140, the operational information collecting unit 128 acquires a memory dump from the main memory 150. Next, the operational information collecting unit 128 passes the acquired memory dump to the data transfer unit 113. The data transfer unit 113 passes the received memory dump and a write command to the data access processing unit 116. The data access processing unit 116 passes, to the data accumulation unit 180, the received memory dump and write destination information generated by itself. The data accumulation unit 180 stores the memory dump in a write destination designated by the write destination information.

The above-described configuration of the present embodiment has an effect of improving, particularly, reliability of data accumulated by the data storage device 100 by verifying operation of the data storage device 100 during acquisition and accumulation of data. The data storage device 100 can confirm presence of falsification of recorded data by attaching a signature to the recorded data. However, there may be a possibility that recorded data before attaching a signature cannot be reliable in the case where operation of the data storage device 100 itself has a problem such as in a case where a bug exists in the software program of the data storage device 100 and data cannot be accumulated correctly or a case where the software of the data storage device 100 has vulnerability and is taken over by an unauthorized program, and data is falsified inside the data storage device 100. Assuming that such situations occur, a memory dump stored in the data accumulation unit 180 is analyzed, and therefore, it is possible to grasp what kind of operation the software working on the data storage device 100 has performed. In the case where falsification of the recorded data is discovered before attaching a signature, it can be grasped that the data is not reliable. Additionally, it can be considered that an unauthorized program may stop the operational information collecting unit 128, but operation abnormality of the software program can be grasped based on a fact that no memory dump is stored in the data accumulation unit 180.

Meanwhile, a signature may be attached to a memory dump in order to prevent falsification of the memory dump acquired by the operational information collecting unit 128. For example, the data transfer unit 113 having received a memory dump from the operational information collecting unit 128 passes the memory dump not to the data access processing unit 116 but to the signature generation unit 114. The signature generation unit 114 calculates a signature of the memory dump and passes the memory dump and the signature to the data transfer unit 113. After that, the data transfer unit 113 passes the memory dump and signature received from the signature generation unit 114 to the data access processing unit 116, and stores the same in the data accumulation unit 180.

Sixth Embodiment

Next, a sixth embodiment will be described. In each of embodiments described above, access to a data accumulation unit 180 is made by using a physical address via a data access processing unit 116. More specifically, in the case of reading recorded data stored in the data accumulation unit 180, a data storage device 100 converts information designating a read destination received from the outside to a physical address at the data access processing unit 116, and reads the designated recorded data from the data accumulation unit 180. Here, in each of the embodiments described above, it is assumed that the read recorded data is transmitted via a network bus 5. In the case of transmitting recorded data to the outside, the data storage device 100 receives a read command for the recorded data via the network bus 5, and calculates, from the read command, a physical address designating data actually written in the data accumulation unit 180, and transmits the read data to the network bus 5.

In contrast, in the sixth embodiment, a logical block address (LBA) is used to access the data accumulation unit 180, and recorded data can be read from a general-purpose interface used for a general data storage device (storage product). Since the LBA is used to access the data accumulation unit 180, the recorded data can be read from the data storage device 100 via the general-purpose interface such as an SAS or an SATA used for a general storage product. Since a read speed of the general-purpose interface such as the SAS or SATA is faster than a communication speed of an in-vehicle network such as a CAN assumed in the network bus 5, a time to read recorded data can be shortened. Furthermore, since the general-purpose interface is included in a general PC (personal computer), data can be read by connecting the data storage device 100 to the PC even when there is no dedicated communication interface.

Figure 23:
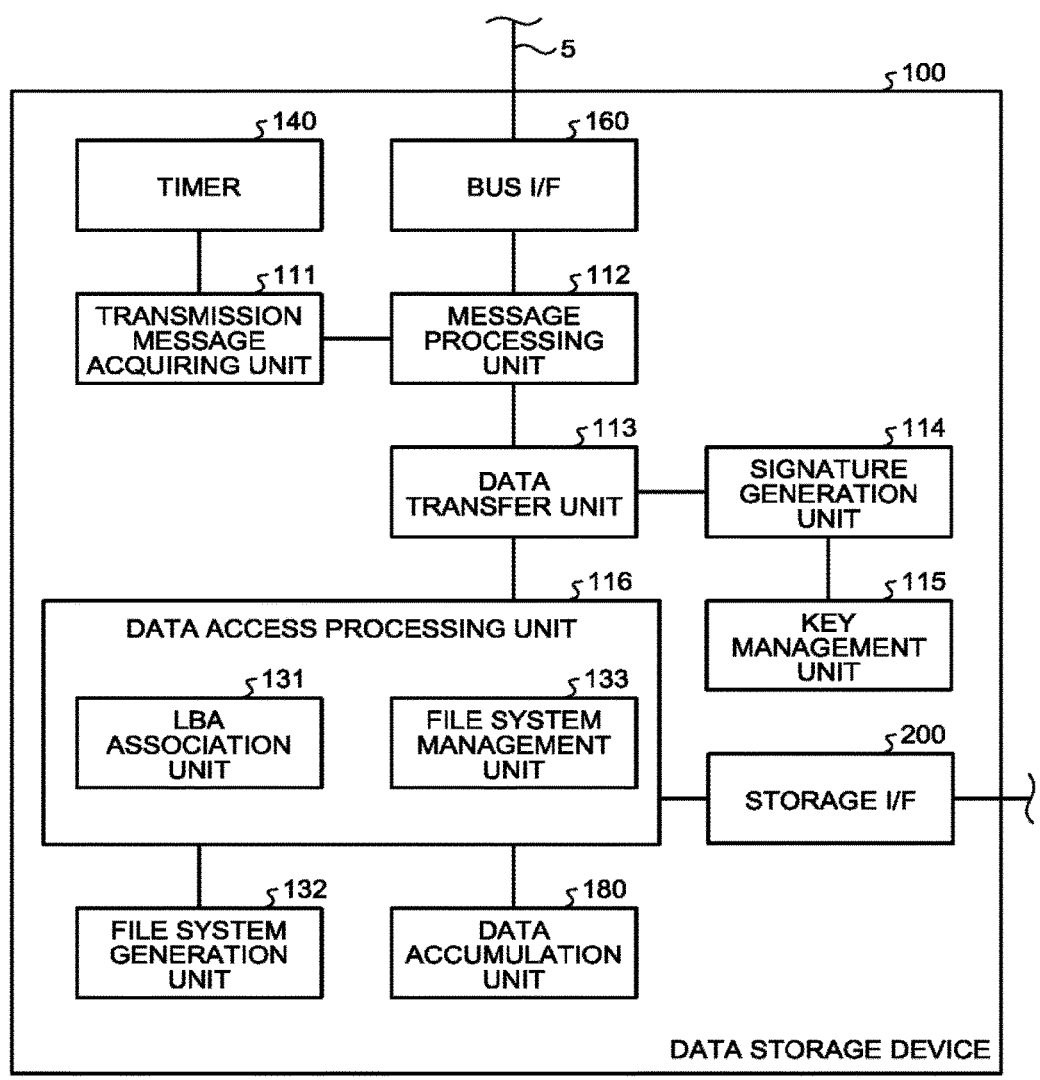
FIG. 23 is a block diagram illustrating an exemplary functional configuration of a data storage device according to a sixth embodiment.

FIG. 23 is a block diagram illustrating an exemplary functional configuration of the data storage device 100 according to the sixth embodiment. A difference from a configuration of a first embodiment illustrated in FIG. 3 is that a storage I/F 200 is added as hardware, and also an LEA association unit 131, a file system generation unit 132, and a file system management unit 133 are added.

The storage I/F 200 is an interface to connect the data storage device 100 to an external device 7, and is mounted on a substrate 190 illustrated in FIG. 2. The external device 7 transmits a command to the data access processing unit 116 via the storage I/F 200 and accesses the data accumulation unit 180. At this point, the external device 7 uses an LBA to designate a place to be accessed. Note that standards of a bus to which the storage I/F 200 is connected is assumed to be general-purpose interface standards for a general storage, such as an SAS, an SATA, or the like. Therefore, the data storage device 100 is connected to a PC having an interface such as the SAS or SATA, and can access the recorded data stored in the data accumulation unit 180 from the PC. Note that the data access processing unit 116 may inhibit data writing from the storage I/F 200 in the data accumulation unit 180, and may permit reading.

The LBA association unit 131 is a processing unit to associate an LBA with a physical address by using data managed by the data access processing unit 116. The LBA association unit 131 manages, for example, a conversion table between an LBA and a physical address as illustrated in FIG. 24, and associates a physical address with an LBA. Note that the conversion table exemplified in FIG. 24 illustrates a case where a block size of an LBA is the same as a block size of a physical address, but the sizes may be different from each other as well.

For example, in the case where wear leveling is executed by the data access processing unit 116 and number of times of writing between blocks of the data accumulation unit 180 is smoothed, a physical address indicating a storage destination of recorded data may be changed. Additionally, a physical address indicating a storing destination of recorded data may be also changed in the case of performing block replacement in which a block to record certain data is almost broken, the block almost broken is invalidated and a copy thereof is created in another block, or in the case of performing block change in which the same data is recorded in a plurality of blocks, and one block that has been set as a reference destination is invalidated and another block recorded with the same data is changed to be a new reference destination. At this point, in the case where a physical address of certain data is changed, the LBA association unit 131 updates the conversion table between an LBA and a physical address by using the physical address managed by the data access processing unit 116. Thus, since the LBA association unit 131 updates the conversion table between an LBA and a physical address, even when data written by using a physical address is referred by using an LBA, it is guaranteed that the data is always the same. In the case where the data access processing unit 116 accesses the data accumulation unit 180, an association relationship between an LBA and a physical address is acquired from the conversion table managed by the LBA association unit 131.

The file system generation unit 132 is a processing unit to format the data accumulation unit 180 and create management data for the data access processing unit 116 so as to be able to access the data accumulation unit 180 by using an LBA. For example, the file system generation unit 132 formats the data accumulation unit 180 at the time of, for example, detecting that a bus I/F 160 is connected to a vehicle V for the first time or detecting that a power is supplied to the data storage device 100 for the first time.

In addition, a format command may be received from the outside and the file system generation unit 132 may format the data accumulation unit 180 in accordance with this command. In this case, since formatting erases recorded contents in the data accumulation unit 180, the file system generation unit 132 may have a method of restricting execution of second formatting after execution of first formatting, or may have a restricting function by which a command can be provided only from a specific device in the case of executing the second formatting. Meanwhile, the file system generation unit 132 is not an indispensable constituent element and the data storage device 100 may be shipped from a factory in a formatted state.

The file system management unit 133 is a processing unit to create and store management information of a file system in order to manage data written in the data accumulation unit 180 as a file.

First, an exemplary file system will be described in order to describe a function of the file system management unit 133. Here, it is assumed that there are two types of file formats including a file and a directory to be handled by the file system management unit 133. In the data accumulation unit 180, a management data area to manage a file is set. This management data area is secured at the time of formatting the data accumulation unit 180.

The management data area includes four kinds of areas: (α) an area indicating a storing place of a management area, (β) a file management area, (γ) a directory data management area, and (δ) a user data area.

In the above (α) area indicating a storing place of a management area, places of the file management area and the directory data area are recorded. The data is data to be a start point to access data managed by the file system. The area indicating the storing place of the management area is indicated by a head address of an LBA. When the external device 7 accesses the file system, the external device 7 first accesses the head address of the LBA, refers to the storing place of the management area, and acquires the places of the file management area and the directory data area.

The above (β) file management area is an area to record management data (file management data) describing a file property. A file body is stored in a user data area described later, but data indicating a file property is stored in the file management area. For a file property, three kinds of information including a file type, a file size, and a data storing place are recorded. The file type is a flag indicating whether an ordinary file or a directory. The data storing place indicates which part of the user data area a file body is stored. In the case where the external device 7 accesses a file, the external device 7 refers to file management data, acquires a storing place of the file body, and accesses the concerned place. The file management data is created per file, and a unique number is assigned to distinguish the file. Meanwhile, the file property is not limited to the above three kinds, and other information such as a file reference time and a file update time may also be included.

The above (γ) directory data management area is an area to record directory data in which all of file names existing inside a directory are recorded. The directory data records a table including file names and numbers of file management data such that access can be made to file management data of a target file based on a file name. For example, when the external device 7 accesses a file A, the external device 7 refers to a directory where the file A exists, and acquires, from the table recorded therein, a number of the file management data associated with the file A. Then, the external device refers to the file management data associated with the acquired number, acquires a storing place of a file body, and access the file.

The above (δ) user data area is a data area to record a file body. The file management data describes which part of the user data area the file body is recorded.

Meanwhile, the management data area is not limited to the above four kinds (α) to (δ), and there may be a free data management area and the like in addition thereto. The free data management area manages a free area of the data accumulation unit 180. The external device 7 can grasp a usage rate of the data accumulation unit 180 by referring to this free data management area.

The file system management unit 133 generates file management information and updates the management information of the file system in a manner associated with data such that the external device 7 can access data stored in the data accumulation unit 180 in accordance with a procedure based on the above-described file system. The procedure in which the file system management unit 133 updates the management information of the file system is as follows.

Upon receipt of data to be stored, the data access processing unit 116 writes, in the data accumulation unit 180, the data to be stored through the file system via the file system management unit 133. At this point, the file system management unit 133 generates file management data and writes the same in the management data area in order to handle the data to be written as a file. For the file management data, the file system management unit 133 sets a file type as an ordinary file and assigns a unique number. Furthermore, the file system management unit 133 generates a file name associated with the file management data. At this point, the file system management unit 133 may set a serial number for a file name to be provided, or set a random character or the like such that the same name is not used for different files.

The file system management unit 133 adds the generated file name and the number of the file management data to a table of directory data at a recording destination, and updates the directory data. The file system management unit 133 reads a directory data to be updated from the directory data management area of the data accumulation unit 180. Meanwhile, the file system management unit 133 may cache directory data that is the same as contents recorded in the data accumulation unit 180. The file system management unit 133 writes the generated file management data and the updated directory data in the management data area of the data accumulation unit 180 via the data access processing unit 116.

Specifically, processing to write a file body, file management data, and directory data has a procedure as follows. The data access processing unit 116 converts a write destination address (LBA) of data including a file body, file management data, and directory data to a physical address in the LBA association unit 131, attaches information to improve reliability and the like, and writes the physical address in the data accumulation unit 180.

As another means to update management information of a file system by the file system management unit 133, the file management data may be associated with data written by using a physical address after the data access processing unit 116 writes the data by using the physical address. The data access processing unit 116 refers to the conversion table between an LBA and a physical address managed by the LBA association unit 131, and acquires an LBA associated with the physical address based on write destination information (e.g., head physical address and data size) of data to be stored. The file system management unit 133 creates the file management data based on the LBA and data size acquired by the data access processing unit 116.

Meanwhile, for easy understanding of file management, the file system management unit 133 may create a plurality of directories and record files in a categorized manner. For example, a directory having a name using a value of an ID area of a message is created and data of a message having an ID matching this directory name is recorded inside the concerned directory, thereby enabling the external device 7 to easily grasp contents at the time of referring to recorded data.

As described above, since the file system management unit 133 attaches management data to data to be stored based on a file system, the external device 7 can read data stored in the data accumulation unit 180 in accordance with a procedure based on the file system. Note that a file system used by the file system management unit 133 may be an FAT, an FAT 32, an NTFS, an EXT 3, an EXT 4, an XFS, an HFS, an HFSX, or the like widely used for a PC, or it may be a unique file system. In the case of using a unique file system, it is assumed that the external device 7 is compatible with the own file system.

FIG. 25 is a flowchart illustrating an exemplary processing procedure by the data storage device 100 according to the present embodiment and is a summarized example of processing operation to receive a read command from the external device 7 via the storage I/F 200 and read data from the data accumulation unit 180.

The data storage device 100 receives a command from the external device 7 via a bus connected to the storage I/F 200 (step S1001). The storage I/F 200 transmits the received command to the data access processing unit 116. The data access processing unit 116 checks whether the command received from the storage I/F 200 is a read command or other than that (step S1002). Here, in the case where the received command is not a read command (step S1002: No), the data access processing unit 116 may set access control for the storage I/F 200 so as to ignore the command. On the other hand, in the case where the received command is a read command (step S1002: Yes), the data access processing unit 116 acquires an LBA as a reading range from the read command (step S1003) and passes the same to the LBA association unit 131.

The LBA association unit 131 refers to the conversion table, acquires a physical address associated with the LBA received from the data access processing unit 116 (step S1004), and requests the data accumulation unit 180 for data. The data accumulation unit 180 reads the data in accordance with the read command (step S1005) and passes the same to the data access processing unit 116. The data access processing unit 116 passes, to the storage I/F 200, the data read from the data accumulation unit 180. The storage I/F 200 transmits, to the external device 7, the data read from the data accumulation unit 180 (step S1006).

The above-described configuration of the present embodiment is useful particularly in achieving easy handling of the data stored in the data accumulation unit 180. Since a communication protocol used for an in-vehicle network 1 is low-cost but low-speed, there may be a risk that quite a long time is spent to read recorded data depending on a size thereof. Additionally, since a dedicated converter and dedicated software are needed to use a communication interface of the in-vehicle network 1 in a general PC, it cannot be said that the communication interface is easily handled. In the case of a general-purpose interface generally used in a storage product, recorded data can be read in a short time. For example, a transmission speed of the CAN is 1 Mbps at the maximum while that of the SATA of a general-purpose interface for a storage products is 6 Gbps at maximum, in which there is a speed difference of 6000 times. Additionally, since the general-purpose interface can be connected to a general PC and can be accessed by using an LBA, data can be read without using dedicated software. A cost for analyzing the recorded data can be reduced by utilizing a general PC without using a device dedicated to analyze data accumulated in the data storage device 100.

Modified Example 1

In the sixth embodiment described above, provided is the configuration in which data stored in the data accumulation unit 180 is read as a file via the file system, but it is also possible to have a configuration in which data is read by designating object data. In an object data method, a unique identifier (Key) is attached to information (Value) identifying a data storage place at the time of storing data in the data storage device 100. At the time of reading data stored in the data storage device 100, data is read from an associated Value by designating a Key.

Figure 26:
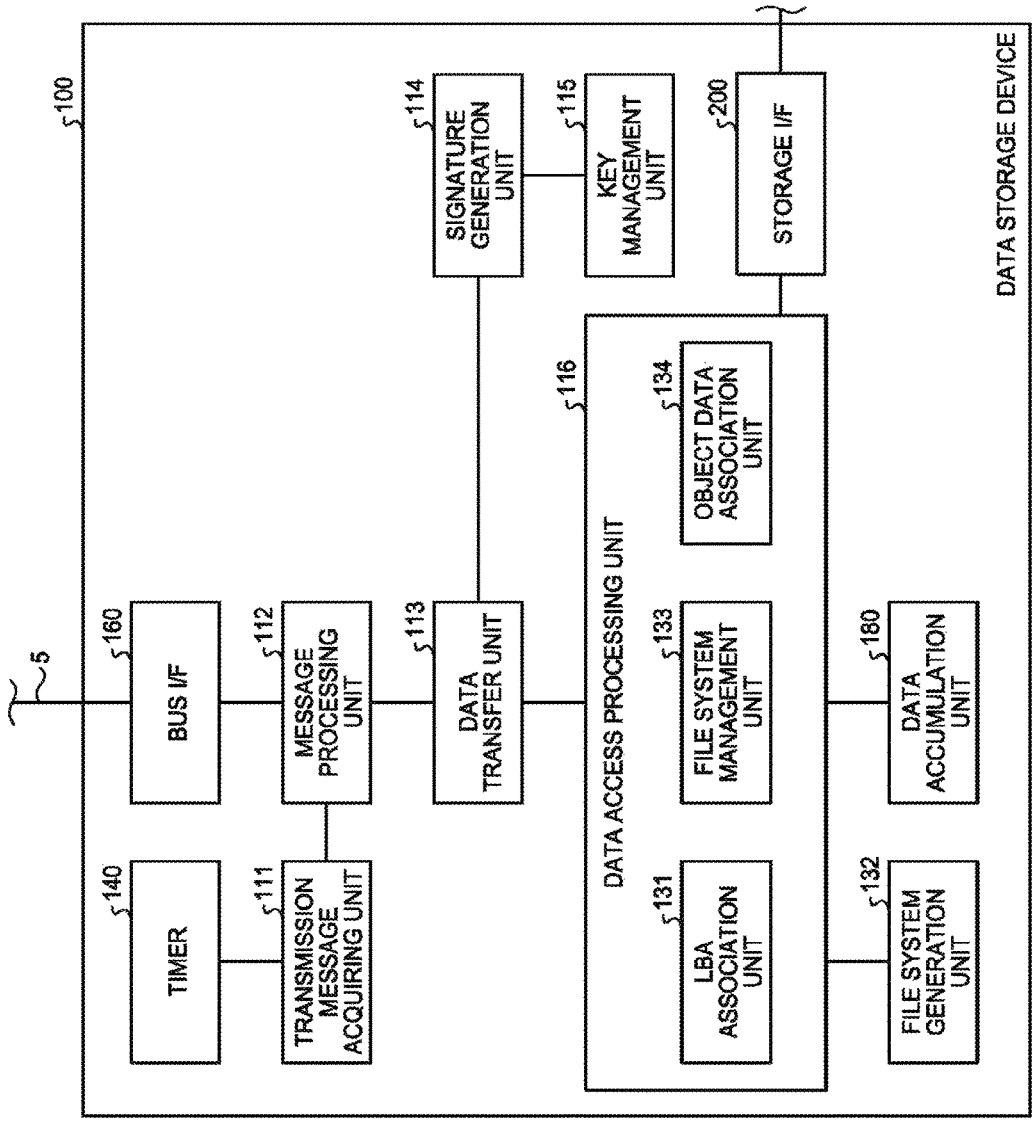
FIG. 26 is a block diagram illustrating an exemplary functional configuration of a data storage device according to a first modified example of the sixth embodiment.

FIG. 26 is a block diagram illustrating an exemplary functional configuration of the data storage device 100 according to the present modified example. A difference from the configuration of the sixth embodiment illustrated in FIG. 23 is that an object data association unit 134 is added.

The object data association unit 134 is a processing unit to assign a unique Key to data to be stored and manage the association relationship between information (Value) identifying a data storage place and a Key. The object data association unit 134 shares, inside the data access processing unit 116, information (e.g., file name) to identify data to be stored. The object data association unit 134 sets a file name as a Value as an example of information to identify a data storage place, generates a unique Key, and assigns the Key to a Value. The object data association unit 134 manages a table in which the association relationship between a Key and a Value recorded. Specifically, included is the association table between a Key and a Value as illustrated in FIG. 27, for example.

The object data association unit 134 assigns a serial number to a Key such that the Key becomes a value unique to a Value. Note that a random number not having the same value may also be assigned to a Key. A file name corresponding to recorded data is recorded in a Value. Every time the object data association unit 134 writes data in the data accumulation unit 180, an association relationship between a Key and a Value is added to the association table.

The object data association unit 134 can pass the association table in which the association relationship between a Key and a Value is recorded in response to a request from the external device 7. In this case, at the time of reading data from the data accumulation unit 180, the external device 7 can read concerned data only by designating a Key based on the table received from the object data association unit 134.

Meanwhile, the association table recorded with the association relationship between a Key and a Value may have a configuration in which an attribute of a Value can be grasped from a Key by attaching, to a serial number or a random number not having the same number, a numerical value indicating a category of data, for example, as illustrated in FIG. 28. For example, a serial number or a random number not having the same number is set for a message ID and a message kind. Here, the message kind indicates a category of message contents, such as whether a message is control data, a response message, or a response message including information of an abnormal state.

In this case, the object data association unit 134 receives a message ID and a message kind from the data transfer unit 113, and adds the same to a serial number or a random number not having the same number, and sets the same as a Key. Since information to be attached is shared in advance, the external device 7 can grasp an attribute of a Value by referring to the association table received from the object data association unit 134. Note that the number of attributes of a Value attached to a Key is any and not limited to two. In addition, an attribute other than the message ID and the message kind may be set for a Key, and for example, timing to record a message, such as time information or a time stamp, may also be attached to a Key.

In the present modified example, in the case where the external device 7 reads data, a Key is designated in a read command. An exemplary procedure in which the external device 7 reads data from the data storage device 100 by designating a Key will be described. First, the external device 7 designates, in a read command, a Key of data desired to be read, and transmits the read command to the data storage device 100 via the storage I/F 200. Upon receipt of the read command, the data access processing unit 116 of the data storage device 100 acquires the Key from the read command, refers to the association table held by the object data association unit 134, and acquires a Value (file name) associated with the acquired Key. Then, the data access processing unit 116 refers to file management data of the acquired file name and acquires write destination information of the file. Then, the data access processing unit 116 converts the write destination information to a read command, and passes the same to the data accumulation unit 180. The data accumulation unit 180 reads data in accordance with the read command from the data access processing unit 116, and passes the same to the data access processing unit 116. The data access processing unit 116 passes the data read from the data accumulation unit 180 to the storage I/F 200 and transmits the same to the external device 7.

The above-described configuration of the present modified example is useful in that data stored in the data accumulation unit 180 can be read only by simple processing of transmitting a Key to the data storage device 100 without the external device 7 accessing a file system built in the data accumulation unit 180. For example, in the case of reading data via a file system, it is necessary to perform a procedure in which the external device 7 transmits a file name, reads file management data recorded in the data accumulation unit 180, receives a place where a file is recorded from the file management data, and reads a file body by designating the place. On the other hand, when recorded data is used as object data, the data storage device 100 performs processing until recorded data is output by only designating a Key in a read command. Not only in the case where the external device 7 accesses the data accumulation unit 180 via the storage I/F 200 but also in the case of accessing the data accumulation unit 180, for example, via an external network, the data storage device 100 can uniquely identify data to be read only by transmitting a Key. Therefore, it is possible to simplify the processing in which the external device 7 reads data from the data accumulation unit 180.

Modified Example 2

In the above-described sixth embodiment, an external device 7 to read data stored in the data accumulation unit 180 is not particularly limited, but only an external device 7 having passed authentication may be allowed to read data stored in the data accumulation unit 180 in order to limit an external device 7 to read the data.

Figure 29:
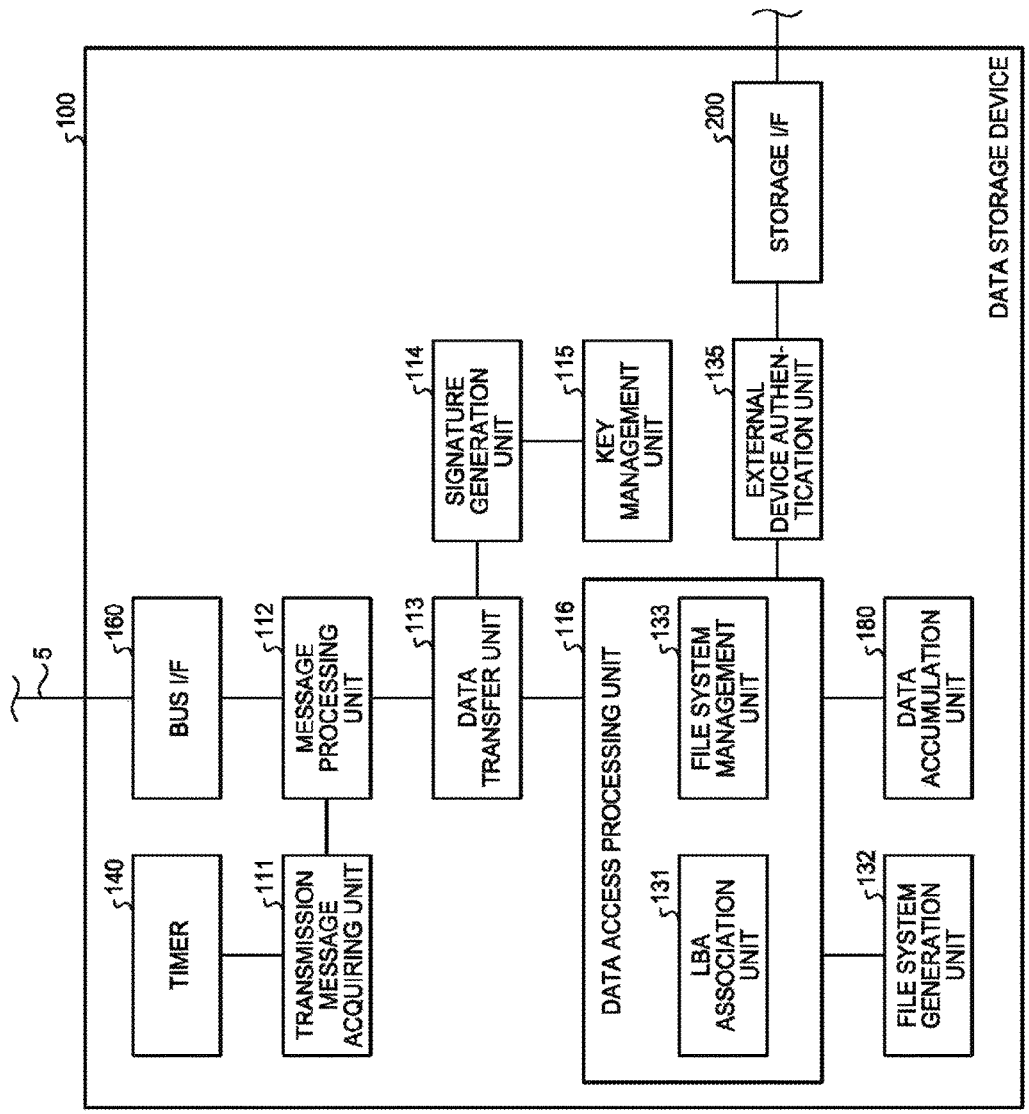
FIG. 29 is a block diagram illustrating an exemplary functional configuration of a data storage device according to a second modified example of the sixth embodiment.

FIG. 29 is a block diagram illustrating an exemplary functional configuration of the data storage device 100 according to the present modified example. A difference from the configuration of the sixth embodiment illustrated in FIG. 23 is that an external device authentication unit 135 is added.

Since the external device authentication unit 135 limits an external device 7 to read data from the data accumulation unit 180, the external device authentication unit 135 confirms whether an external device 7 has authority to read data. As a method of confirming whether an external device 7 has authority to read data, used is a method of confirming information that is known by only an external device 7 having authority. Specifically, password authentication may be used, or authentication using a MAC or a signature may also be performed. In the case of using a MAC or a signature for authentication, a key managed by the key management unit 115 may also be used.

The data access processing unit 116 accepts only a data read command from an external device 7 that has been successfully authenticated by the external device authentication unit 135, in other words, an external device 7 confirmed to have authority to read data. In other words, only the external device 7 that has been successfully authenticated by the external device authentication unit 135 can transmit a read command and read data from the data accumulation unit 180.

The above-described configuration of the present modified example is particularly effective in preventing privacy information and know-how information from being stolen from the data accumulated in the data accumulation unit 180. Since the data storage device 100 acquires a large amount of data flowing in the in-vehicle network 1 and stores the same in the data accumulation unit 180 while a vehicle V is traveling, there may be a possibility that privacy information of a driver of the vehicle V is acquired by analyzing in detail the data accumulated in the data accumulation unit 180. Therefore, with the above-described configuration of the present modified example, unintentional information leakage can be prevented by limiting an external device 7 that can access the data accumulation unit 180.

According to at least one of the embodiments described above, it is possible to provide a data storage device incorporating functions equivalent to a host in the related art, and capable of spontaneously acquiring and accumulating data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data storage device connected to an in-vehicle network, the device comprising:
   a data accumulation unit including a NAND interface;
   a bus interface mounted on the same substrate as the data accumulation unit and connected to a bus of the in-vehicle network; and
   a processor mounted on the same substrate as the data accumulation unit and the bus interface, and configured to control operation of the data storage device so as to spontaneously acquire data from the in-vehicle network via the bus interface and store the data in the data accumulation unit, wherein the processor comprises:
  a message processing unit configured to transmit and receive messages, via the bus interface, to and from an electronic control unit or an external device connected to the in-vehicle network; and
  a data access processing unit configured to command the data accumulation unit to write and read data, and
data included in a message received by the message processing unit is written in the data accumulation unit in accordance with a command of the data access processing unit, wherein
  the message processing unit transmits, without being dependent on an instruction from an another device, a request message for requesting data from an electronic control unit connected to the in-vehicle network, and receives a response message including the data requested by the request message, and
  the data access processing unit commands the data accumulation unit to write data included in the response message received by the message processing unit.

2. The device according to claim 1, wherein the processor further comprises a signature generation unit configured to generate a signature to be attached to data to be written in the data accumulation unit or data to be read from the data accumulation unit.

3. The device according to claim 2, wherein
the processor further comprises an unsigned data management unit configured to manage unsigned data written in the data accumulation unit, and
the signature generation unit generates a signature to be attached to the unsigned data when a usage rate of the processor is equal to a threshold value or less.

4. A data storage device connected to an in-vehicle network, the device comprising:
  a data accumulation unit including a NAND interface;
  a bus interface mounted on the same substrate as the data accumulation unit and connected to a bus of the in-vehicle network;
  a processor mounted on the same substrate as the data accumulation unit and the bus interface, and configured to control operation of the data storage device so as to spontaneously acquire data from the in-vehicle network via the bus interface and store the data in the data accumulation unit; and
  a storage interface mounted on the same substrate as the data accumulation unit, the bus interface, and the processor, capable of performing communication faster than the bus interface, and capable of accessing the data accumulation unit using a logical block address, wherein
  the processor comprises:
    a message processing unit configured to transmit and receive messages, via the bus interface, to and from an electronic control unit or an external device connected to the in-vehicle network;
    a data access processing unit configured to command the data accumulation unit to write and read data; and
    an LBA association unit configured to associate a logical block address with a physical address; and
  data included in a message received by the message processing unit is written in the data accumulation unit in accordance with a command of the data access processing unit, and
  when a read command designating a logical block address is received from an external device via the storage interface, the data access processing unit designates a physical address associated with a designated logical block address, and commands the data accumulation unit to read data.

5. The device according to claim 4, wherein the processor further comprises:
  a file system generation unit configured to format the data accumulation unit and create management data of the data access processing unit so as to be able to access the data accumulation unit using a logical block address; and
  a file system management unit configured to create and hold file management information to manage, as a file, data written in the data accumulation unit.

6. The device according to claim 4, wherein
the data access processing unit inhibits data writing in the data accumulation unit from the storage interface and permits reading.

7. The device according to claim 1, further comprising a storage interface mounted on the same substrate as the data accumulation unit, the bus interface, and the processor, and capable of performing communication faster than the bus interface, wherein
the processor further comprises an object data association unit configured to manage data stored in the data accumulation unit on a per-object basis, and store an association relationship between a Key and a Value, and
when a read command designating a Key is received from an external device via the storage interface, the data access processing unit commands the data accumulation unit to read data corresponding to a Value associated with the Key.

8. The device according to claim 4, wherein
the processor further comprises an external device authentication unit configured to authenticate the external device, and
when authentication of the external device is successful, the data access processing unit accepts a read command from the external device.

9. The device according to claim 1, wherein
the processor further comprises an operational information collecting unit configured to dump contents of a memory during software execution, and
the data accumulation unit further accumulates a memory dump by the operational information collecting unit.

10. The device according to claim 1, wherein the processor further comprises:
  a first data monitoring unit configured to determine an importance level of data to be stored in the data accumulation unit; and
  a data storage processing unit configured to control at least one of attaching an error correction code, writing data in a block, a number of times writing in the block is performed being small, and writing the same data in a plurality of blocks in accordance with an importance level of data to be stored in the data accumulation unit.

11. The device according to claim 10, wherein
the processor further comprises a data interrelation determination unit configured to group a plurality of pieces of data as one when there is an interrelation between the plurality of pieces of data to be stored in the data accumulation unit,
the first data monitoring unit determines an importance level of data grouped as one by the data interrelation determination unit, and the data storage processing unit controls at least one of attaching an error correction code, writing data in a block, writing in the block where the number of times writing is performed is small, and writing the same data in a plurality of blocks in accordance with an importance level of the data grouped as one by the data interrelation determination unit.

12. A data storage device connected to an in-vehicle network, the device comprising:
   a data accumulation unit including a NAND interface;
   a bus interface mounted on the same substrate as the data accumulation unit and connected to a bus of the in-vehicle network; and
   a processor mounted on the same substrate as the data accumulation unit and the bus interface, and configured to control operation of the data storage device so as to spontaneously acquire data from the in-vehicle network via the bus interface and store the data in the data accumulation unit, wherein
   the processor comprises:
      a message processing unit configured to transmit and receive messages, via the bus interface, to and from an electronic control unit or an external device connected to the in-vehicle network;
      a data access processing unit configured to command the data accumulation unit to write and read data;
      a second data monitoring unit configured to analyze data acquired from the in-vehicle network and inspect occurrence of abnormality; and
      a rule management unit configured to store an association relationship between an abnormal state having occurred and a rule to acquire data necessary to identify a cause of the abnormal state, and configured to set, when the second data monitoring unit detects the abnormal state, the rule associated with the detected abnormal state; and
   data included in a message received by the message processing unit is written in the data accumulation unit in accordance with a command of the data access processing unit, and
   data is acquired from the in-vehicle network in accordance with the set rule.

13. The device according to claim 12, wherein the processor further comprises an update data processing unit configured to acquire update data of the rule from outside and update the rule.

14. The device according to claim 13, wherein
   the processor further comprises a signature verification unit configured to verify a signature of the update data attached with a signature, and
   when signature verification is successful, the update data processing unit updates the rule.

* * * * *